US012458084B2

(12) United States Patent
Van Der Hoeven

(10) Patent No.: US 12,458,084 B2
(45) Date of Patent: Nov. 4, 2025

(54) PERSONAL PROTECTION EQUIPMENT MASK CONVERSION

(71) Applicant: Martin Van Der Hoeven, Irvine, CA (US)

(72) Inventor: Martin Van Der Hoeven, Irvine, CA (US)

( * ) Notice: Subject to any disclaimer, the term of this patent is extended or adjusted under 35 U.S.C. 154(b) by 827 days.

(21) Appl. No.: 17/698,806

(22) Filed: Mar. 18, 2022

(65) Prior Publication Data

US 2022/0295920 A1 Sep. 22, 2022

Related U.S. Application Data

(60) Provisional application No. 63/163,691, filed on Mar. 19, 2021.

(51) Int. Cl.
*A41D 13/00* (2006.01)
*A41D 13/11* (2006.01)
*A62B 23/02* (2006.01)

(52) U.S. Cl.
CPC ...... *A41D 13/1138* (2013.01); *A41D 13/1161* (2013.01); *A62B 23/025* (2013.01)

(58) Field of Classification Search
CPC ................ A41D 13/11; A41D 13/1107; A41D 13/1167; A41D 13/1184; A41D 13/1176; A41D 13/1161; A41D 13/001; A41D 13/1153; A41D 13/1218; A41D 13/1245; A62B 18/084; A62B 17/04; A42C 5/04; A61F 9/06
USPC ........................................................ 128/863
See application file for complete search history.

(56) References Cited

U.S. PATENT DOCUMENTS

| | | | | | |
|---|---|---|---|---|---|
| 1,502,450 | A * | 7/1924 | Wood | A41D 13/1146 128/206.16 |
| 2,758,307 | A * | 8/1956 | Treiber | A41D 13/1184 2/9 |
| 3,154,073 | A * | 10/1964 | Klinger | A41D 13/11 24/316 |
| 4,793,001 | A * | 12/1988 | Accardi | A41D 13/1184 2/418 |
| 10,945,469 | B1 | 3/2021 | Rosenberg et al. | |
| 2003/0029454 | A1* | 2/2003 | Gelinas | A62B 18/025 128/205.27 |
| 2018/0008848 | A1* | 1/2018 | Moulton | A41D 13/11 |
| 2019/0358473 | A1* | 11/2019 | Szasz | A62B 23/025 |
| 2020/0114178 | A1 | 4/2020 | Waterford et al. | |
| 2021/0298379 | A1* | 9/2021 | Kunar | A41D 13/1161 |
| 2021/0322796 | A1 | 10/2021 | Hubbard et al. | |

OTHER PUBLICATIONS

"AusAir: Next Gen Filtration Mask with Botanicals;" https://www.indiegogo.com/projects/ausair-next-gen-filtration-mask-with-botanicals#/.

(Continued)

*Primary Examiner* — Adam Baker
(74) *Attorney, Agent, or Firm* — Chang & Hale LLP

(57) ABSTRACT

A facial covering assembly comprises an inner frame comprising at least one aperture to allow air flow through the inner frame and an outer frame configured to couple to the inner frame. The outer frame comprises at least one aperture to allow air flow through the outer frame. The facial covering assembly further comprises a cushioning element configured to couple to the inner frame, the cushioning element configured to establish a seal around at least a portion of a user's face.

20 Claims, 61 Drawing Sheets

(56) References Cited

OTHER PUBLICATIONS

"S2- Silicone Mask & lab tested FFP3-N99 Filters;" https://www.indiegogo.com/projects/s2-silicone-mask-lab-tested-ffp3-n99-filters#/.
"UVMask—Next Generation Reusable Mask;" https://www.indiegogo.com/projects/thank-you-for-supporting-us#/.
30 Face Mask Bracket Inner Support Frame. Maynos [online]. Review from Dec. 3, 2020 15, 16(Dec. 3, 2020), Retrieved from the Internet: <https://www.walmart.com/ip/3D-Face-Mask-Bracket-Inner-Support-Frame-Silicone-Internal-Create-More-Space-Comfortable-Breathing-Lipstick-Protection-Washable/177901270?wmlspartner=wlpa&selectedSellerId=16214>.
International Search Report in PCT/US22/21030, dated Jun. 16, 2022.
Written Opinion of the International Searching Authority in PCT/US22/21030.

* cited by examiner

PERSONAL PROTECTION EQUIPMENT MASK CONVERSION

RELATED APPLICATION

This application claims priority to U.S. Provisional Application No. 63/163,691, filed on Mar. 19, 2021, entitled PERSONAL PROTECTION EQUIPMENT MASKS AND MASK CONVERSION DEVICES, the disclosure of which is hereby incorporated by reference in its entirety.

BACKGROUND

Field

The present disclosure relates in general to personal protective equipment and more particularly to face shields.

Description of Related Art

Simple cloth masks, described by the Journal of the American Medical Association as a "glorified handkerchief tied around the face of the doctor," were designed, primarily, to protect patients from what was then called "droplet infection," or the invisible, potentially virus and/or bacteria-carrying moisture emanating from the mouth or nose of physicians. Mask fit/seal and other characteristics can affect the efficacy of such masks.

SUMMARY

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

In accordance with one or more implementations of the present disclosure, a facial covering assembly comprises an inner frame comprising at least one aperture to allow air flow through the inner frame, an outer frame configured to couple to the inner frame, the outer frame comprising at least one aperture to allow air flow through the outer frame, and a cushioning element configured to couple to the inner frame, the cushioning element configured to establish a seal around at least a portion of a user's face.

The facial covering assembly may further comprise one or more filtering sheets between at least a portion of the inner frame and at least a portion of the outer frame. The facial covering assembly may further comprise one or more eyewear engagement features configured to couple to eyewear devices. The facial covering assembly may further comprise one or more user engagement features configured to secure to a user's ear. The facial covering assembly may further comprise a shaper configured to be situated at least partially in front of the user's mouth and/or nose. The shaper may be configured to couple to the inner frame. An attachment between the inner frame and the shaper may be adjustable to adjust a distance between the shaper and the user's face. The shaper may comprise at least one arm extending towards the inner frame. The at least one arm may comprise multiple attachment features along a length of the at least one arm, each of the multiple attachment features configured to alternately couple to the inner frame. The shaper may have a generally conical form in which a midsection of the shaper extends away from the inner frame. The midsection may comprise one or more elongate appendages extending around one or more apertures.

In accordance with some implementations of the present disclosure, a method comprises placing a filtering sheet at least partially between an inner frame and an outer frame, the inner frame comprising at least one aperture to allow air flow through the inner frame and a cushioning element, the cushioning element configured to establish a seal around at least a portion of a user's face, the outer frame comprising at least one aperture to allow air flow through the outer frame, and coupling the outer frame to the inner frame to secure the filtering sheet between the inner frame and the outer frame.

The method may further comprise coupling one or more user engagement features to the inner frame or outer frame, the one or more user engagement features configured to secure to a user's ear. The method may further comprise coupling a shaper to a first set of one or more shaper engagement features at the inner frame, the shaper configured to be situated at least partially in front of the user's mouth and/or nose. The method may further comprise decoupling the shaper from the first set of one or more shaper engagement features and coupling the shaper to a second set of one or more shaper engagement features at the inner frame. The second set of one or more engagement features may be situated distal from a midsection of the shaper relative to the first set of one or more engagement features. The second set of one or more engagement features may be situated proximal to a midsection of the shaper relative to the first set of one or more engagement features. The shaper may comprise at least one arm extending towards the inner frame. The shaper may have a generally conical form in which a midsection of the shaper extends away from the inner frame. The midsection may comprise one or more elongate appendages extending around one or more apertures.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DETAILED DESCRIPTION

Figure 1B:
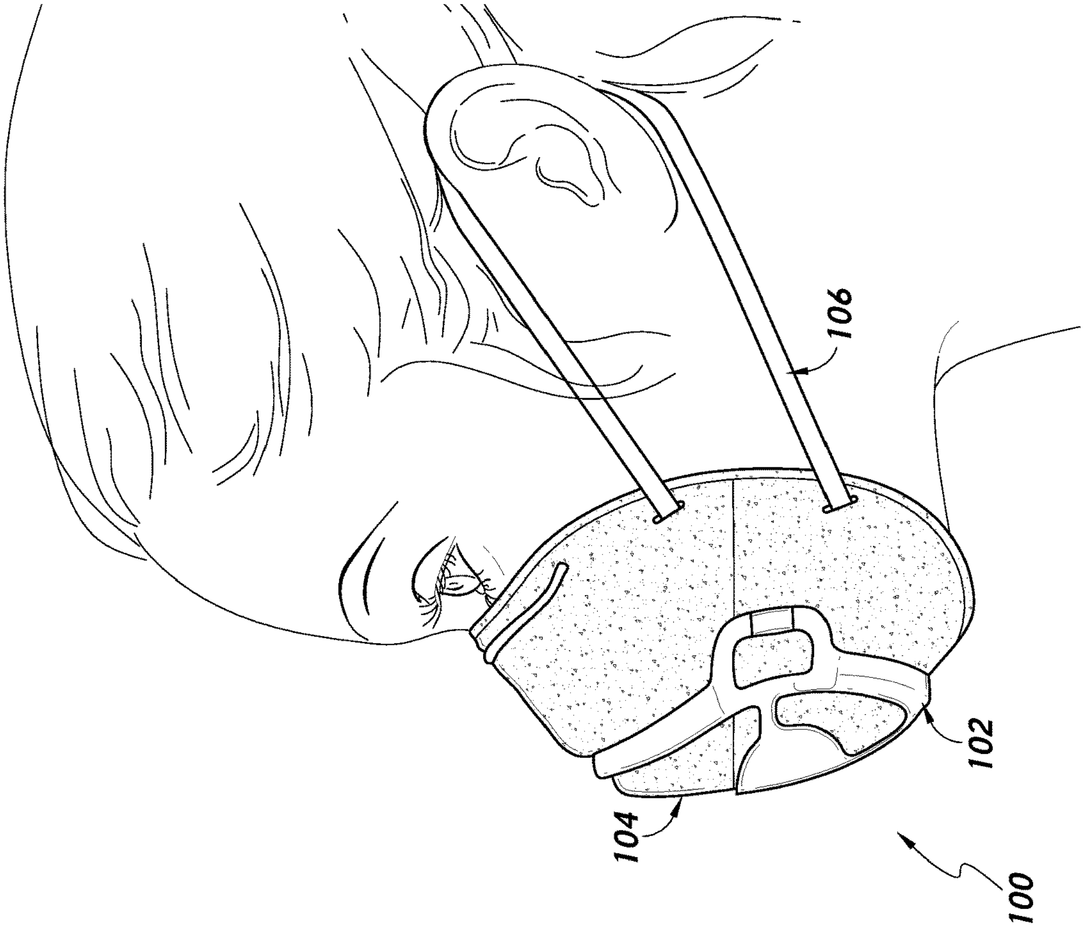
FIGS. 1A and 1B illustrate a user wearing example facial covering assemblies configured to protect and/or cover at least a portion of a user's facial area in accordance with one or more embodiments.

The headings provided herein are for convenience only and do not necessarily affect the scope or meaning of the claimed invention. Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

The present disclosure relates in general to personal protective equipment and more particularly to face shields. Simple cloth masks, described by the Journal of the American Medical Association as a "glorified handkerchief tied around the face of the doctor," were designed, primarily, to protect patients from what was then called "droplet infection," or the invisible, potentially virus and/or bacteria-carrying moisture emanating from the mouth or nose of physicians. Over the intervening century, personal protection equipment (PPE) masks have become standard issue for health care professionals in the workplace. Yet, as seen with the Spanish flu pandemic of 1918, where nurses and doctors joined the ranks of the 22 million Americans (675,000 of whom died) afflicted by the disease, fabric masks offered only limited protection, especially against a truly aggressive virus, including COVID-19. Global vaccination takes time based on past pandemic vaccine distribution and increase of population by 300% since previous pandemics, experts indicated "typically there is a lag of up to seven years before developing countries have access to a new vaccine. In addition, vaccinated people could still carry and spread the virus and will still need to wear masks."

Improved mask protection is an important part in the battle against viruses, including virus variants, because they decrease transmission by reducing the number of infectious particles spread by a mask wearer (known as "source control"). In the case of COVID-19, Dr. Chiu and Dr. Fauci warn of spike protein mutation that could interfere with a vaccine's efficacy and could also pose a threat to COVID-19 antibody drugs.

In some cases, variants of COVID-19 are even more easily transmitted than COVID-10 itself. Accordingly, the distribution of higher quality masks with functional kits improving the filtration and/or seal around the mask as well as a better fitting for comfort are of increasing importance. Described herein are devices, systems, and/or kits that can advantageously convert PPE medical-grade masks to increase filtration, comfort, and/or filter protection, and/or provide an airtight seal. High-quality masks and/or functional conversion kits can be of importance in the battle against viruses and/or virus variants because they can advantageously decrease transmission and/or improve filtration and/or comfort.

Due in some part to facial features differing from person-to-person, some currently available PPE masks may be unable to customize an optimal seal between the wearer's face and mask, causing air gaps. Given that air will travel where there is the least resistance, air will tend to pass through open air gaps as opposed to a mask filtration area. Some medical-grade masks can be above 90% in filtering viruses, including COVID-19. However, if a mask seal is not optimal, filtration can be compromised regardless of filtration rating.

"Surgical masks will not prevent your acquiring diseases," said Dr. William Schaffner, medical director of the National Foundation for Infectious Diseases. Rather, he explained, such masks are most often manufactured as a loose, flat material and/or may not be fitted to the face. In other words, spaces and gaps form around the cheeks and edges of the mouth, making it easy for air to drift in and out. More to the point, according to May Chu, a clinical professor of epidemiology at the Colorado School of Public Health, a surgical mask can filter approximately 70 percent of the outside air, while approximately 30 percent can travel directly to the nose and mouth around the sides of the mask. In other words, surgical masks offer approximately 70 percent protection to the wearer.

Dr. Schaffner further stated that N95 respirators are more effective, filtering out 95 percent of particles. However, he notes that nonmedical professionals using this kind of mask are unlikely to wear it correctly, reducing the seal around the noise and mouth. Moreover, N95s can make it more difficult for the wearer to breathe, thus adding to the discomfort of wearing them mask. In fact, the United States Food and Drug Administration (FDA) cautions people with chronic respiratory, cardiac, or other medical conditions to check with their health care provider before using an N95 face mask. Further, N95s are not designed for people with facial hair or for children.

In a Duke University study, KN-95 and N-95 were determined to be the most effective face mask, with surgical masks being the second-best face mask. The primary material in N95, FFP, KN95 and surgical mask is melt-blown polypropylene material. The primary reason the surgical mask rated second best is that its loose manufactured flat design and lack of rigid material layering minimize the seal around the wearer's mouth and noise. The cost increase of N-95 masks compared to surgical masks can be 1500% to 3000% due to additional machine manufacturing requirements.

Embodiments described herein can advantageously convert a loose and/or flat surgical mask to mold the surgical mask close to a desirable tight shape (e.g., the shape of an N-95 face mask). Moreover, a surgical mask and/or other masks can be customized to a user's facial features, thereby increasing the seal of the mask to be more effective than most masks. Mask conversion can reduce the breathing difficulty of molding material and associated costs. Moreover, supply for N-95 mask can be low in some cases due to limited machine availability, high manufacturing costs, and/or demand. Surgical mask supply, on the other hand, can be higher due to lower cost of manufacturing machines.

Experts have recommended to President Biden's COVID-19 task team of experts to implement to the entire USA population a high-filtration mask and also some a kit that can "help with the fit of other masks, which will increase comfort, washable, reusable, well-fitting and it should allow people to use other filters for higher-risk situations."_The PPE challenge faced globally today includes a shortage of melt-blown fabrics (which are critical components of the surgical, N95 and FFP mask), a lack of ergonomic comfort, limited converting capacity, and unreliable quality certification. The face masks and/or face mask conversion systems described herein can significantly enhance quality certification, comfort, and converting capacity. The PPE market for the general public is a new area for mask manufacturers.

Melt-blown mask material generally has no cushioning airtight seal. As a result, greater strap tightness and/or more material covering the face may generally be required to create a partial seal. Embodiments described herein advantageously provide one or more air-cushioning seals (e.g., sixteen air-cushioning seals in some embodiments) that can provide pillow-like comfort. Air cushions can conform to any individual's facial area, resulting in increased comfort and an airtight seal. Facial protection for medical workers and laypeople in a potentially virus-contaminated environment falls into three major categories: face masks, face shields, and goggles. Surgical masks and N95 respirators are two well-known types of medical face masks. Surgical masks can be made from disposable fluid-resistant material and can protect the wearer from large forward droplets, splashes, or sprays of hazardous fluid. Originally designed for sterile medical operating room environments in which a surgeon's main concern forward air flow as opposed to side air flow and/or inhaling operating room filtered air. New studies and experts indicate that wearing a surgical mask in a non-sterile room containing virus-infected aerosols can provide little protection from inhalation of virus aerosols.

Surgical masks can provide some protection to others from the wearer's respiratory emissions. However, due at least in part to surgical masks being somewhat loose-fitting and/or not forming a tight seal with the wearer's face, surgical masks may not offer adequate protection from incoming small aerosols. N95 respirators can be tighter than surgical masks and may be made from a disposable material that can filter out smaller airborne particles. When properly fitted, respirators can be more effective than surgical masks at protecting the wearer from incoming virus particles. However, respirators can impede the wearer's breathing and thus may be unsuitable for those with chronic respiratory, cardiac, and/or other medical conditions. In addition, N95 respirators were designed for short-term use by professional medical and hazardous workers, requiring extreme tight-fitting use for a few hours at a time as opposed to longer (e.g., all-day) use. Moreover, in times of pandemic, surgical masks and N95 respirators may be in short supply and/or may be limited to use only by medical professionals. Laypeople may be required to rely on fabric masks, which can be considerably less effective than either surgical masks or N95 respirators at filtering out virus-laden aerosols. Still other shortcomings of some face masks can include virus droplet accumulation in face mask filters, which can increase the chances of contamination when the filter is touched. In addition, none of the above-described face masks provide eye protection, requiring users to wear goggles in addition to a mask.

Conventional face shields can be non-porous, making them effective at stopping droplets and aerosols coming from directly in front of or behind the shield. However, some face shields may be unable to stop contaminated air from traveling around the shield and/or entering or exiting the wearer's facial area from above, below, or the sides. As a result, conventional face shields may not generally be used alone, but may be worn in conjunction with a mask and/or goggles.

Multiple barriers may be needed for resisting the flow of contaminated air. However, some surgical masks, N-95 respirators, and/or face shields may be designed to provide only a single barrier. Furthermore, such protective equipment does not generally include sensors for tracking motion data and/or recording metrics about individual wearers or groups of wearers, much less offer user-to-user communication.

Embodiments described herein provide conversion of masks and/or provide mask conversion kits that can advantageously improve mask duration (e.g., by approximately 300% to 900%) compared un-converted masks. In some cases, mask durability and/or duration can be improved by protecting an inner and/or outer center of a mask filtration area and/or through use of airtight cushion seals. Generally, face masks (including melt-blown masks) can deteriorate quickly when exposed to increased moisture contamination emanating from the user's mouth, which can collect particularly around the center of the mask. In some cases, masks may require daily replacement. Some embodiments described herein can involve providing a protective inner and/or outer barrier that can prevent user and/or environmental contamination of the mask filtration area. In some embodiments, protective seals and/or barriers can enable a majority of air (e.g., from the user's mouth and/or nose) to enter and/or exit the filtration area of a mask, as opposed to the gaps which can form around masks with no filtration.

PPE quality certification of melt-blown mask filtration is high, but may generally be lower in addressing airtight seal capability, ergonomic comfort, and/or mask-material protection. Some embodiments described herein involve face masks having multiple (e.g., two) combined seal filtration units and/or an oxygen filtration enhancement unit. Such face masks can significantly increase air seal effectiveness and comfort of various masks, including N95, FFP, KN95 and surgical melt-blown masks, thus resulting in higher certification.

Some embodiments involve conversion and/or transformation of various filtering sheets and/or elements, including fabric, FFP, KN95 and/or N95 face masks, among others, into more effective, airtight, easier-to-breathe, form-fitting and/or comfortable face shields. The term "filtering sheet" is used herein in accordance with its plain and ordinary meaning and may refer to any mask (including face masks), cloth, sheet, wrap, covering, pad, and/or similar device configured to at least partially block, impede, and/or filter various gases, liquids, and/or solids at or near a user's face and/or head. A filtering sheet can be composed of various materials, which can include cloths, woven and/or non-woven fabrics, polyester, nylon, and/or natural and/or synthetic fibers. In some embodiments, a filtering sheet may be generally flat and/or may be at least partially flexible to conform to a user's face and/or components of a facial assembly. A filtering sheet may comprise pleats, folds, stitches, clips, cells, and/or other features. In some embodiments, a filtering element may comprise one or more user attachment features (e.g., ear loops). Conversion of such filtering elements can involve conversion devices which can advantageously be manufactured using available injection molding techniques and/or recycled plastic. A filtering sheet may include any device and/or material configured for placement and/or filtering between components of a facial covering assembly as described herein.

Example facial mask conversion systems and devices can involve integrated multi-airtight cushioning seals, one or more airflow filtration enhancement units with inner protective seals, mask molding frames and/or various attachments, primary attachment secondary seal clip tri-filtration units, reusable ear frames, ear loop adjustable units, and/or and eyewear connections.

The facial masks and/or converted facial masks described herein may advantageously be configured to reduce airflow around PPE masks through use of thermodynamic airflow models. Such masks can provide an inner mask vacuum in which ambient air and/or outer air may be greater than the inner mask. A multi-air seal design as described herein can comprise of one or more cell air pockets separated by rib dividers that can conform to facial features for an improved airtight fit. Moreover, some embodiments can provide airflow filtration enhancement base units to seal air. Facial covering assemblies described herein may be configured to provide a counter-reaction seal over at least a portion of a user's facial area. In some embodiments, facial covering assemblies (including converted face masks) may be configured to effectively conform to a user's face. A facial covering may comprise one or more air pockets (e.g., sixteen air pockets separated by columns and/or ribs) to allow the facial covering to form an airtight seal over a user's face.

Certain drawbacks related to some face masks including surgical-type masks can include that at least a portion of the facial mask can be positioned in contact with and/or proximate to a user's mouth and/or nose while in use and/or can create various gaps between the user's face and the mask through which air can escape. Some facial masks, including M95 masks, can be manufactured via a machinery process to form a conical shape to form a separation between the facial mask and the user's face to improve a seal between the facial mask and the user's face. However, such masks can not only be associated with added costs but can also still be ineffective at establishing a complete seal with a user's face.

Some embodiments described herein can utilize a frame and/or related systems which, when utilized in combination with various facial masks, can effectively create a separation between the facial masks and the user's face without requiring the facial mask to have a pre-formed conical and/or similar shape. Moreover, the frame and/or related systems can effectively provide an improved seal on a user's face compared to the facial mask being used independently.

Figure 1A:
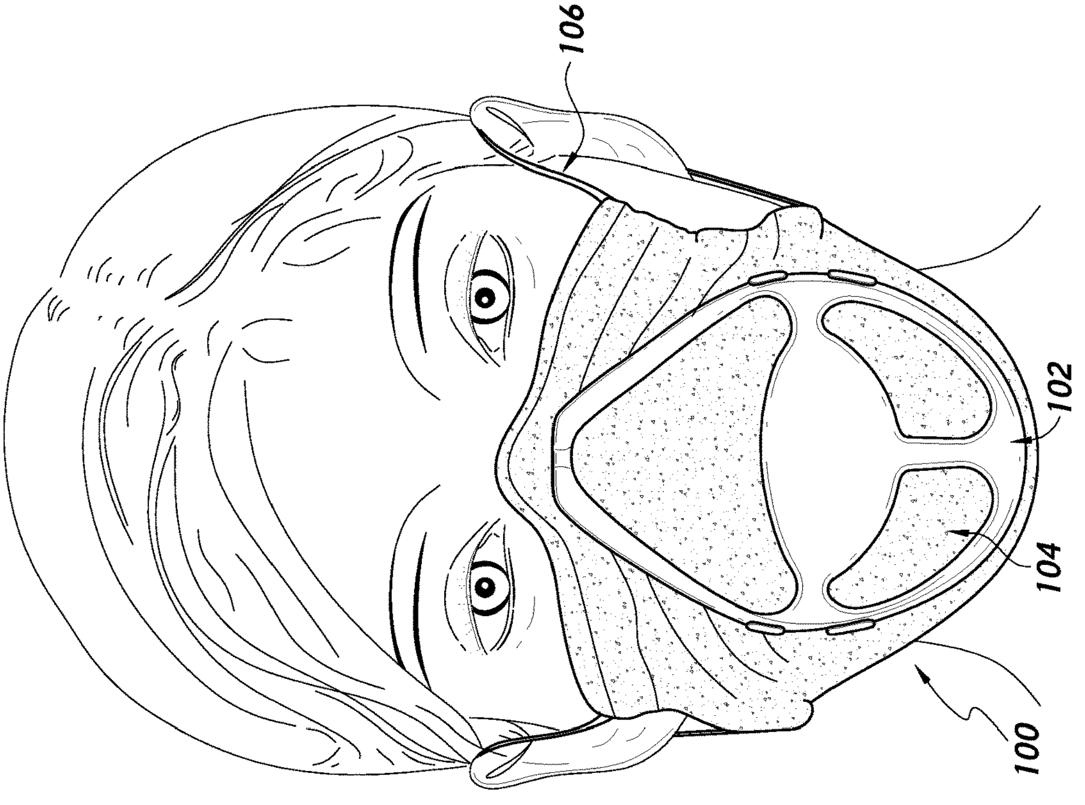

FIGS. 1A and 1B illustrate a user wearing example facial covering assemblies 100 configured to protect and/or cover at least a portion of a user's facial area (which can include at least portions of the user's mouth, nose, eyes, and/or nearby areas including the user's neck and/or other portions of the user's head). The facial covering assemblies 100 described herein can comprise a frame 102 (which can comprise multiple components), one or more filtering portions 104, and/or one or more attachment features 106 configured to affix and/or hold the facial covering assemblies 100 at a desired position at the user's facial area. In some embodiments, the attachment features 106 can include flexible and/or elastic straps forming a loop configured to fit at least partially around a user's ear. However, attachment features 106 can have any of a variety of forms, including one or more generally rigid and/or flexible arms.

In some embodiments, the frame 102 may be configured to maintain at least partial separation between the user's nose and/or mouth and the one or more filtering portions 104. The frame 102 may be configured to be positioned such that the frame 102 and/or one or more filtering portions 104 covers at least a portion of the user's nose and/or mouth while maintaining a seal (e.g., an airtight seal) around the user's nose and/or mouth. In some embodiments, the frame 102 may be configured to hold the one or more filtering portions 104 in a generally parallel orientation with respect to the user's face and/or mouth.

The one or more filtering portions 104 may be at least partially composed of one or more materials configured to filter moisture droplets and/or various contaminants. For example, the one or more filtering portions 104 may be at least partially composed of melt-blown and/or polypropylene materials and/or fibers. In some embodiments, the frame 102 may be configured to tighten the one or more filtering portions 104 to maximize the effectiveness of the one or more filtering portions 104. The frame 102 may further be configured to provide increased separation between the one or more filtering portions 104 (which can include face masks which may be used independently of the frame 102) and/or the user's mouth and/or nose. For example, face masks used independently can have thirty to sixty percent contact between the face mask and the user's face, which can limit the amount of the face mask that is available for filtering. Moreover, increased facial contact between the face mask and the user's face can increase a rate of breakdown of the face mask, which can involve material breakdown, moisture accumulation, and/or odor. In contrast, the facial covering assemblies 100 can create approximately ten percent contact or less between the one or more filtering portions 104 (e.g., face mask) and the user's face. For example, the one or more filtering portions 104 may be configured to contact the user's face only at an inner edge of the frame 102 and/or inner frame. In this way, the one or more filtering portions 104 may more effectively filter air and/or may break down more slowly than face masks used independently.

Figure 2A:
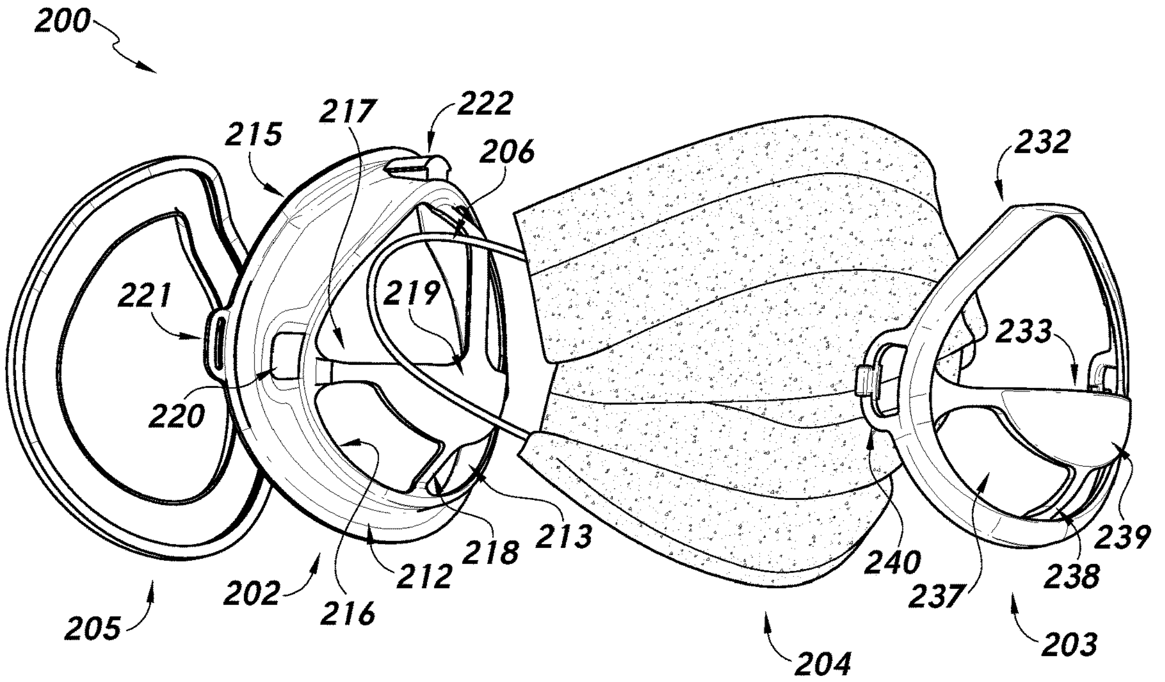
FIGS. 2A and 2B provide illustrations of example facial covering conversion systems in accordance with one or more embodiments.
Figure 2B:
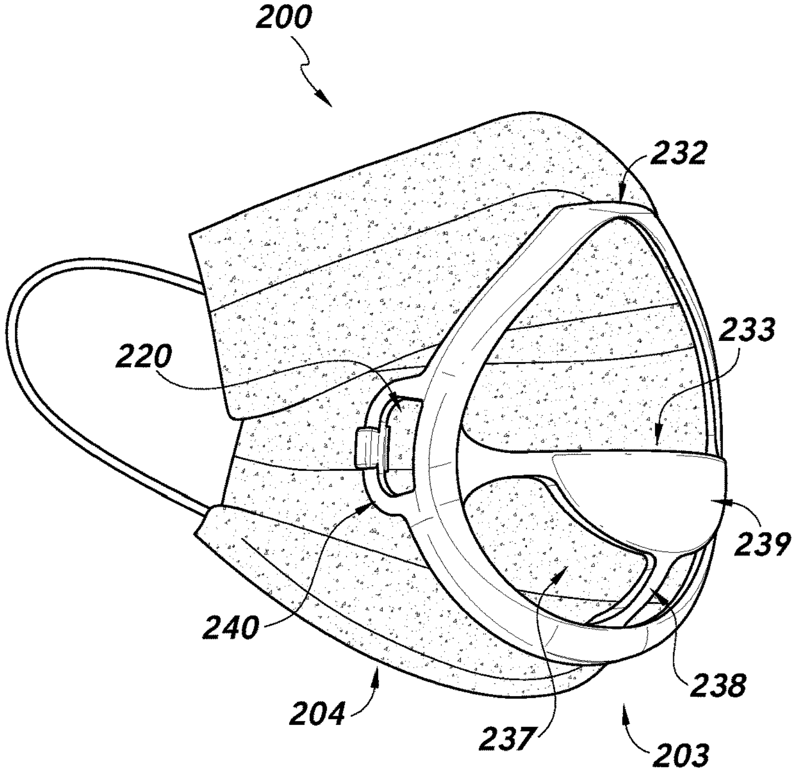

FIGS. 2A and 2B provide illustrations of example facial covering conversion systems 200. FIG. 2A provides a deconstructed view of the facial covering conversion system 200 and FIG. 2B provides an assembled view of the facial covering assembly 200. Some facial covering assemblies 200 may utilize an independent and/or separate face mask 204 and/or filtering device. Suitable face masks 204 can include surgical masks, among many others. In some embodiments, the face mask 204 may comprise one or more attachment features 206 (e.g., elastic bands) configured for attachment to a user's face and/or head (e.g., a user's ears). In some embodiments, multiple face masks 204 and/or portions of multiple face masks 204 may be incorporated into the facial covering assembly 200.

The facial covering conversion system 200 can comprise a frame, which can include an inner frame 202 (i.e., inner frame portion) and/or an outer frame 203 (i.e., outer frame portion). The inner frame 202 may be configured to serve as an air flow filtration enhancement unit and/or the outer frame 203 may be configured to serve as an airtight tri-filtration seal. In some embodiments, the face mask 204 may be configured to be situated at least partially between the inner frame 202 and the outer frame 203. The inner frame 202 and/or outer frame 203 may be configured to provide a generally rigid and/or stable support for the face mask 204. For example, the inner frame 202 and/or outer frame 203 may be at least partially composed of plastic, metal, and/or other generally rigid materials. In some embodiments, the inner frame 202 and/or outer frame 203 may be configured to maintain at least partial separation between at least a portion of the user's face (e.g., the user's nose and/or mouth) and at least a portion of the face mask 204 (e.g., a central portion of the face mask 204).

In some embodiments, the inner frame 202 may comprise a first sealing portion 212 and/or a first conical portion 213. The first sealing portion 212 may comprise a generally oval-shaped frame configured to form a complete oval (e.g., circle) and/or loop around at least a portion of a user's face (e.g., around at least a portion of the user's nose and/or mouth). In some embodiments, the first sealing portion 212 may be configured to completely surround at least the user's mouth and/or nostrils. The first sealing portion 212 may be configured to facilitate and/or create a complete and/or airtight seal around at least a portion of the user's face.

The first sealing portion 212 may have any suitable width and/or may be configured to extend generally away from a user's face when the inner frame 202 is positioned on the user's face. For example, the first sealing portion 212 may comprise an inner edge 215 and/or an outer edge 216 and/or the width may represent a distance between the inner edge 215 and the outer edge 216. The inner edge 215 may be configured to be situated nearer the user's face than the outer edge 216 when the inner frame 202 is positioned on the user's face.

The first conical portion 213 may extend from at least a portion of the first sealing portion 212 and/or may be configured to be attached to at least a portion of the first sealing portion 212. The first conical portion 213 may have a generally convex form when viewed from the outside and/or may be configured to extend away from the user's face when the inner frame 202 is positioned on the user's face. The first conical portion 213 may comprise one or more apertures 217 configured to allow air flow through the inner frame 202, first sealing portion 212, first conical portion 213, and/or one or more apertures 217. The first conical portion 213 may comprise a network of one or more appendages 218 configured to extend between the first sealing portion 212 and a midsection 219 of the first conical portion 213. While the first conical portion 213 is shown in FIG. 2A comprising four appendages 218 forming four apertures 217, the first conical portion 213 may comprise any number of appendages 218.

In some embodiments, the midsection 219 may be configured to be positioned at least partially in front of at least a portion of a user's mouth and/or nostrils when the inner frame 202 is positioned on the user's face. The midsection 219 may have any suitable form and/or may comprise a generally ovular, semi-ovular, and/or other shape. The midsection 219 may advantageously be configured to be positioned in front of and/or across from the user's mouth and/or nostrils to prevent moisture droplets from the user's mouth and/or nostrils from contacting and/or saturating the face mask 204. In some cases, dampening and/or saturation of a face mask 204 can decrease effectiveness of the face mask 204 in providing filtration.

The inner frame 202 and/or first sealing portion 212 may comprise one or more attachment features, which can include an outer frame attachment feature 220 and/or a user engagement attachment feature 221. The outer frame attachment feature 220 may be configured to mate with a corresponding inner frame attachment feature 240 at the outer frame 203. For example, the outer frame attachment feature 220 can comprise a notch, peg, hook, and/or similar mechanism configured to mate with the inner frame attachment feature 240. The user engagement attachment feature 221 may be configured to mate with a corresponding user engagement feature, which can include various straps, arms, and/or other features configured to form an attachment to a user's ears and/or other portions of the user's head.

In some embodiments, the inner frame 202 and/or first sealing portion 212 may comprise an eyewear mount 222, which may be situated at or near an upper portion of the first sealing portion 212. For example, the eyewear mount 222 may be configured to be situated at or near a highest point of the inner frame 202 when the inner frame 202 is positioned on a user's face. The eyewear mount 222 may be configured to mate with various eyewear and/or eyewear attachment mechanisms. For example, the eyewear mount 222 can comprise one or more pegs, clips, notches, and/or other features configured to receive and/or form an attachment with eyewear and/or eyewear clips.

The inner frame 202 may be configured to reduce facial contact between the face mask 204 and the user's face by approximately ninety percent and/or may be configured to increase a filtration surface area of the face mask 204 by over four hundred percent.

The outer frame 203 may comprise a second sealing portion 232 and/or a second conical portion 233. The second sealing portion 232 may be configured to form a complete oval (e.g., circle) and/or loop around at least a portion of the face mask 204 and/or inner frame 202. In some embodiments, the second sealing portion 232 may be configured to completely surround at least the midsection 219 and/or the first conical portion 213. The second sealing portion 232 may be configured to facilitate and/or create a complete and/or airtight seal around at least a portion of the user's face.

The second conical portion 233 may extend from at least a portion of the second sealing portion 232 and/or may be configured to be attached to at least a portion of the second sealing portion 232. The second conical portion 233 may be configured to approximate and/or match a curvature and/or shape of the first conical portion 213 such that the first conical portion 213 and the second conical portion 233 may be configured to be situated in close proximity to each other along an entire length of the second conical portion 233 when the inner frame 202 is mated to the outer frame 203. For example, the second conical portion 233 may be configured to extend away from the user's face when the outer frame 203 is positioned on the user's face. The second conical portion 233 may comprise one or more apertures 237 configured to allow air flow through the outer frame 203, second sealing portion 232, second conical portion 233, and/or one or more apertures 237. The one or more apertures 237 of the second conical portion 233 may be equally sized to the one or more apertures of the first conical portion 213 and/or may be configured to be situated in-line with the one or more apertures of the first conical portion 213 when the inner frame 202 is mated to the outer frame 203. The second conical portion 233 may comprise a network of one or more appendages 238 configured to extend between the second sealing portion 232 and a midsection 239 of the second conical portion 233. The one or more appendages 238 may match and/or approximate the one or more appendages 218 of the first conical portion 213. While the second conical portion 233 is shown in FIG. 2A comprising three appendages 238 forming three apertures 237, the second conical portion 233 may comprise any number of appendages 238.

In some embodiments, the midsection 239 may be configured to be positioned at least partially in front of at least a portion of a user's mouth and/or nostrils when the outer frame 203 is positioned on the user's face. The midsection 239 may have any suitable form and/or may comprise a generally ovular, semi-ovular, and/or other shape. In some embodiments, the midsection 239 of the outer frame 203 may be similarly sized and/or shaped to the midsection 219 of the inner frame 202. The midsection 239 may advantageously be configured to be positioned in front of and/or across from the user's mouth and/or nostrils to prevent contact between at least a portion of the face mask 204 (e.g., a portion of the face mask 204 that is positioned nearest the user's mouth and/or nose when worn by the user) and potentially contaminated surfaces (e.g., when the facial covering conversion system 200 is removed from the user's face and/or placed on a surface).

The outer frame 203 and/or second sealing portion 232 may comprise one or more attachment features, which can include an inner frame attachment feature 240. The inner frame attachment feature 240 may be configured to mate with a corresponding outer frame attachment feature 220 at the inner frame 202. For example, the inner frame attachment feature 240 can comprise a notch, peg, hook, and/or similar mechanism configured to mate with the outer frame attachment feature 220, which can comprise a corresponding notch, peg, hook, and/or similar mechanism. The inner frame attachment feature 240 can comprise a curved clip extending generally perpendicularly from the second sealing portion 232 and/or around a generally oval-shaped and/or rectangular opening through which the outer frame attachment feature 220 can pass. The outer frame attachment feature 220 can comprise a generally rectangular notch extending away from the first sealing portion 212 and/or forming a lip configured to hook through the opening of the inner frame attachment feature 240. The face mask can be sandwiched between the inner frame attachment feature 240 and the outer frame attachment feature 220.

The outer frame 203 may be configured to create a second seal (with the inner frame 202 and/or cushioning element 205 forming a first seal) and/or multiple filtration areas to provide approximately ninety-five to ninety-nine percent filtration air flow through the outer frame 203.

The facial covering conversion system 200 may further comprise a cushioning element 205 configured to contact at least a portion of a user's face when in use by the user. The cushioning element 205 may be a generally oval-shaped pad, pillow, cushion, brace, guard, and/or other user-facing element configured to contact a user's face. In some embodiments, the cushioning element 205 may have a generally soft and/or squishy structure, however the cushioning element 205 may alternatively have a generally solid and/or rigid structure. The cushioning element 205 may be configured to form a complete oval (e.g., circle) and/or loop around at least a portion of a user's face (e.g., around at least a portion of the user's nose and/or mouth) and/or may approximate and/or match a shape and/or size of the first sealing portion 212 of the inner frame 202. In some embodiments, the cushioning element 205 may be configured to completely surround at least the user's mouth and/or nostrils. The cushioning element 205 may be configured to facilitate and/or create a complete and/or airtight seal around at least a portion of the user's face. In some embodiments, the cushioning element 205 may be configured to couple to and/or otherwise contact the inner frame 202.

In some embodiments, the cushioning element 205 may comprise multiple (e.g., ten) cushioning pillows and/or portions separated by ribs and/or dividers. The multiple cushioning portions may be configured to independently conform to the user's face to improve a seal around at least a portion of the user's face. The cushioning element 205 may be at least partially composed of a generally flexible and/or elastic material to allow the cushioning element 205 to conform to a shape of a user's face while forming an airtight seal between the cushioning element 205 and the user's face. The cushioning element 205 may be configured to permanently or removably attach to the inner frame 202 (e.g., using Velcro and/or other attachment features and/or materials).

FIG. 2B illustrates an assembled facial covering conversion system 200, in which the inner frame attachment feature 240 is mated to the outer frame attachment feature 220. In some embodiments, at least a portion of the face mask 204 may be situated at least partially between the inner frame attachment feature 240 and the outer frame attachment feature 220 when the inner frame attachment feature 240 is mated to the outer frame attachment feature 220, as illustrated in FIG. 2B. As shown in FIG. 2B, one or more portions of the face mask 204 may be exposed through the one or more apertures 237 of the outer frame 203 to allow air flow through the filtering features of the face mask 204.

Figure 3A:
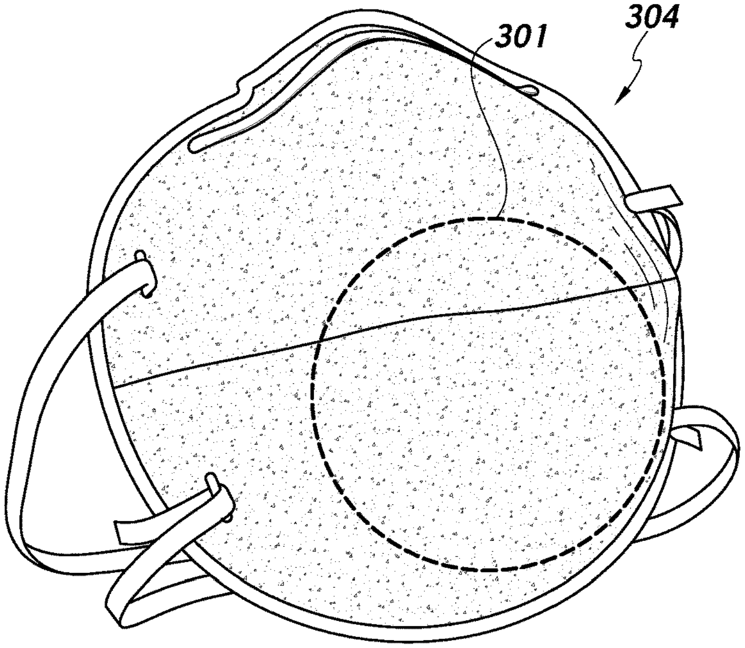
FIG. 3A illustrates an example N-95 1860 face mask which may be converted into a converted facial covering assembly.
Figure 3B:
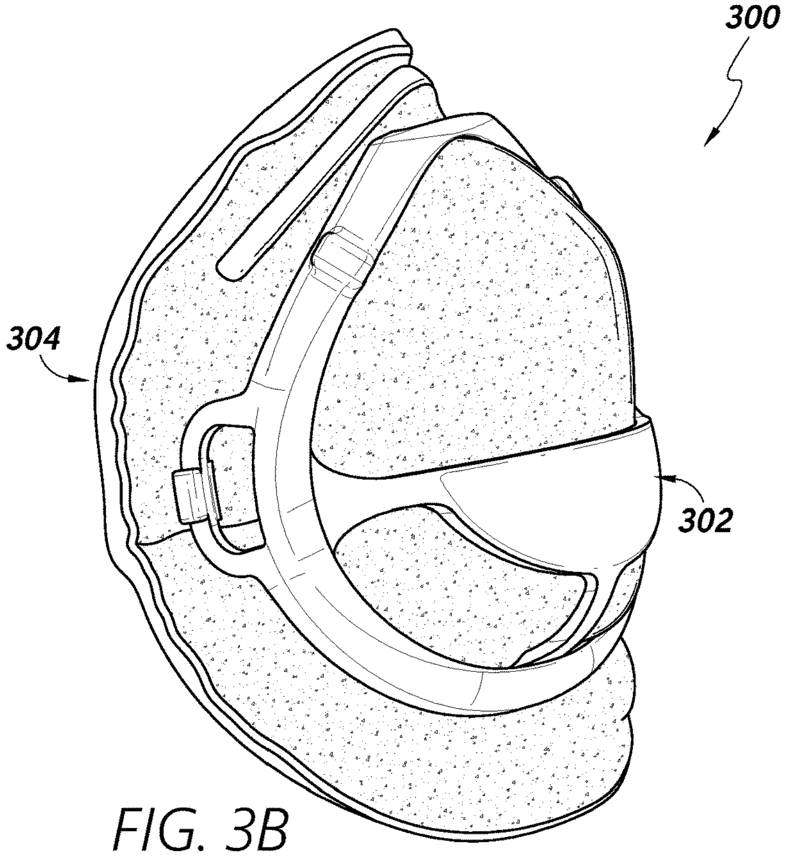
FIG. 3B illustrates a converted facial covering assembly including an example N-95 1860 face mask.

FIG. 3A illustrates an example N-95 1860 face mask 304, which may be converted into a converted facial covering assembly 300, as shown in FIG. 3B. A dashed circle 301 in FIG. 3A identifies a portion of the face mask 304 which may generally be positioned in front of a user's mouth and/or nostrils and/or may be particularly susceptible to contacting the user's mouth and/or nose and/or becoming saturated by moisture. Moreover, the face mask 304, on its own, may be susceptible to leakage of air at edge portions of the face mask 304. The face mask 304 may have a generally soft and/or flexible structure such that the face mask 304, when used independently of other elements of the facial conversion system 300, can be susceptible to collapsing when pressure is applied, which may cause the face mask 304 to contact the user's mouth and/or nose.

As shown in FIG. 3B, the converted facial covering assembly 300 may comprise a frame 302 and/or cushioning element (not shown) which may be configured to create and/or maintain a seal between the converted facial covering assembly 300 and the user's face. The frame 302 may comprise an inner frame (not shown in FIG. 3B; see FIG.

2A) and/or an outer frame. In some embodiments, the frame 302 may be configured to prevent contact between the portion of the face mask 304 identified by the dashed circle 301 and any contaminated surfaces. The frame 302 and/or cushioning element may be configured to create and/or maintain a separation between the portion of the face mask 304 identified by the dashed circle 301 and at least some portions of the user's face (e.g., the user's mouth and/or nose).

Figure 4A:
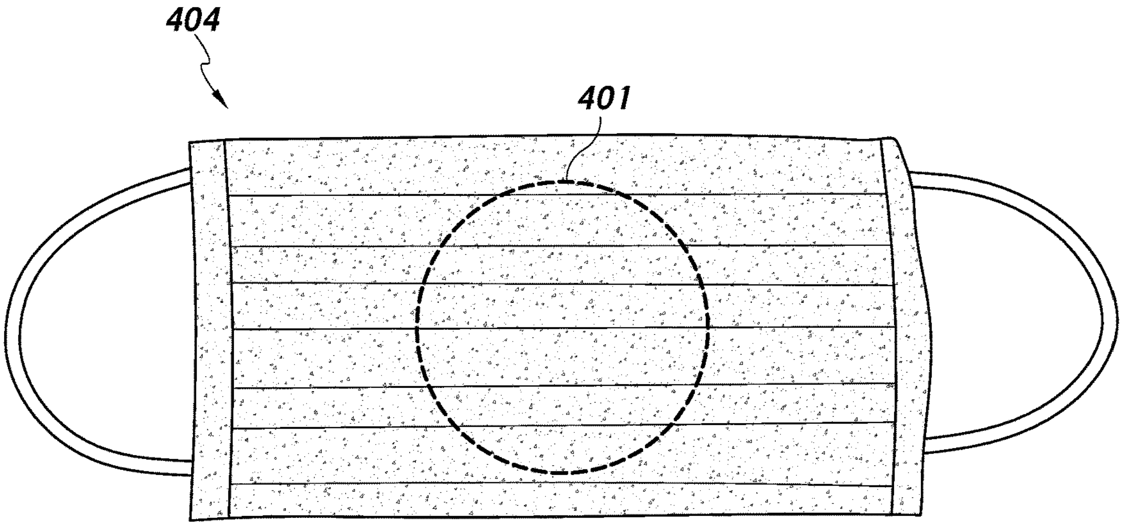
FIG. 4A illustrates an example surgical face mask which may be converted into a converted facial covering assembly.
Figure 4B:
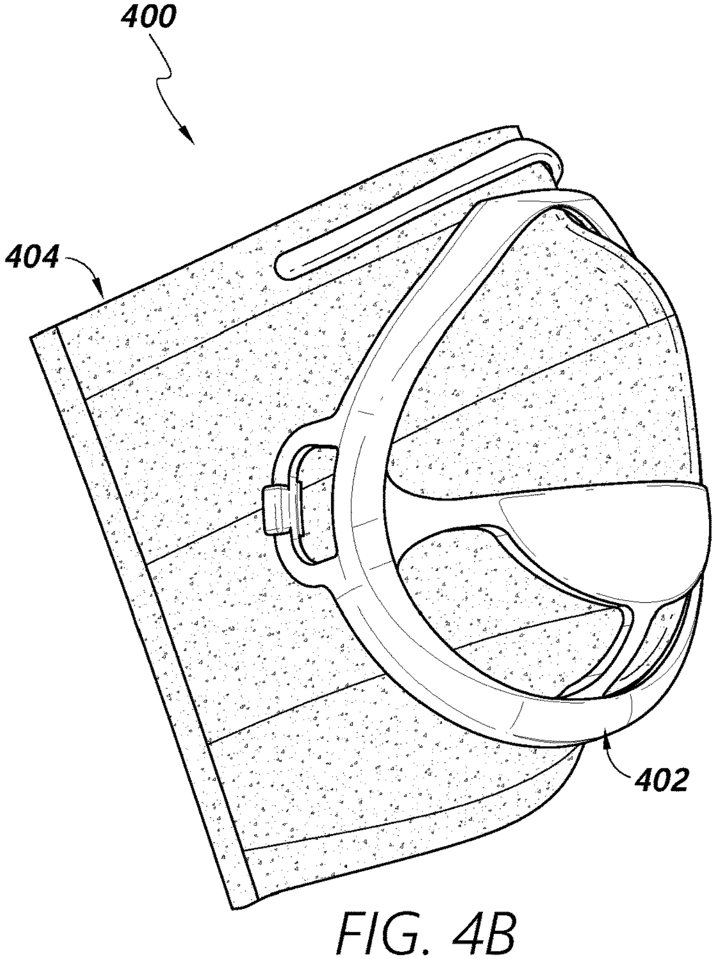
FIG. 4B illustrates a converted facial covering assembly including an example surgical face mask.

FIG. 4A illustrates an example surgical face mask 404, which may be converted into a converted facial covering assembly 400, as shown in FIG. 4B. A dashed circle 401 in FIG. 4A identifies a portion of the face mask 404 which may generally be positioned in front of a user's mouth and/or nostrils and/or may be particularly susceptible to contacting the user's mouth and/or nose and/or becoming saturated by moisture. Moreover, the face mask 404, on its own, may be susceptible to leakage of air at edge portions of the face mask 404.

As shown in FIG. 4B, the converted facial covering assembly 400 may comprise a frame 402 and/or cushioning element (not shown) which may be configured to create and/or maintain a seal between the converted facial covering assembly 400 and the user's face. The frame 402 may comprise an inner frame (not shown in FIG. 4B; see FIG. 2A) and/or an outer frame. In some embodiments, the frame 402 may be configured to prevent contact between the portion of the face mask 404 identified by the dashed circle 401 and any contaminated surfaces. The frame 402 and/or cushioning element may be configured to create and/or maintain a separation between the portion of the face mask 404 identified by the dashed circle 401 and at least some portions of the user's face (e.g., the user's mouth and/or nose).

Figure 5A:
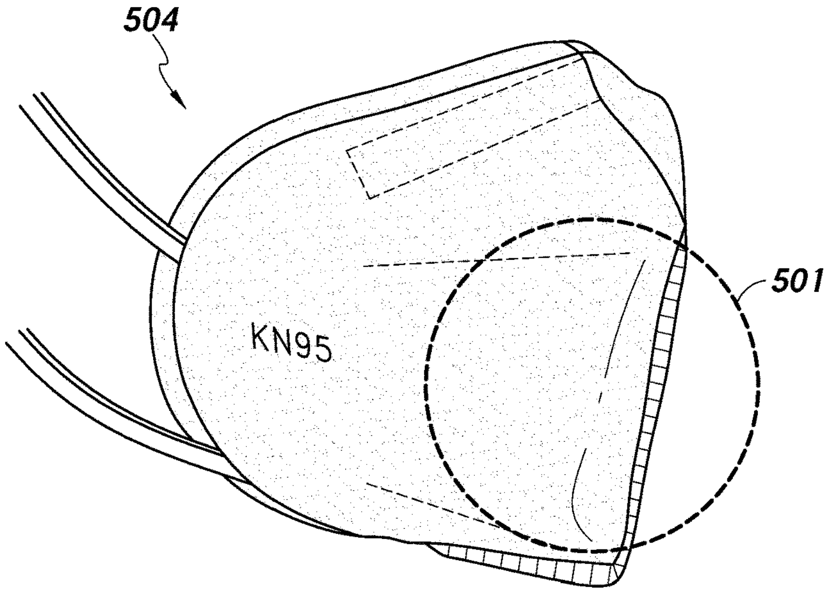
FIG. 5A illustrates an example KN-95/FFP face mask which may be converted into a converted facial covering assembly.
Figure 5B:
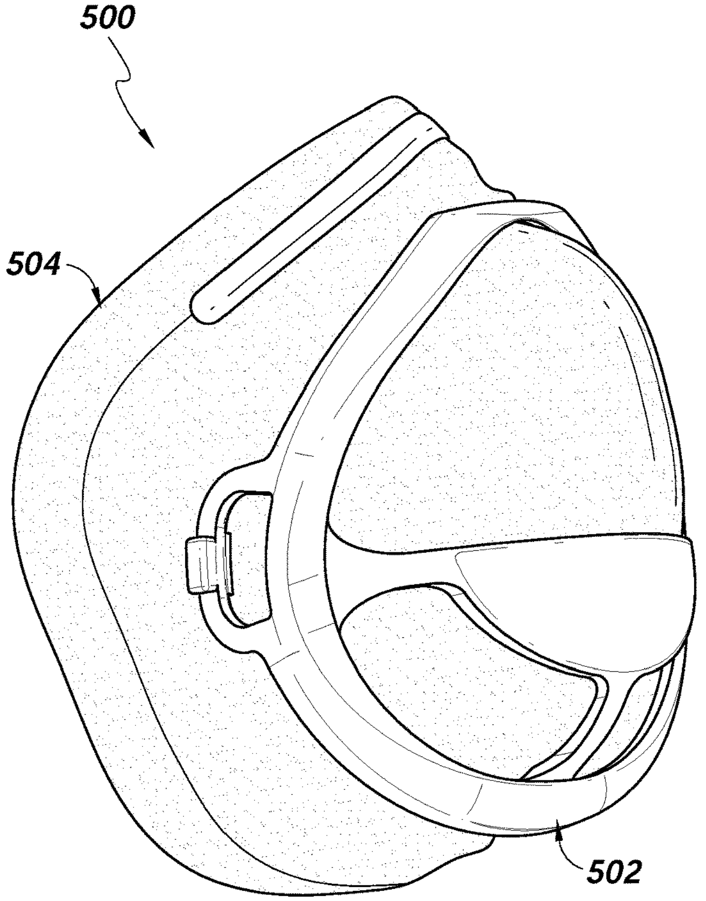
FIG. 5B illustrates a converted facial covering assembly including an example KN-95/FFP face mask.

FIG. 5A illustrates an example KN-95/FFP face mask 504, which may be converted into a converted facial covering assembly 500, as shown in FIG. 5B. A dashed circle 501 in FIG. 5A identifies a portion of the face mask 504 which may generally be positioned in front of a user's mouth and/or nostrils and/or may be particularly susceptible to contacting the user's mouth and/or nose and/or becoming saturated by moisture. Moreover, the face mask 504, on its own, may be susceptible to leakage of air at edge portions of the face mask 504.

As shown in FIG. 5B, the converted facial covering assembly 500 may comprise a frame 502 and/or cushioning element (not shown) which may be configured to create and/or maintain a seal between the converted facial covering assembly 500 and the user's face. The frame 502 may comprise an inner frame (not shown in FIG. 5B; see FIG. 2A) and/or an outer frame. In some embodiments, the frame 502 may be configured to prevent contact between the portion of the face mask 504 identified by the dashed circle 501 and any contaminated surfaces. The frame 502 and/or cushioning element may be configured to create and/or maintain a separation between the portion of the face mask 504 identified by the dashed circle 501 and at least some portions of the user's face (e.g., the user's mouth and/or nose).

Figure 6A:
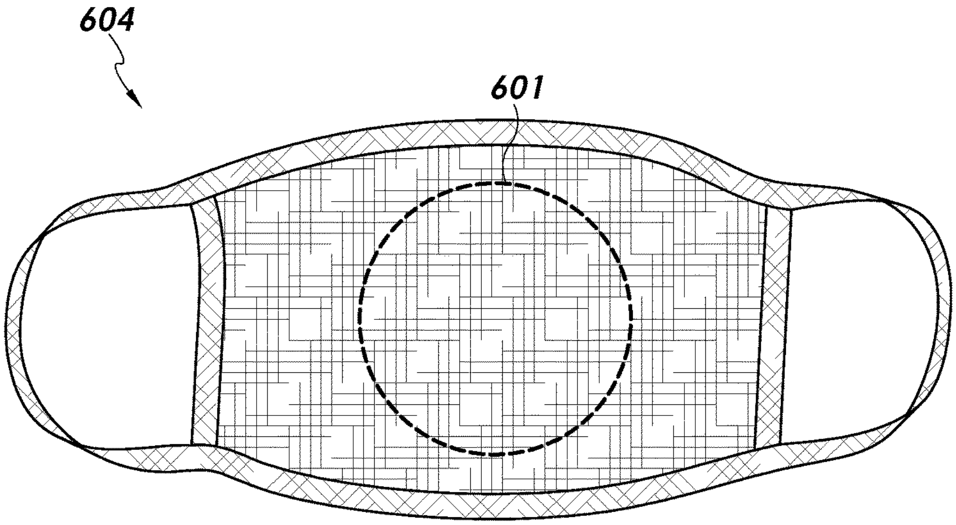
FIG. 6A illustrates an example fabric face mask which may be converted into a converted facial covering assembly.
Figure 6B:
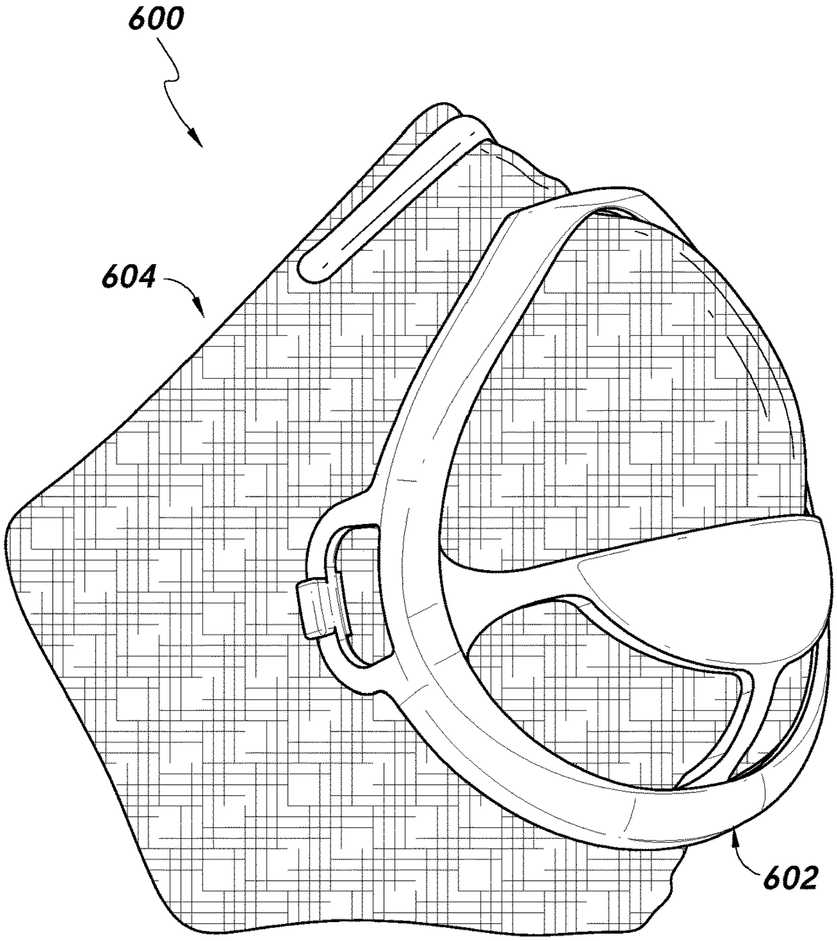
FIG. 6B illustrates a converted facial covering assembly including an example fabric face mask.

FIG. 6A illustrates an example fabric face mask 604, which may be converted into a converted facial covering assembly 600, as shown in FIG. 6B. A dashed circle 601 in FIG. 6A identifies a portion of the face mask 604 which may generally be positioned in front of a user's mouth and/or nostrils and/or may be particularly susceptible to contacting the user's mouth and/or nose and/or becoming saturated by moisture. Moreover, the face mask 604, on its own, may be susceptible to leakage of air at edge portions of the face mask 604.

As shown in FIG. 6B, the converted facial covering assembly 600 may comprise a frame 602 and/or cushioning element (not shown) which may be configured to create and/or maintain a seal between the converted facial covering assembly 600 and the user's face. The frame 602 may comprise an inner frame (not shown in FIG. 6B; see FIG. 2A) and/or an outer frame. In some embodiments, the frame 602 may be configured to prevent contact between the portion of the face mask 604 identified by the dashed circle 601 and any contaminated surfaces. The frame 602 and/or cushioning element may be configured to create and/or maintain a separation between the portion of the face mask 604 identified by the dashed circle 601 and at least some portions of the user's face (e.g., the user's mouth and/or nose).

Figure 7C:
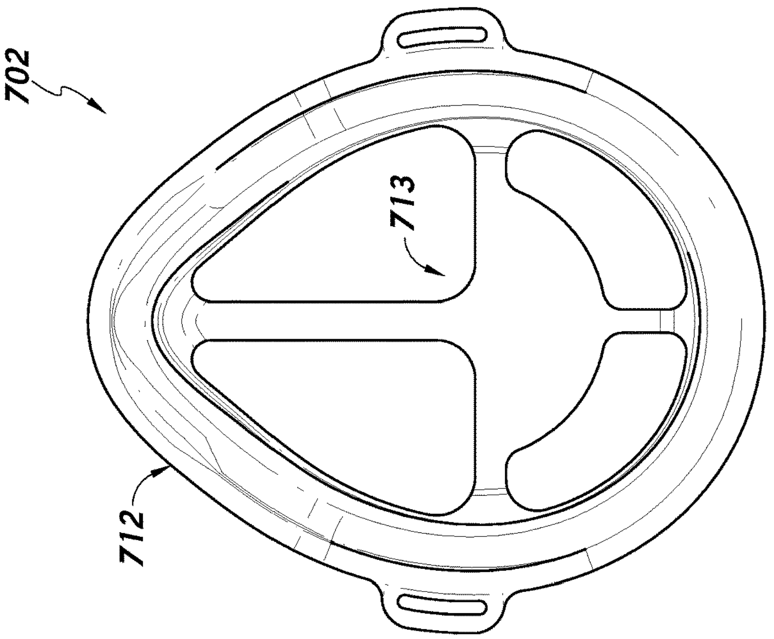
FIGS. 7A-7G provide illustrations of an example inner frame, in accordance with one or more embodiments of the present disclosure.
Figure 7B:
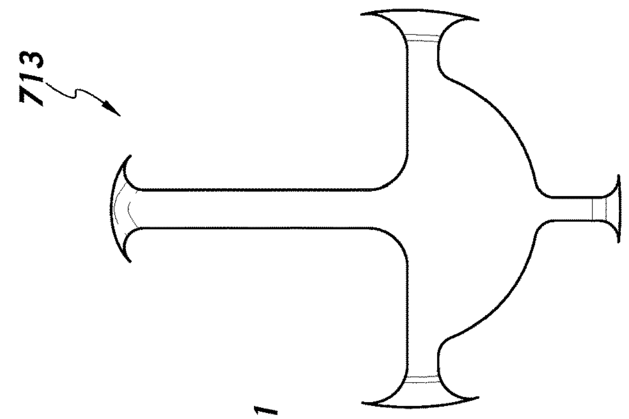
Figure 7A:
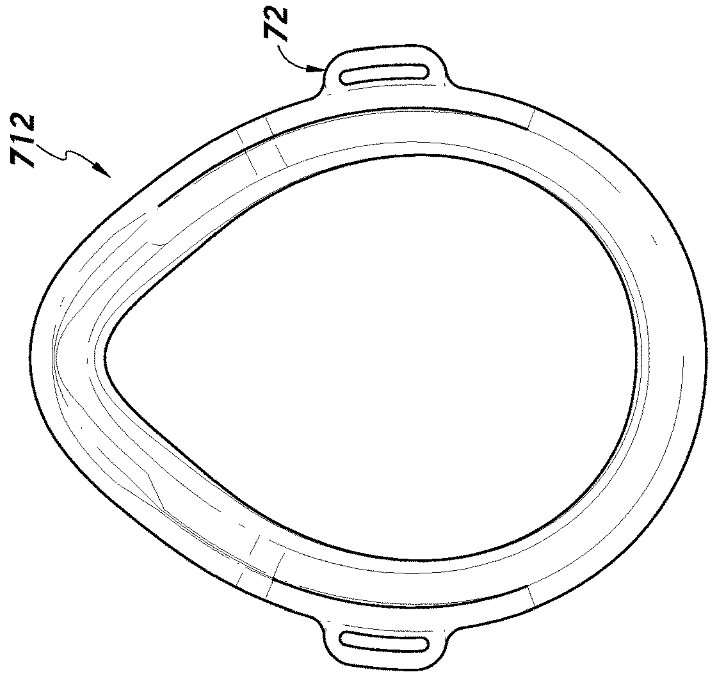

FIGS. 7A-7G provide illustrations of an example inner frame 702, in accordance with one or more embodiments of the present disclosure. FIG. 7A provides a back/inside view of a sealing portion 712 of the inner frame. The sealing portion 712 can comprise one or more user engagement attachment feature 721 configured to mate with various devices for attaching the inner frame 702 to at least a portion of a user's face.

FIG. 7B provides a back/inside view of a conical portion 713 and/or shaper of the inner frame 702. In some embodiments, the conical portion 713 may have a generally concave structure and/or may extend into the page in the view shown in FIG. 7B. FIG. 7C provides a back/inside view of the inner frame 702, comprising the sealing portion 712 and the conical portion 713.

Figure 7F:
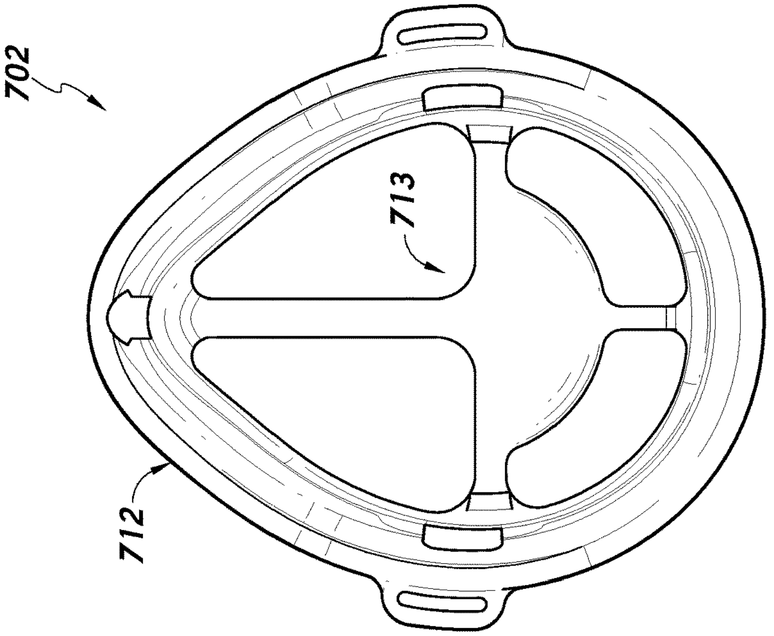
Figure 7E:
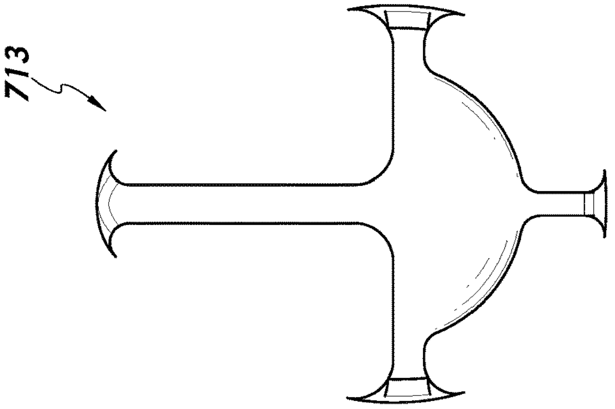
Figure 7D:
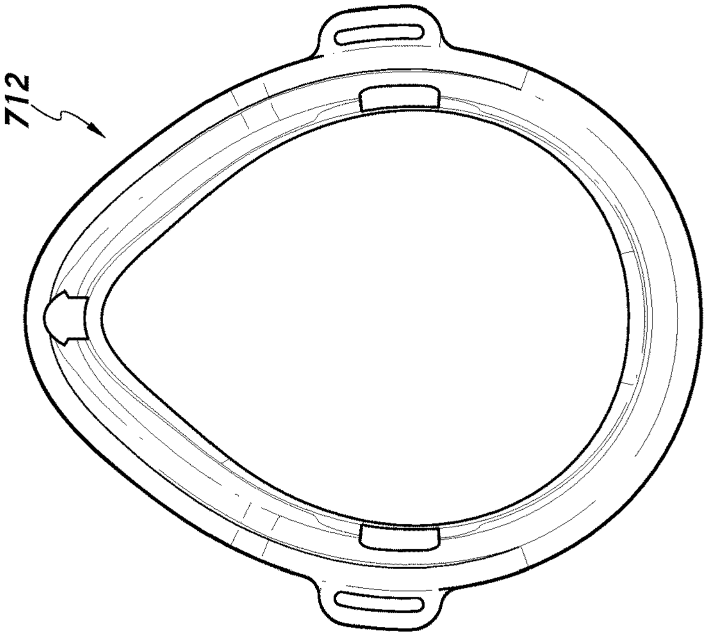
Figure 7G:
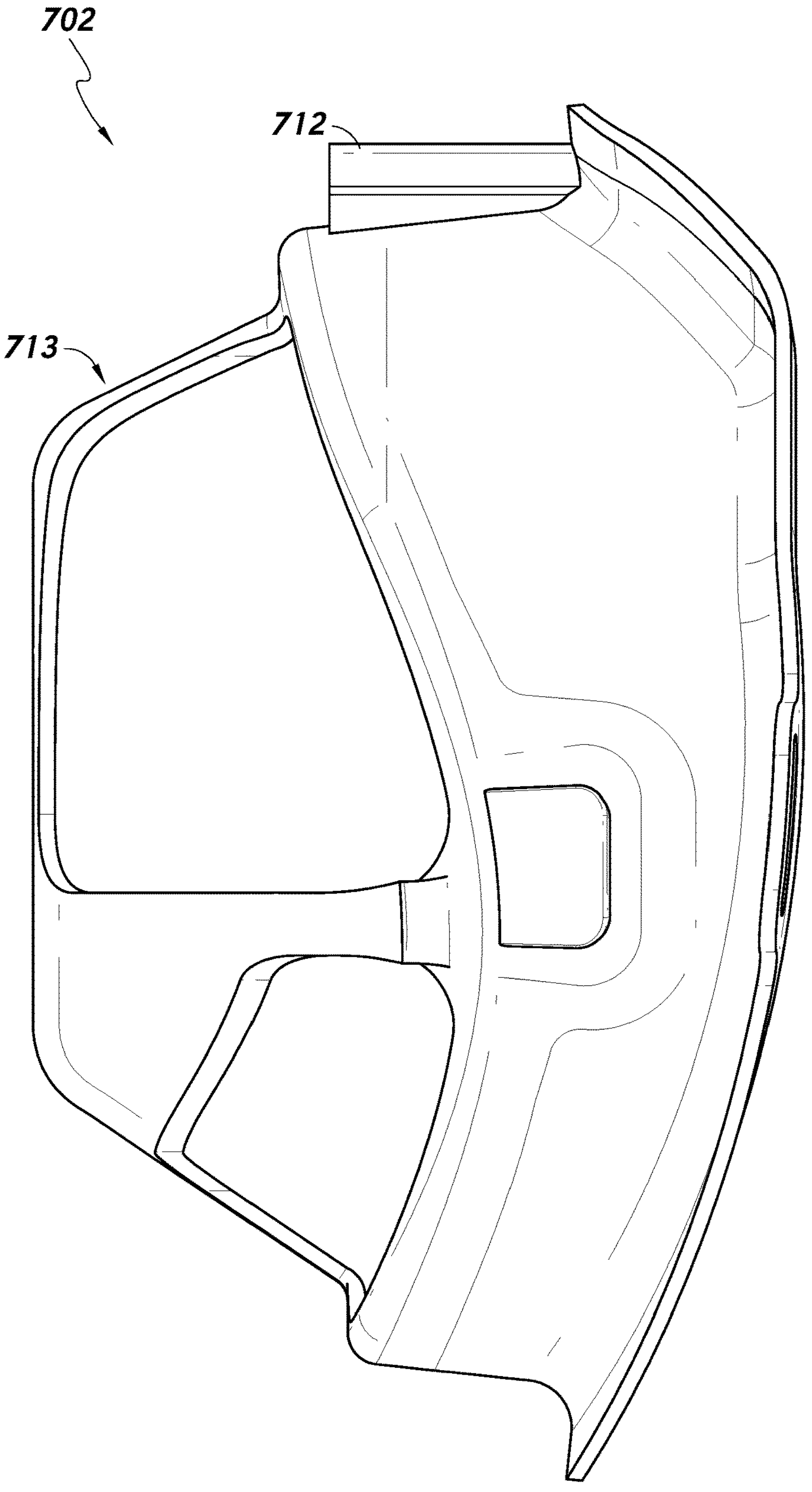

FIG. 7D provides a front/outside view of the sealing portion 712. FIG. 7E provides a front/outside view of the conical portion 713. FIG. 7F provides a front/outside view of the inner frame 702, comprising the sealing portion 712 and the conical portion 713. FIG. 7G provides a side view of the inner frame 702, comprising the sealing portion 712 and the conical portion 713.

Figure 8C:
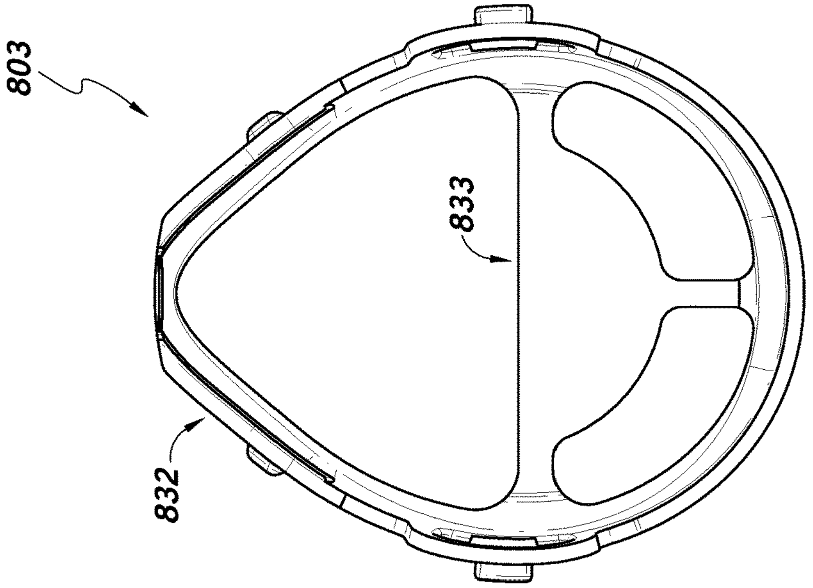
FIGS. 8A-8G provide illustrations of an example outer frame, in accordance with one or more embodiments of the present disclosure.
Figure 8B:
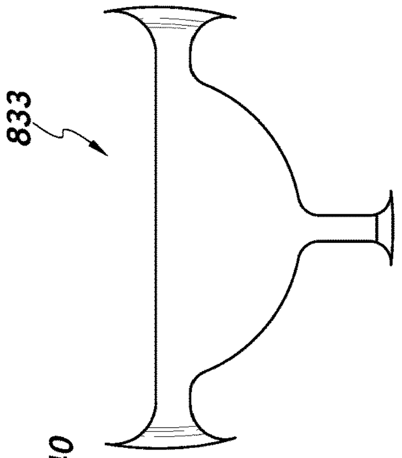
Figure 8A:
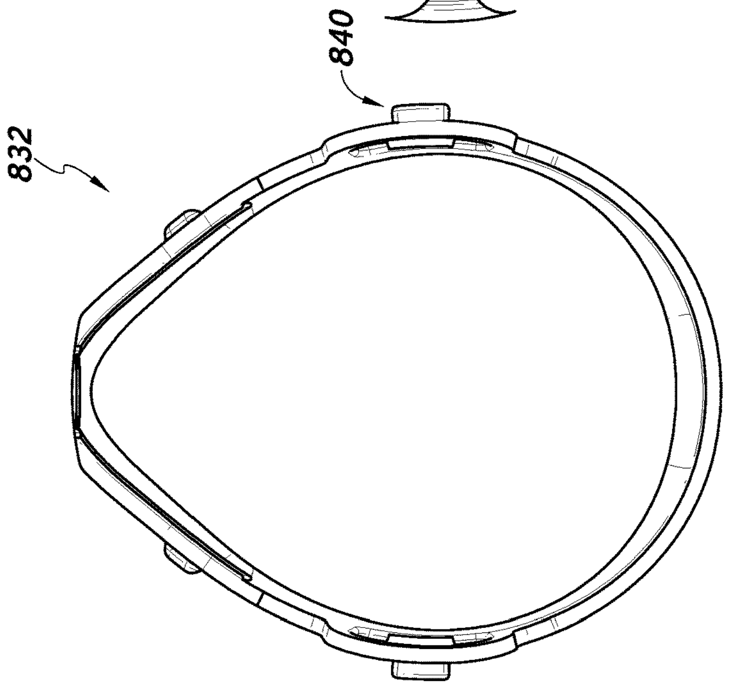

FIGS. 8A-8G provide illustrations of an example outer frame 803, in accordance with one or more embodiments of the present disclosure. FIG. 8A provides a back/inside view of a sealing portion 832 of the outer frame 803. The sealing portion 832 can comprise one or more inner frame attachment features 840 configured to mate with various devices for attaching the outer frame 803 to an inner frame. The sealing portion 832 can be a generally oval-shaped frame configured to form a generally oval-shaped lumen through the sealing portion 832.

FIG. 8B provides a back/inside view of a conical portion 833 of the outer frame 803. In some embodiments, the conical portion 833 may have a generally concave structure and/or may extend into the page in the view shown in FIG. 8B. FIG. 8C provides a back/inside view of the outer frame 803, comprising the sealing portion 832 and the conical portion 833.

Figure 8F:
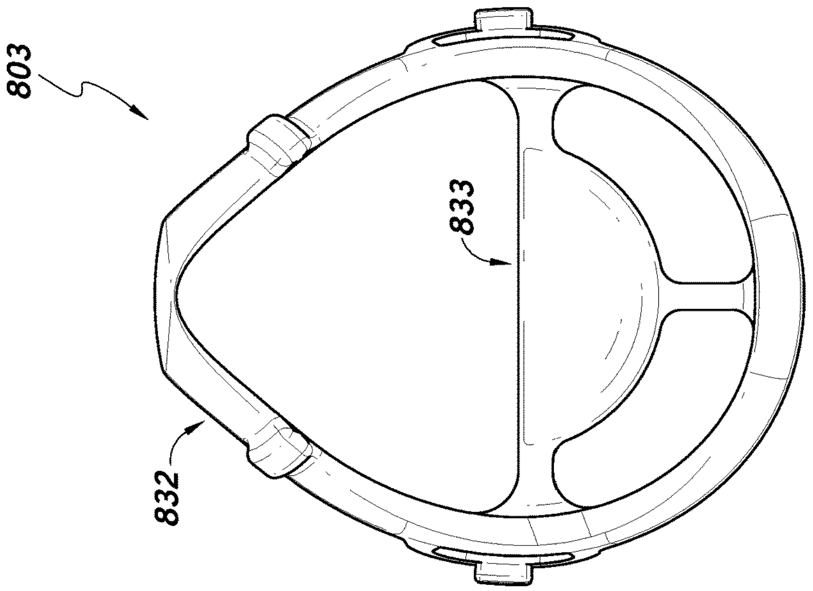
Figure 8E:
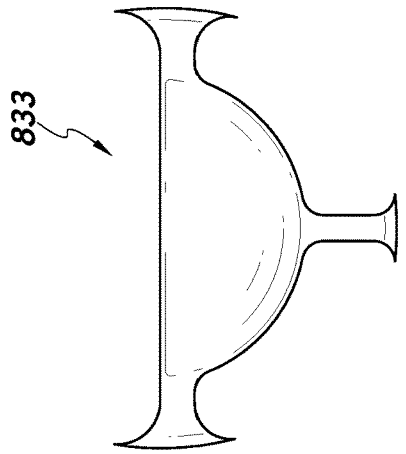
Figure 8D:
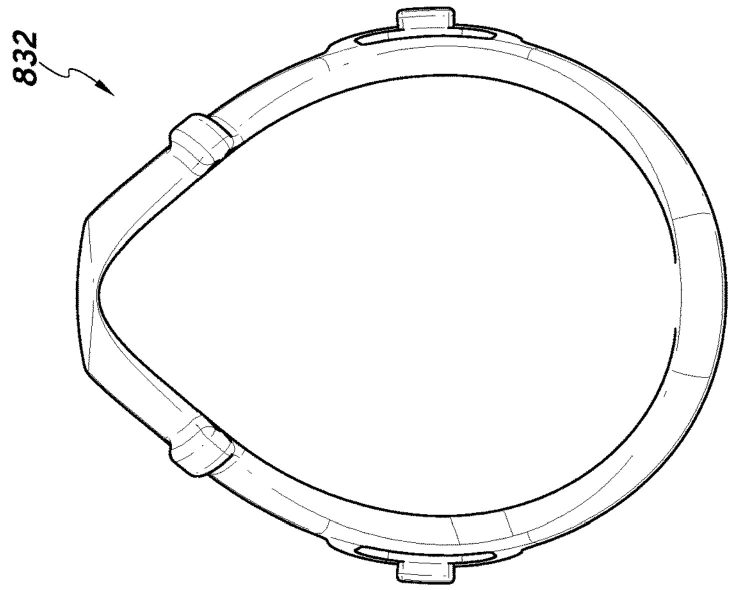
Figure 8G:
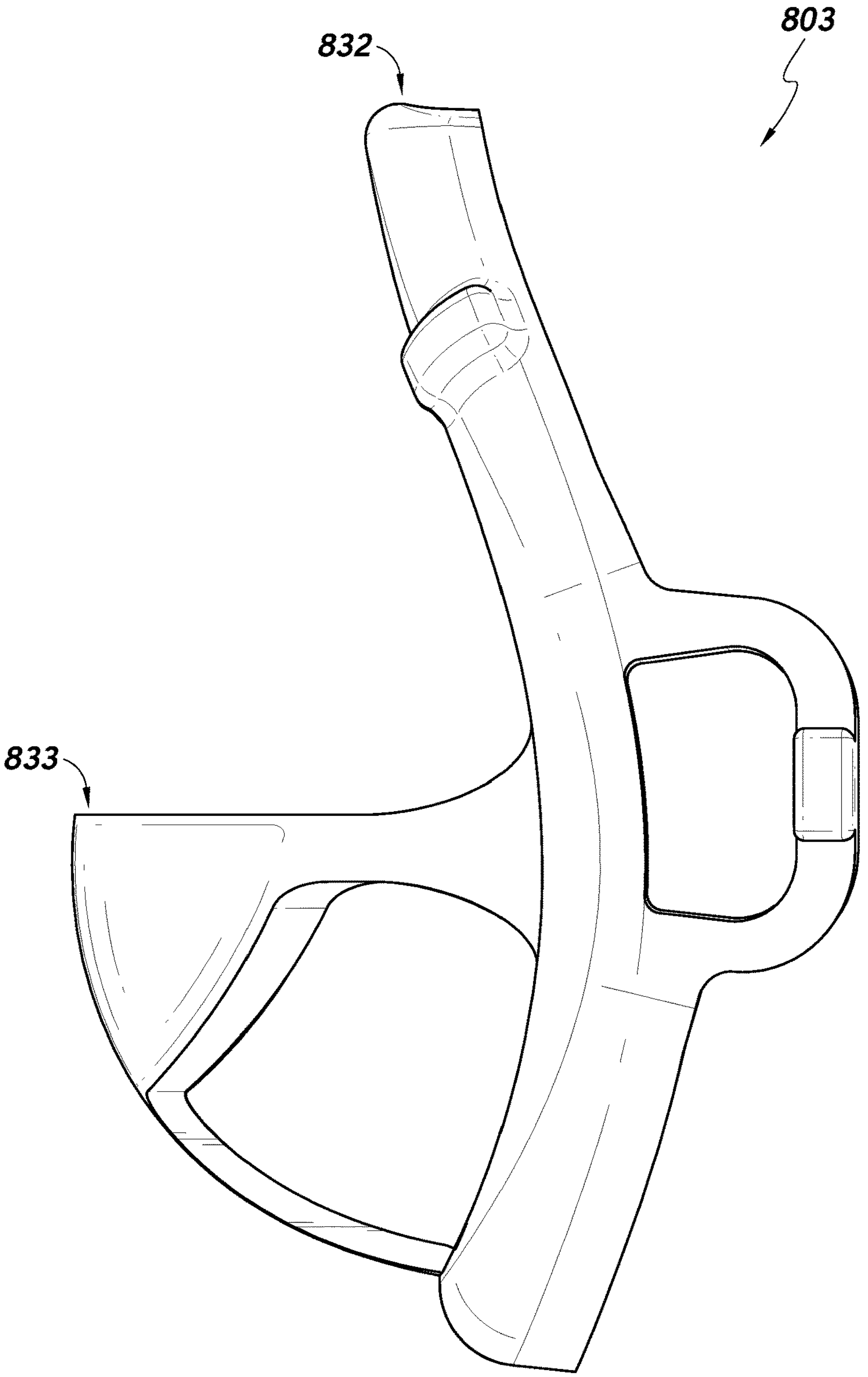

FIG. 8D provides a front/outside view of the sealing portion 832. FIG. 8E provides a front/outside view of the conical portion 833. FIG. 8F provides a front/outside view of the outer frame 803, comprising the sealing portion 832 and the conical portion 833. FIG. 8G provides a side view of the outer frame 803, comprising the sealing portion 832 and the conical portion 833.

Figure 9B:
FIGS. 9A and 9B provide illustrations of example facial covering assemblies.
Figure 9A:
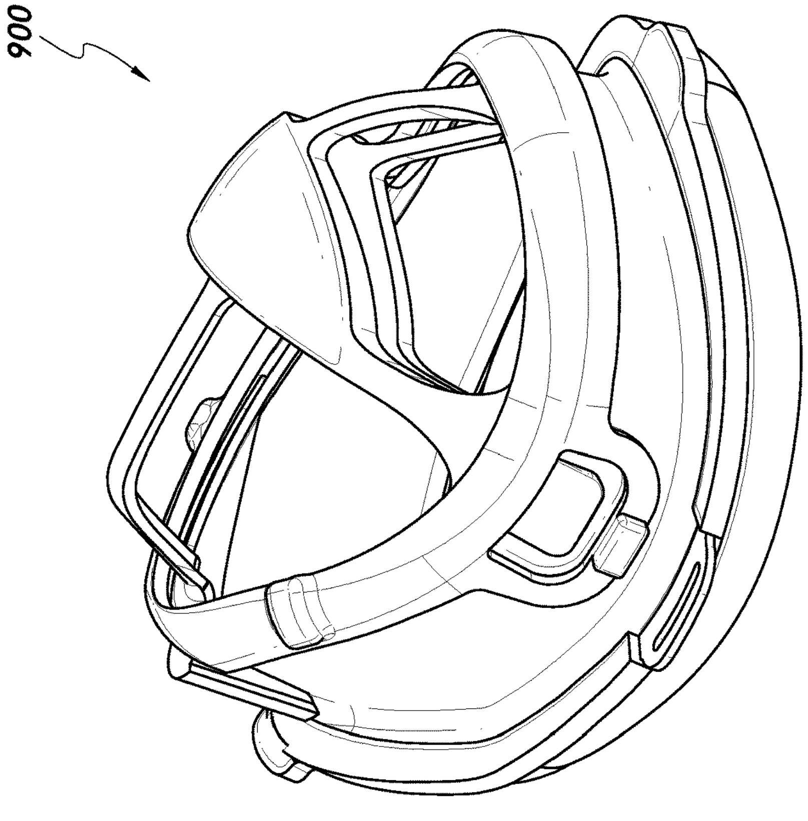

FIGS. 9A and 9B provide illustrations of example facial covering assemblies 900.

Figure 10:
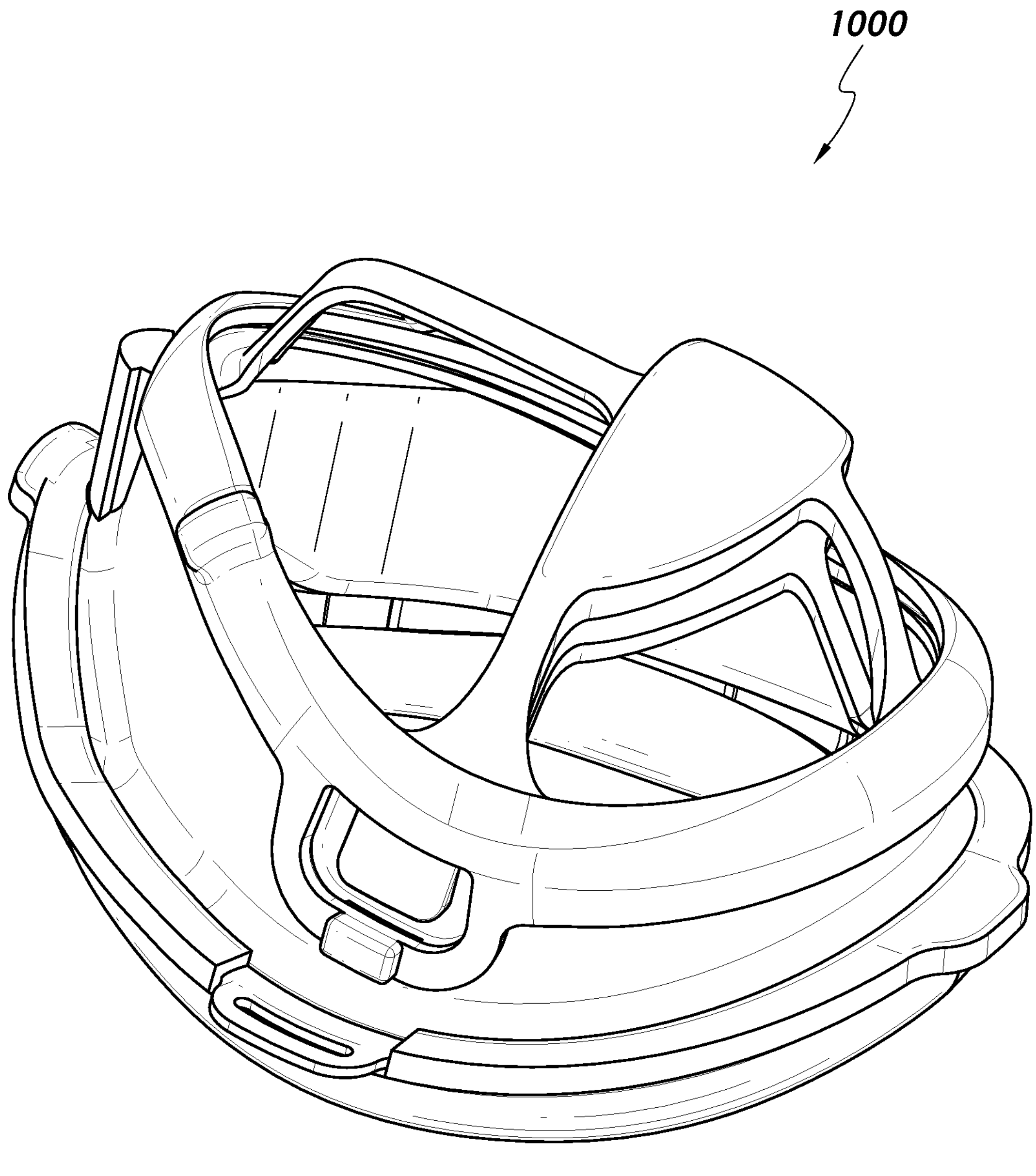
FIG. 10 illustrates another example assembled facial covering assembly.

FIG. 10 illustrates another example assembled facial covering assembly 1000.

Figure 11:
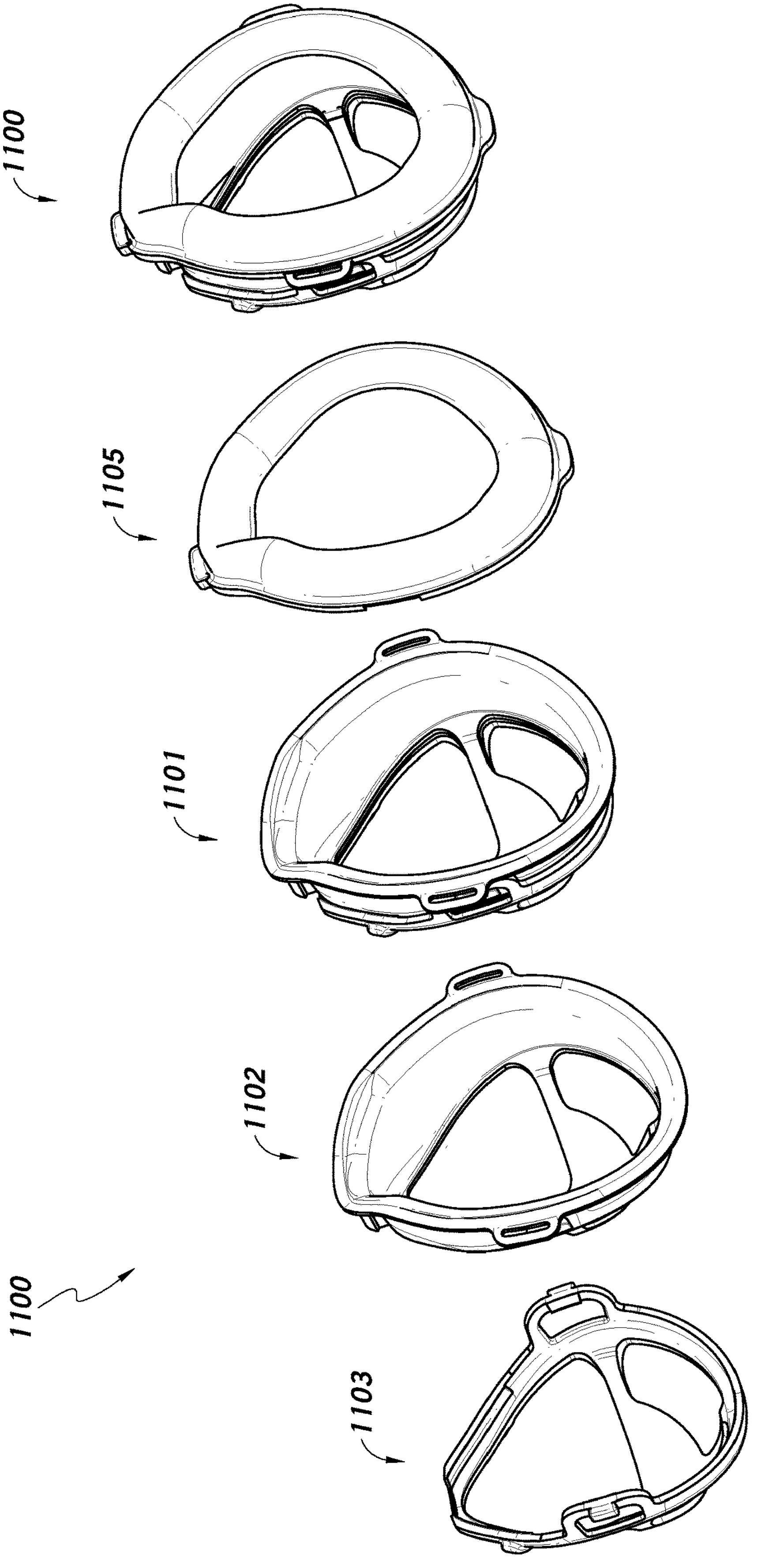
FIG. 11 provides a breakout view of a facial covering assembly in accordance with one or more embodiments.

FIG. 11 provides a breakout view of a facial covering assembly 1100 in accordance with one or more embodiments. FIG. 11 illustrates an outer frame 1103, an inner frame 1102, a combined frame 1101 including the inner frame 1102 coupled to the outer frame 1103, a cushioning element 1105, and the assembly 1100 including the inner frame 1102, outer frame 1103, and the cushioning element 1105 coupled together.

Figure 12:
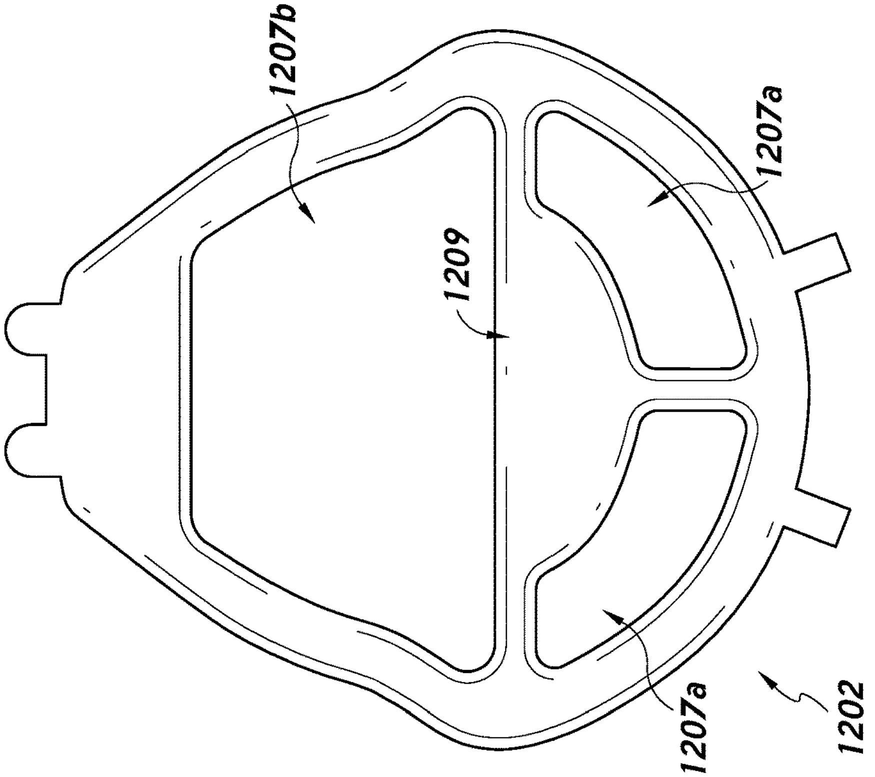
FIG. 12 illustrates at least a portion of another example frame (e.g., an outer frame) of a facial covering assembly in accordance with one or more embodiments.

FIG. 12 illustrates at least a portion of another example frame 1202 (e.g., an outer frame) of a facial covering assembly. In some embodiments, the frame 1202 may be configured for use in combination with any of the components of the facial covering assemblies and/or facial covering conversion systems described herein. For example, the frame 1202 may be configured to be attached to an inner frame, outer frame, cushioning element, and/or various other components. The frame 1202 may comprise one or more apertures 1207 having various sizes and/or shapes. For example, the frame 1202 may comprise three apertures 1207, including two lower apertures 1207*a* and one upper aperture 1207*b* that is larger than the lower apertures 1207*a*. The frame 1202 may further comprise a midsection 1209 configured to be positioned in front of and/or across from at least a portion of a user's mouth and/or nose while the frame 1202 is attached to a user's face. In some embodiments, one or more filters may be configured for placement within one or more of the apertures 1207.

Figure 13:
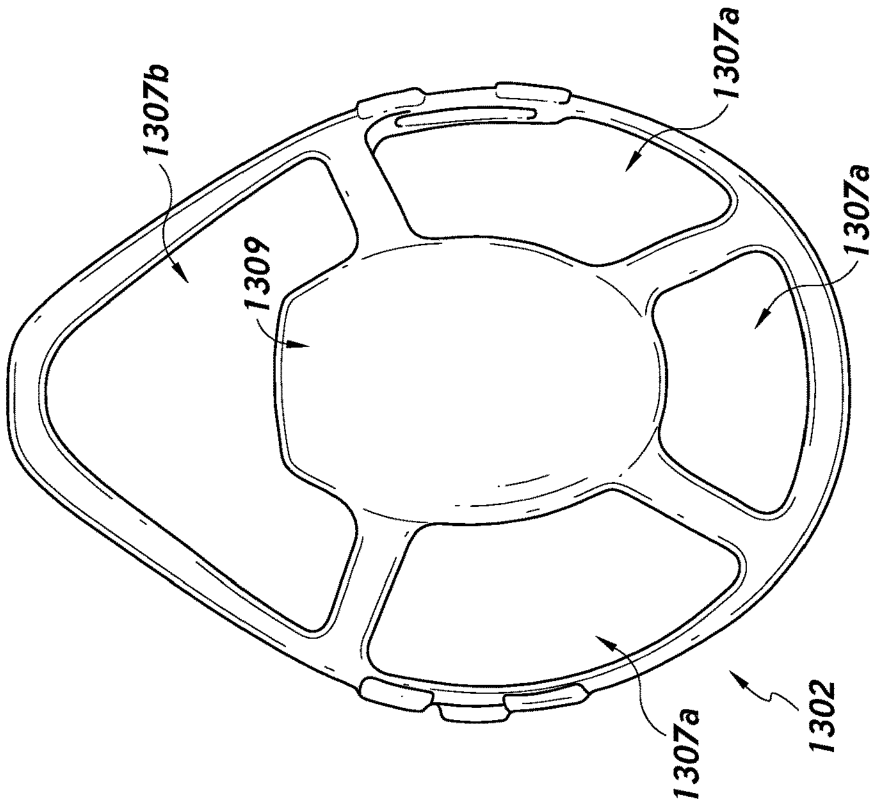
FIG. 13 illustrates at least a portion of another example frame (e.g., an outer frame) of a facial covering assembly in accordance with one or more embodiments.

FIG. 13 illustrates at least a portion of another example frame 1302 (e.g., an outer frame) of a facial covering assembly. In some embodiments, the frame 1302 may be configured for use in combination with any of the components of the facial covering assemblies and/or facial covering conversion systems described herein. For example, the frame 1302 may be configured to be attached to an inner frame, outer frame, cushioning element, and/or various other components. The frame 1302 may comprise one or more apertures 1307 having various sizes and/or shapes. For example, the frame 1302 may comprise four apertures 1307, including three lower apertures 1307*a* and one upper aperture 1307*b* that may be larger than the lower apertures 1307*a*. The frame 1302 may further comprise a midsection 1309 configured to be positioned in front of and/or across from at least a portion of a user's mouth and/or nose while the frame 1302 is attached to a user's face. In some embodiments, one or more filters may be configured for placement within one or more of the apertures 1307.

Figure 14:
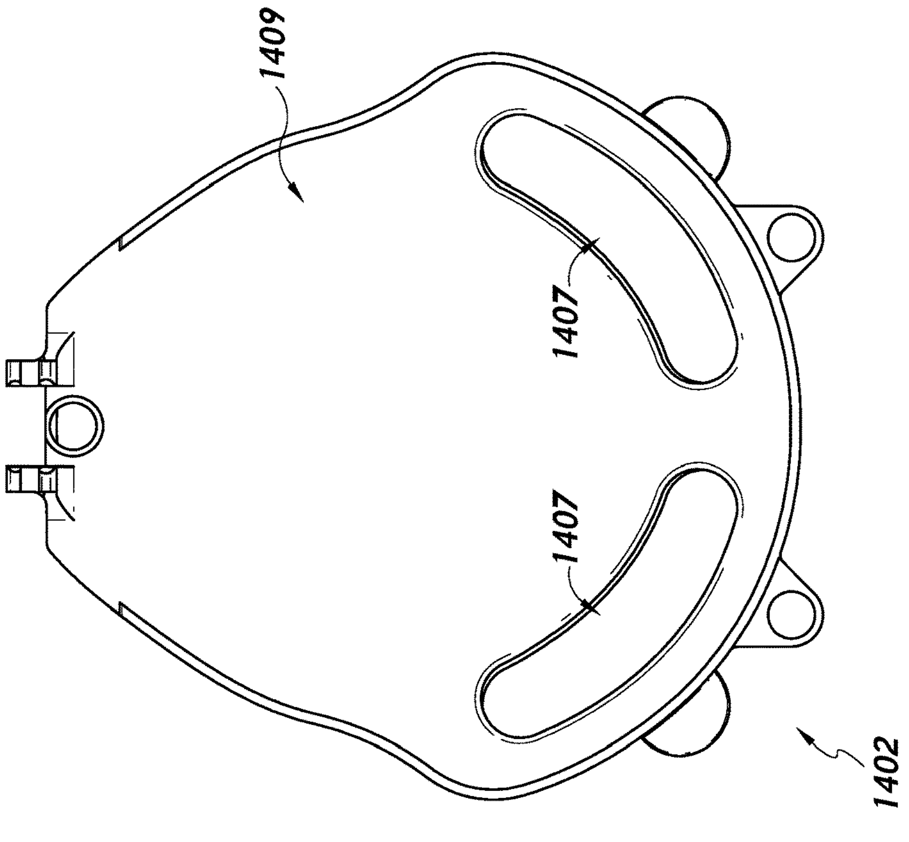
FIG. 14 illustrates at least a portion of another example frame (e.g., an outer frame) of a facial covering assembly in accordance with one or more embodiments.

FIG. 14 illustrates at least a portion of another example frame 1402 (e.g., an outer frame) of a facial covering assembly. In some embodiments, the frame 1402 may be configured for use in combination with any of the components of the facial covering assemblies and/or facial covering conversion systems described herein. For example, the frame 1402 may be configured to be attached to an inner frame, outer frame, cushioning element, and/or various other components. The frame 1402 may comprise one or more apertures 1407 having various sizes and/or shapes. For example, the frame 1402 may comprise two apertures 1407 situated at a lower portion of the frame 1402. The frame 1402 may further comprise a midsection 1409, which may have a generally convex and/or concave shape to extend away from the user's face when the frame 1402 is attached to the user's face, configured to be positioned in front of and/or across from at least a portion of a user's mouth and/or nose while the frame 1402 is attached to a user's face. In some embodiments, one or more filters may be configured for placement within one or more of the apertures 1407.

In some embodiments, the frame 1402 may be at least partially composed of generally clear materials (e.g., clear plastic) and/or may be at least partially see-through.

Figure 15:
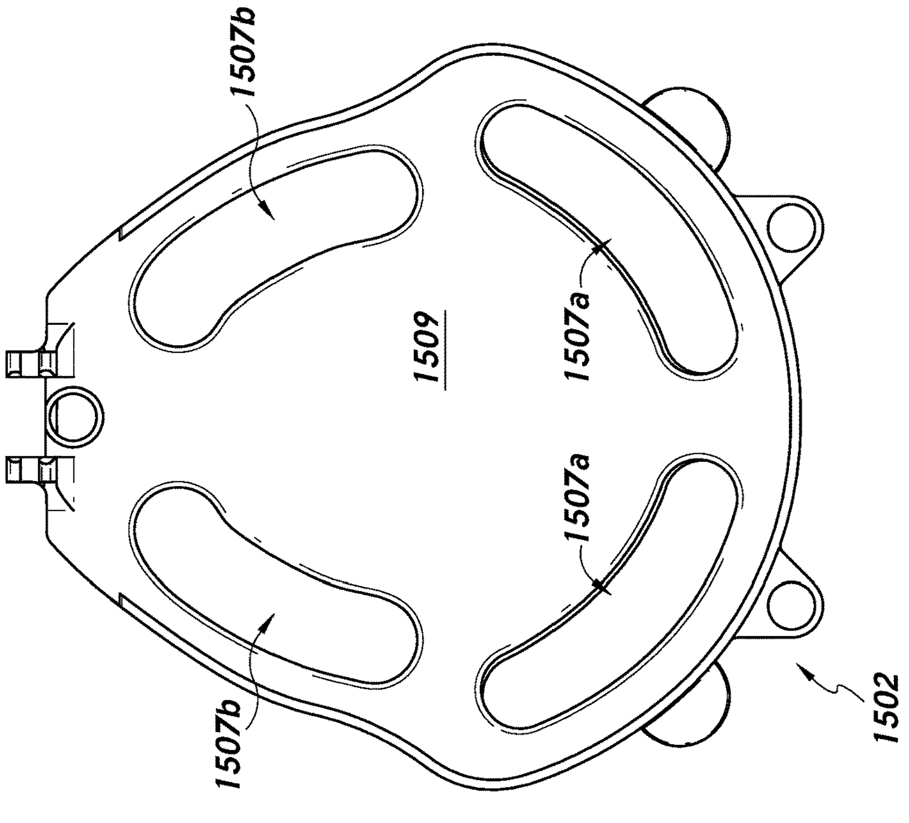
FIG. 15 illustrates at least a portion of another example frame (e.g., an outer frame) of a facial covering assembly in accordance with one or more embodiments.

FIG. 15 illustrates at least a portion of another example frame 1502 (e.g., an outer frame) of a facial covering assembly. In some embodiments, the frame 1502 may be configured for use in combination with any of the components of the facial covering assemblies and/or facial covering conversion systems described herein. For example, the frame 1502 may be configured to be attached to an inner frame, outer frame, cushioning element, and/or various other components. The frame 1502 may comprise one or more apertures 1507 having various sizes and/or shapes. For example, the frame 1502 may comprise four apertures 1507, including two lower apertures 1507*a* and two upper aperture 1507*b*. The frame 1502 may further comprise a midsection 1509 configured to be positioned in front of and/or across from at least a portion of a user's mouth and/or nose while the frame 1502 is attached to a user's face. In some embodiments, one or more filters may be configured for placement within one or more of the apertures 1507.

In some embodiments, the frame 1502 may be at least partially composed of generally clear materials (e.g., clear plastic) and/or may be at least partially see-through.

Figure 16:
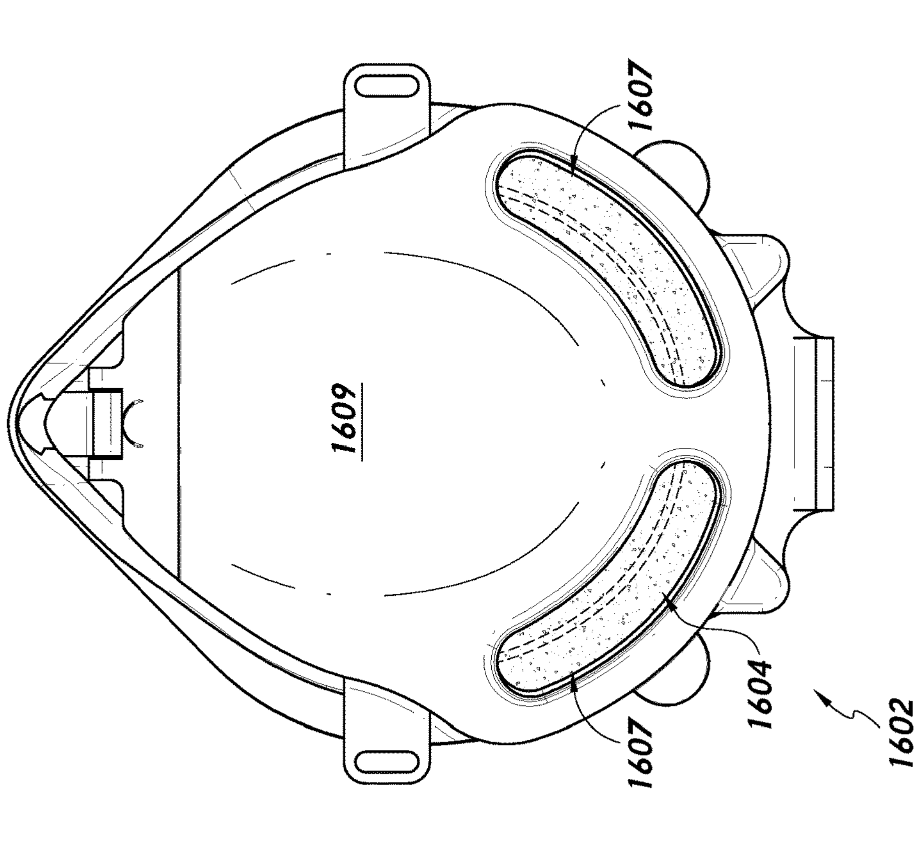
FIG. 16 illustrates at least a portion of a facial covering assembly comprising a frame and/or one or more filtering elements (e.g., two filtering elements) in accordance with one or more embodiments.

FIG. 16 illustrates at least a portion of a facial covering assembly comprising a frame 1602 and/or one or more filtering elements 1604 (e.g., two filtering elements 1604). In some embodiments, the facial covering assembly may be configured for use in combination with any of the components of the facial covering assemblies and/or facial covering conversion systems described herein. For example, the facial covering assembly may be configured to be attached to an inner frame, outer frame, cushioning element, and/or various other components. The one or more filtering elements 1604 and/or portions of the one or more filtering elements 1604 may be situated within, behind, and/or in front of one or more apertures 1607 having various sizes and/or shapes. For example, the facial covering assembly may comprise two apertures 1607 with each aperture 1607 having an associated filtering element 1604 and/or portion of a filtering element 1604. The facial covering assembly may further comprise a midsection 1609 configured to be positioned in front of and/or across from at least a portion of a user's mouth and/or nose while the facial covering assembly is attached to a user's face.

In some embodiments, the frame 1602 may be at least partially composed of generally clear materials and/or may be at least partially see-through.

Figure 17:
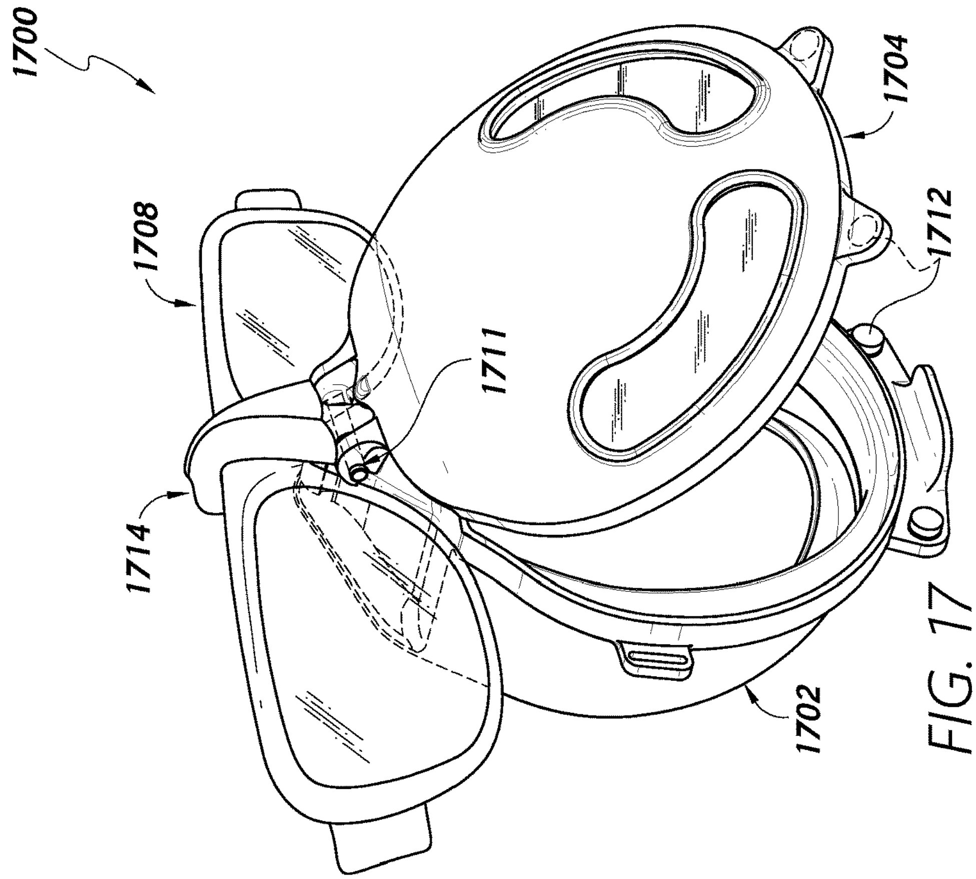
FIG. 17 illustrates an example facial covering assembly configured for use with various eyewear devices (e.g., eyeglasses, goggles, etc.) in accordance with one or more embodiments.

FIG. 17 illustrates an example facial covering assembly 1700 configured for use with various eyewear devices 1708 (e.g., eyeglasses, goggles, etc.). The facial covering assembly 1700 may comprise various components, which can include an inner frame 1702 and/or an outer frame 1704. In some embodiments, at least a portion of the inner frame 1702 may be configured to be at least partially separated from at least a portion of the outer frame 1704. For example, the facial covering assembly 1700 may comprise a hinge 1711 and/or other movable joint and/or mechanism configured to maintain a connection between at least a portion of the inner frame 1702 and at least a portion of the outer frame 1704 while allowing a separation between at least a portion of the inner frame 1702 and at least a portion of the outer frame 1704. The inner frame 1702 and/or outer frame 1704 may comprise one or more attachment mechanisms 1712 configured to allow at least a portion of the inner frame 1702 and/or at least a portion of the outer frame 1704 to form a removable and/or detachable connection and/or a complete seal around at least a portion of a user's face. In some embodiments, the inner frame 1702 and outer frame 1704 may be permanently attached.

In some embodiments, the facial covering assembly 1700 may comprise an eyewear clip 1714 (e.g., extending from the inner frame 1702 and/or outer frame 1704) and/or a mount for an eyewear clip 1714. The eyewear clip 1714 may be configured for attachment to various eyewear devices 1708 which may be utilized in combination with the facial covering assembly 1700. The eyewear clip 1714 and/or various eyewear engagement features described herein may comprise clips, screws, male-female inserts, and/or any other suitable attachment mechanisms. The eyewear clip 1714 may be releasable by activating a release (e.g., by squeezing at least a portion of the eyewear clip 1714).

Figure 18:
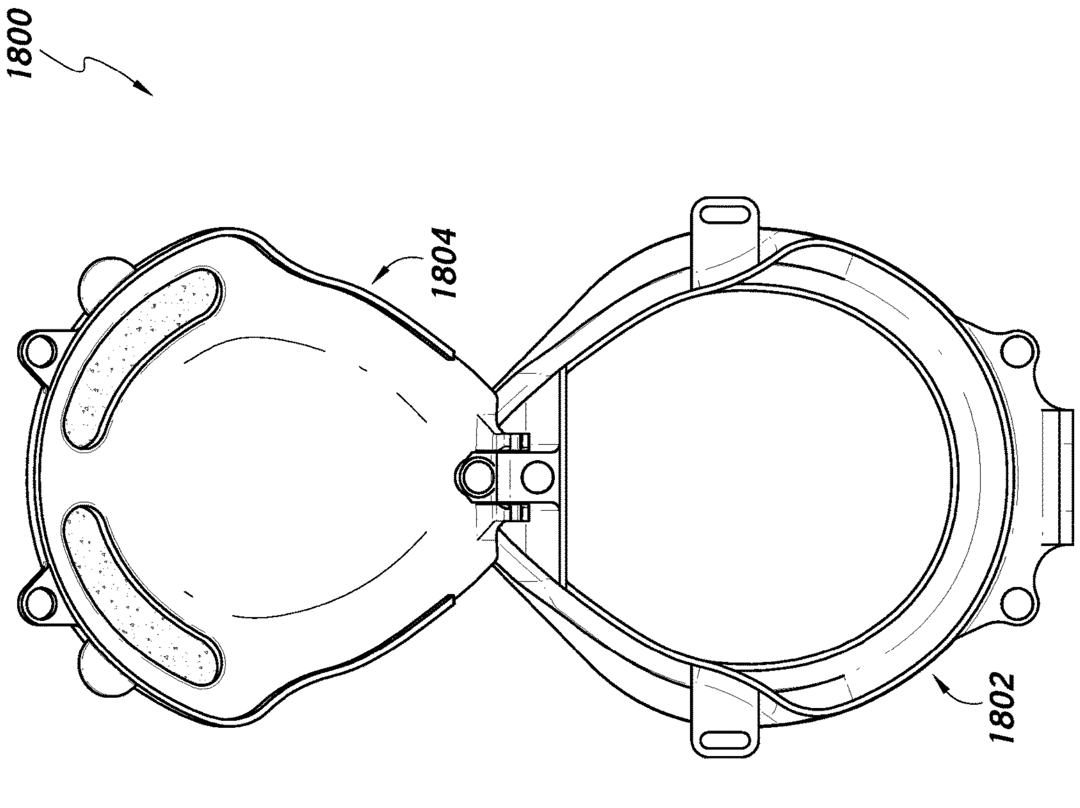
FIG. 18 provides an interior view of a facial covering assembly comprising an inner frame and/or a removably attached outer frame in accordance with one or more embodiments.

FIG. 18 provides an interior view of a facial covering assembly 1800 comprising an inner frame 1802 and/or a removably attached outer frame 1804.

Figure 19:
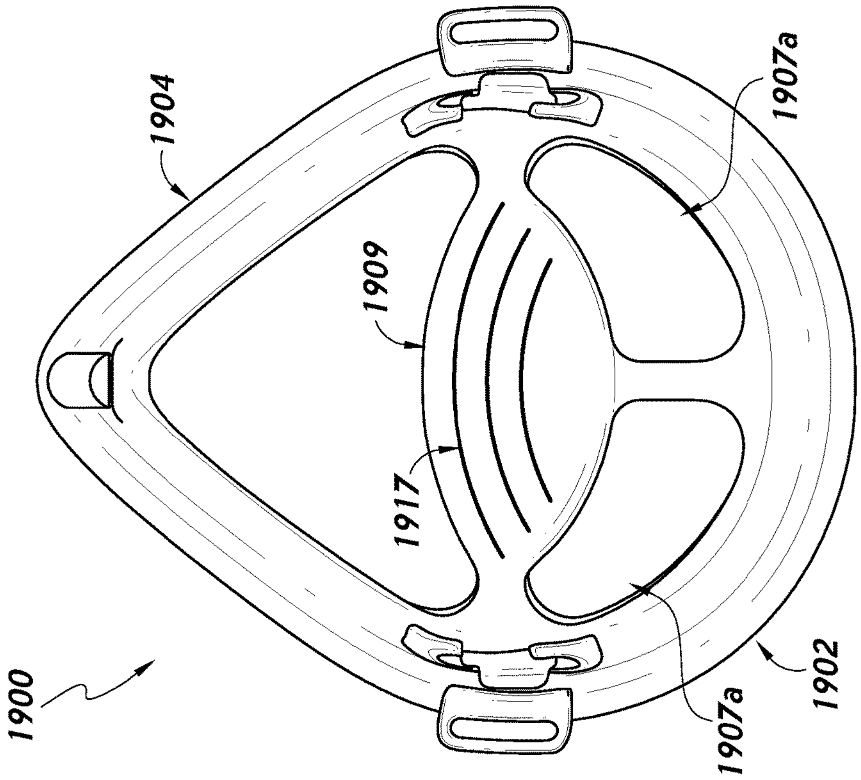
FIG. 19 illustrates at least a portion of a facial covering assembly comprising at least an inner frame and/or an outer frame in accordance with one or more embodiments.

FIG. 19 illustrates at least a portion of a facial covering assembly 1900 comprising at least an inner frame 1902 and/or an outer frame 1904. The outer frame 1904 may comprise one or more apertures 1907*a*. In some embodiments, the outer frame 1904 may comprise one or more elongate apertures 1917 and/or vents configured to allow air flow through a midsection 1909 of the outer frame 1904. The outer frame 1904 may comprise any number of elongate apertures 1917 (e.g., three) and/or the one or more elongate apertures 1917 may have a straight or curved form. In some embodiments, at least a portion of a first elongate aperture 1917 may be in parallel with at least a portion of a second elongate aperture 1917. The one or more elongate apertures 1917 may be at least partially angled to direct air flow through the one or more elongate apertures 1917 downward.

Figure 20:
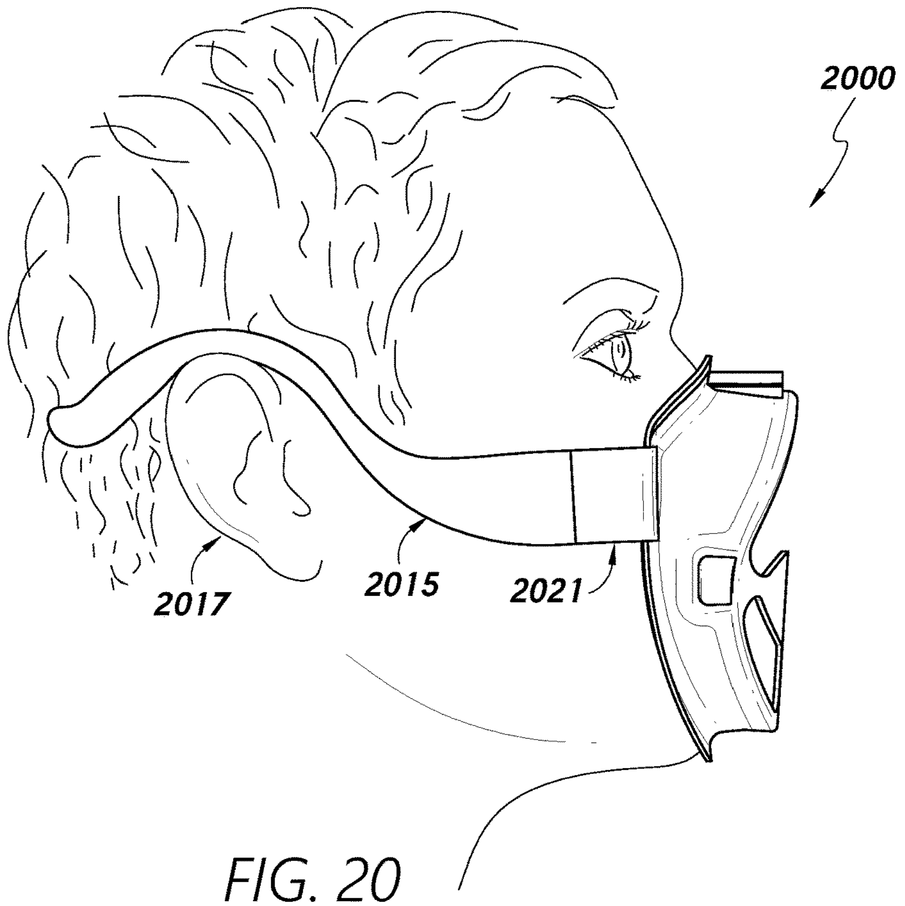
FIG. 20 illustrates at least a portion of a facial covering assembly comprising one or more ear attachments in accordance with one or more embodiments.

FIG. 20 illustrates at least a portion of a facial covering assembly 2000 comprising one or more ear attachments 2015. In some embodiments, the facial covering assembly 2000 may comprise a first ear attachment 2015 extending from and/or configured to attach to a first engagement feature 2021 at a first side of the facial covering assembly 2000. The first ear attachment 2015 may be configured to hook onto and/or otherwise attach to a first ear 2017 of a user. The facial covering assembly 2000 may additionally comprise a second ear attachment 2015 (not shown) extending from and/or configured to attach to a second engagement feature (not shown) at a second side of the facial covering assembly 2000. The second ear attachment 2015 may be configured to hook onto and/or otherwise attach to a second ear of the user.

Figure 21:
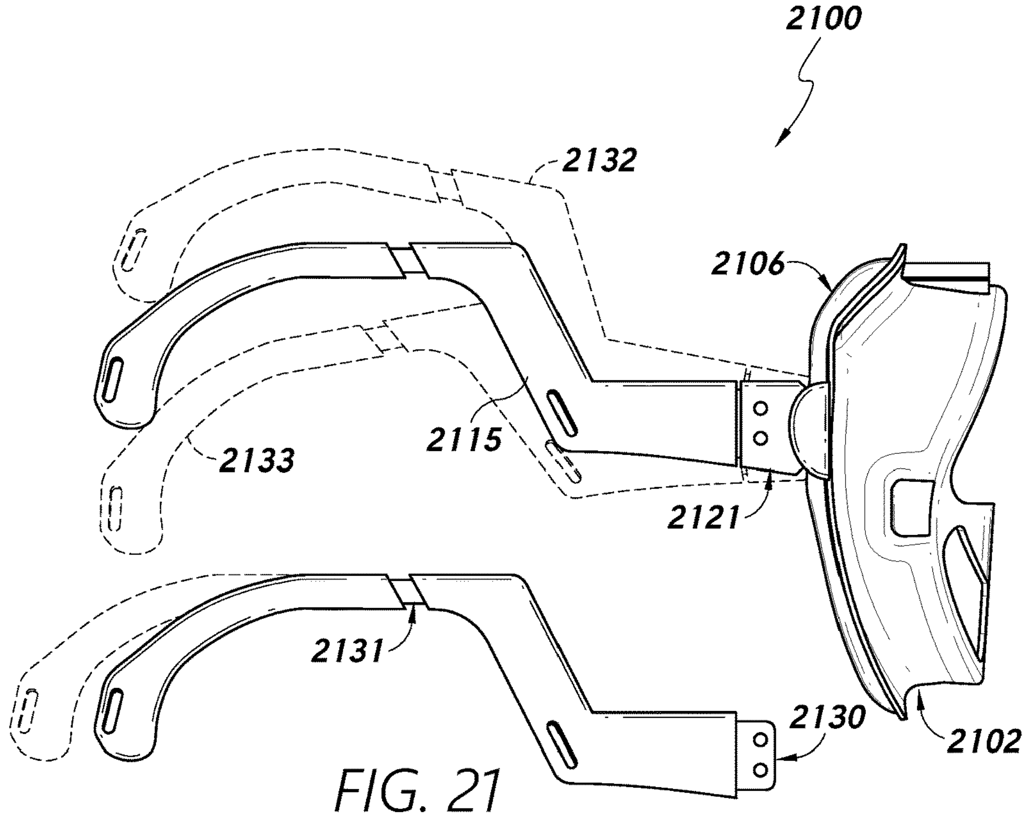
FIG. 21 illustrates at least a portion of another facial covering assembly comprising one or more ear attachments in accordance with one or more embodiments.

FIG. 21 illustrates at least a portion of another facial covering assembly 2100 comprising one or more ear attachments 2115. The one or more ear attachments 2115 may comprise one or more frame engagement features 2130 configured to mate with corresponding engagement features 2121 of a frame 2102 of the facial covering assembly 2100. In some embodiments, at least a portion of an ear attachment 2115 may be configured to slide along a track 2131 configured to allow the ear attachment 2115 to be extended for conforming to particular user's facial features. Moreover, the ear attachment 2115 may be configured to form an adjustable connection (e.g., via a hinge and/or similar mechanism) with the frame 2102 to allow the ear attachment to be adjusted to an upward position 2132 and/or a downward position 2133 as desired by users. In some embodiments, the facial covering assembly may comprise a generally soft (e.g., composed at least partially of silicone) cushioning element 2106 configured to form an airtight (e.g., bubble) seal with the user's face.

Figure 22:
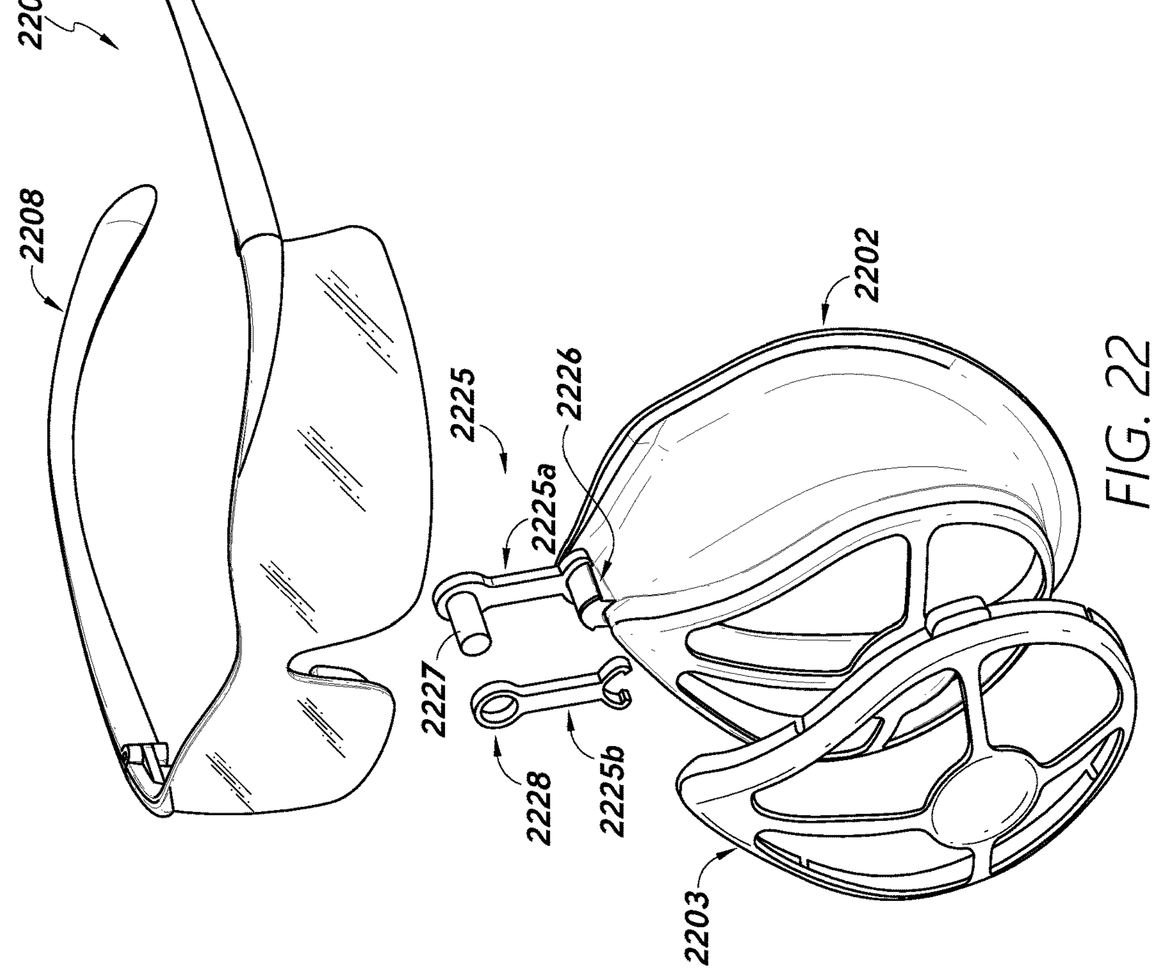
FIG. 22 illustrates at least a portion of an example facial covering assembly for use with various eyewear devices in accordance with one or more embodiments.

FIG. 22 illustrates at least a portion of an example facial covering assembly 2200 for use with various eyewear devices 2208. In some embodiments, a facial covering assembly 2200 may comprise one or more eyewear engagement features 2225 configured to mate with one or more mounts 2226 and/or other engagement features of an inner frame 2202 and/or outer frame 2203. The facial covering assembly 2200 may comprise two eyewear engagement features 2225 and/or an eyewear engagement feature 2225 comprising multiple parts. For example, the facial covering assembly 2200 may comprise a first eyewear engagement feature 2225*a* and/or a second eyewear engagement feature 2225*b*. The first eyewear engagement feature 2225*a* may comprise a peg 2227 and/or similar mechanism configured to fit through a corresponding loop 2228 and/or similar mechanism configured to receive the peg 2227. The inner frame 2202 may comprise a mount 2226 configured to form an attachment with the first eyewear engagement feature 2225*a* and/or the second eyewear engagement feature 2225*b*. The mount 2226 may be situated at an upper portion of the inner frame 2202.

Figure 23:
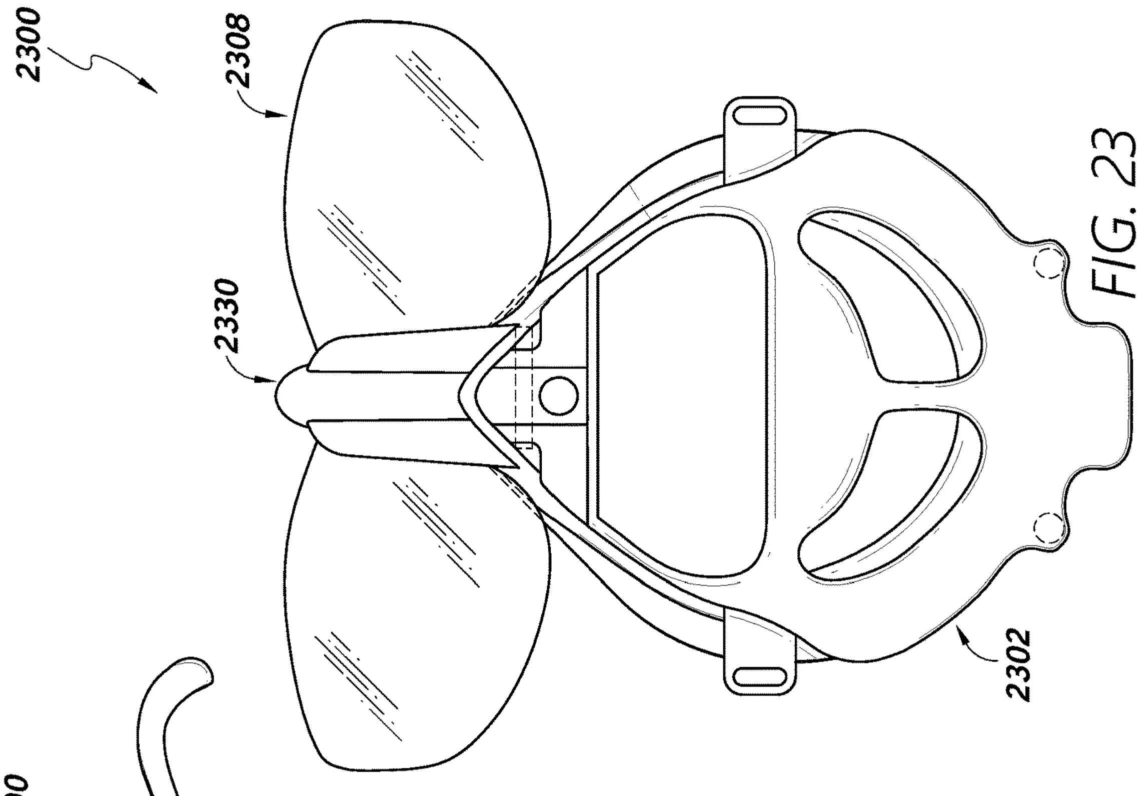
FIG. 23 illustrates another example facial covering assembly for use with various eyewear devices in accordance with one or more embodiments.

FIG. 23 illustrates another example facial covering assembly 2300 for use with various eyewear devices 2308. In some embodiments, the facial covering assembly 2300 may comprise a clip 2330 and/or other eyewear engagement features configured to form an attachment between the eyewear devices 2308 and the facial covering assembly 2300, which can comprise a frame 2302 composed of one or more components. The clip 2330 may be configured for placement at an upper portion of the frame 2302.

Figure 24:
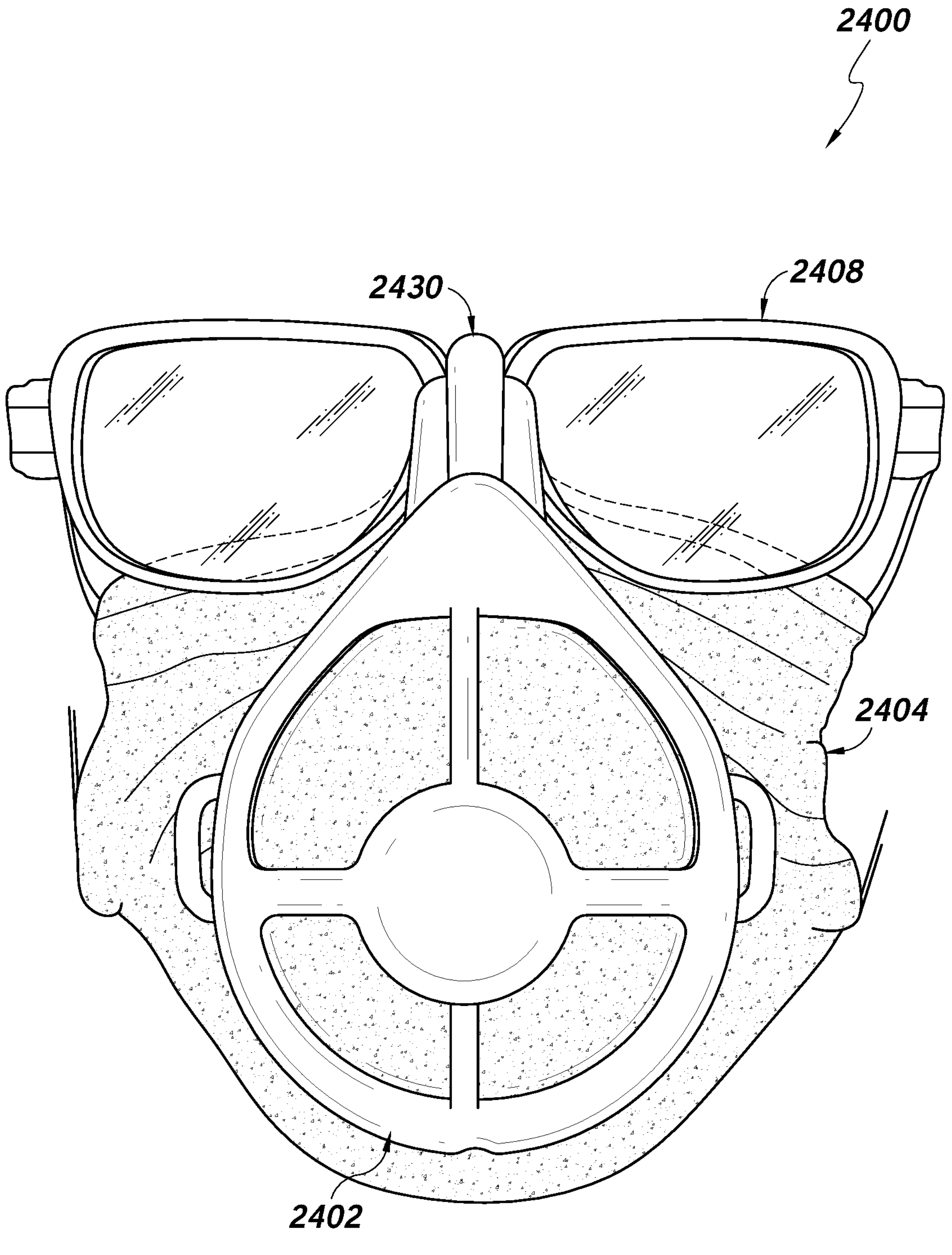
FIG. 24 illustrates another example facial covering assembly configured for use with various eyewear devices in accordance with one or more embodiments.

FIG. 24 illustrates another example facial covering assembly 2400 configured for use with various eyewear devices 2408. The facial covering assembly 2400 may comprise various filtering elements 2404, frames 2402, clips 2430, and/or eyewear engagement features described herein.

Figure 25C:
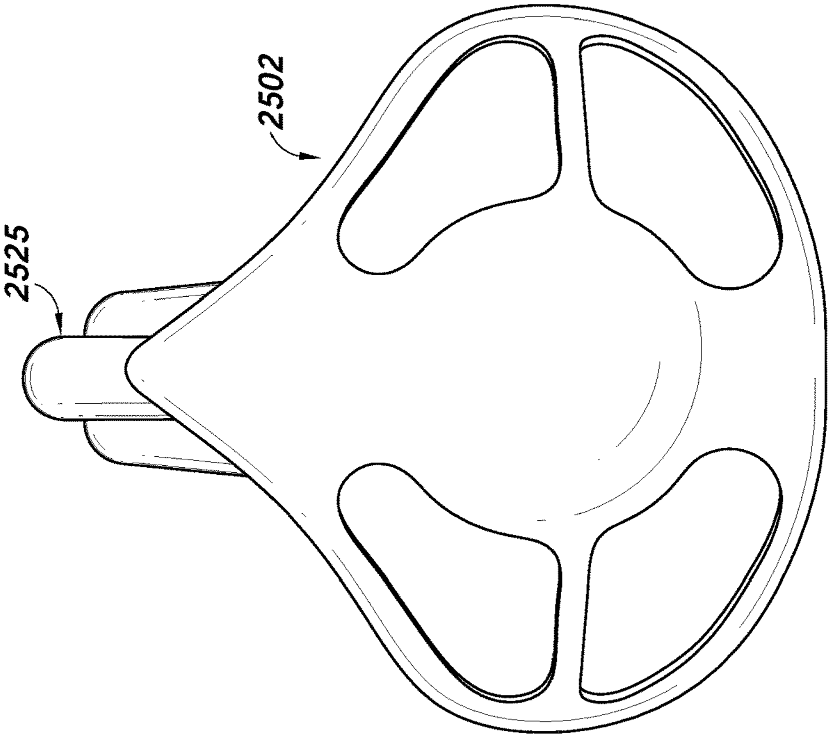
FIGS. 25A-25C illustrate example eyewear engagement features that can extend from mounting features of one or more frames in accordance with one or more embodiments.
Figure 25B:
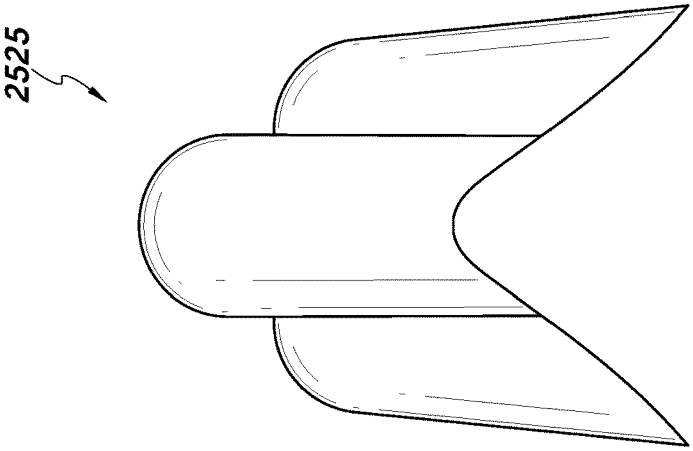
Figure 25A:
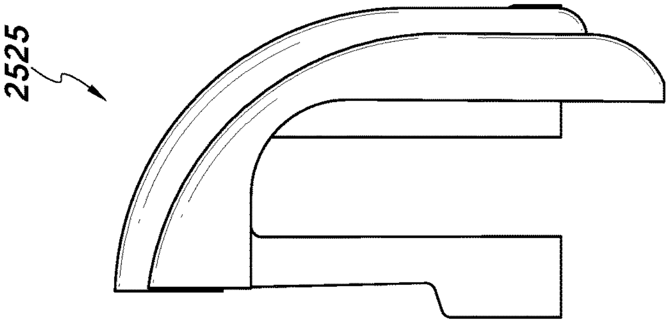

FIGS. 25A-25C illustrate example eyewear engagement features 2525 that can extend from mounting features of one or more frames 2502. The eyewear engagement feature 2525 can include clips as described herein.

Figure 26:
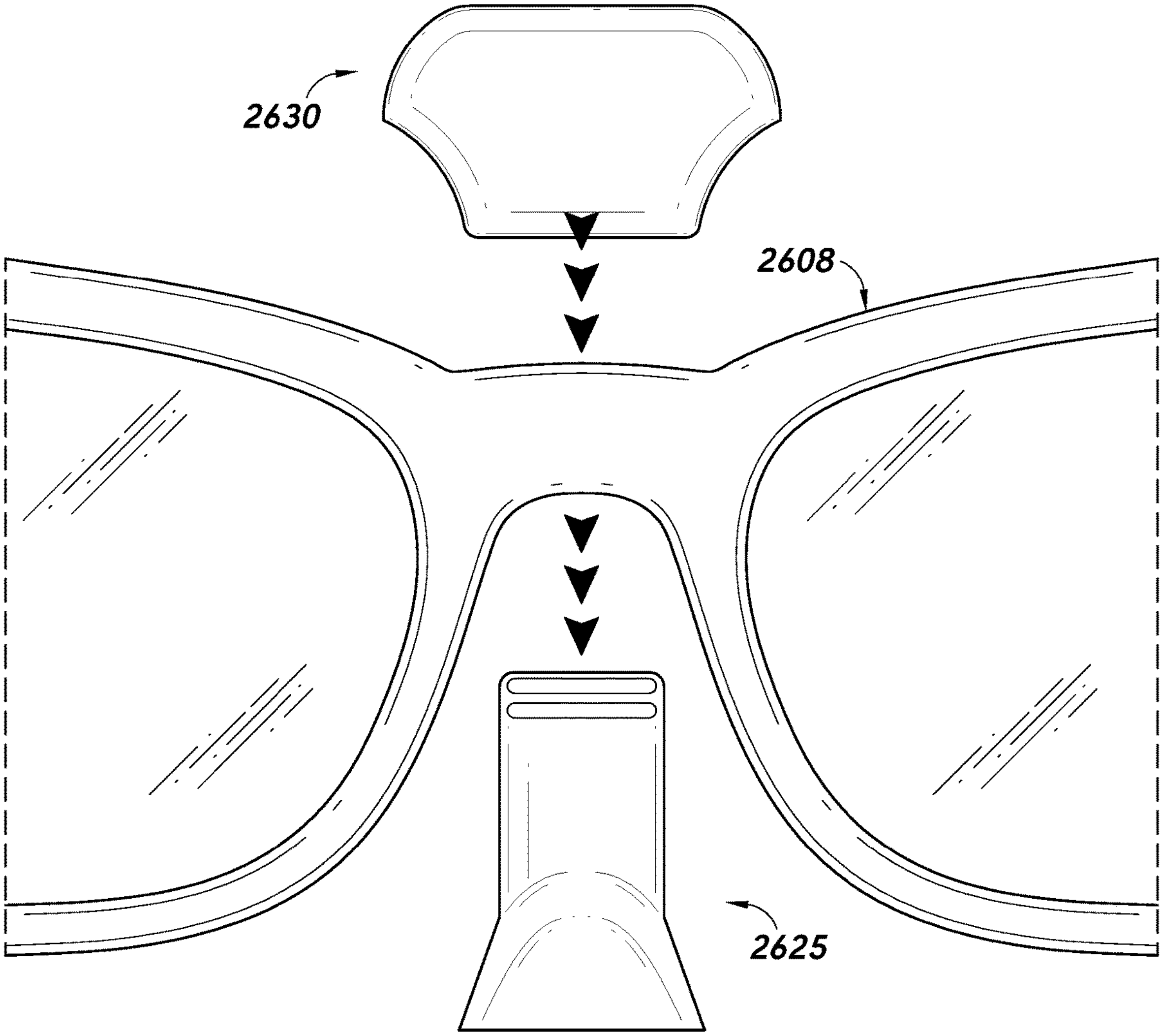
FIG. 26 illustrates an attachment process for attaching an eyewear device to a clip and/or one or more eyewear engagement features of a facial covering assembly in accordance with one or more embodiments.

FIG. 26 illustrates an attachment process for attaching an eyewear device 2608 to a clip 2630 and/or one or more eyewear engagement features 2625 of a facial covering assembly. In some embodiments, the eyewear device 2608 may be pressed downwards onto the eyewear engagement features 2625 to create an attachment between the eyewear device 2608 and the eyewear engagement features 2625. The clip 2630 may similarly be pressed downwards onto the eyewear device 2608 to create an attachment between the eyewear device 2608 and the clip 2630.

Figure 27A:
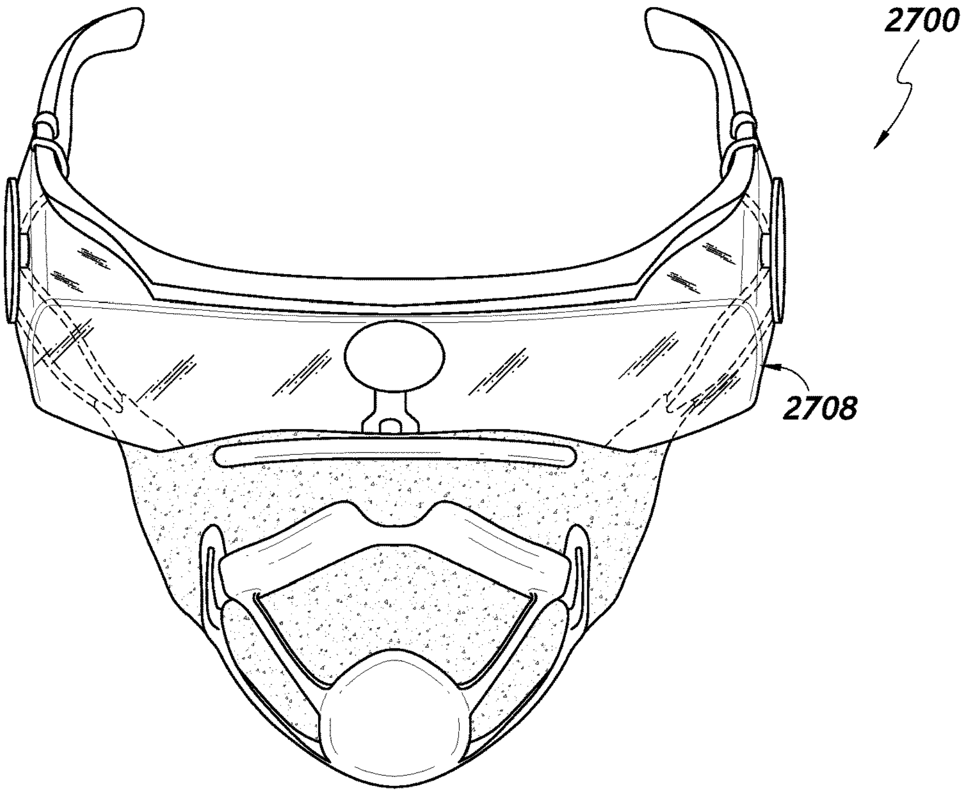
FIGS. 27A and 27B illustrate an example facial covering assembly configured for use with various eyewear devices in accordance with one or more embodiments.
Figure 27B:
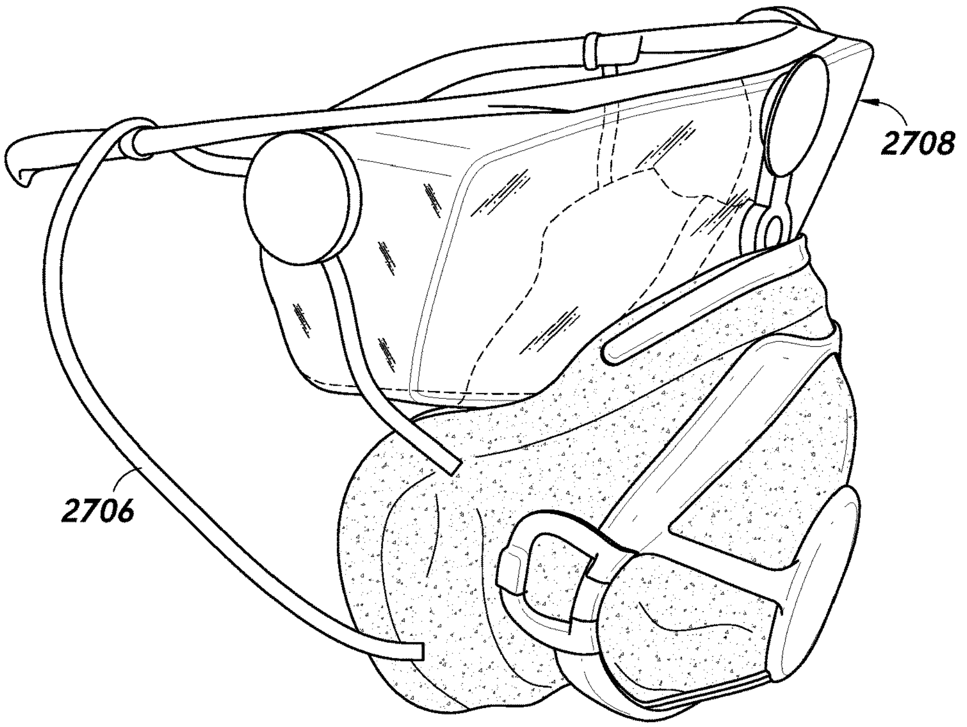

FIGS. 27A and 27B illustrate an example facial covering assembly 2700 configured for use with various eyewear devices 2708. The facial covering assembly 2700 may comprise user engagement features 2706 configured for attachment to a user's ears and/or features. In some embodiments, a user engagement feature 2706 may comprise an elastic band and/or similar device configured to wrap at least partially around a user's ear. In some embodiments, the one or more user engagement features 2706 may be configured to attach to and/or wrap around the eyewear device 2708 and/or otherwise extend upward to adjust a point of contact with a user engagement feature 2706 to a higher point and/or to a back portion of a user's ear to increase comfort.

Figure 28:
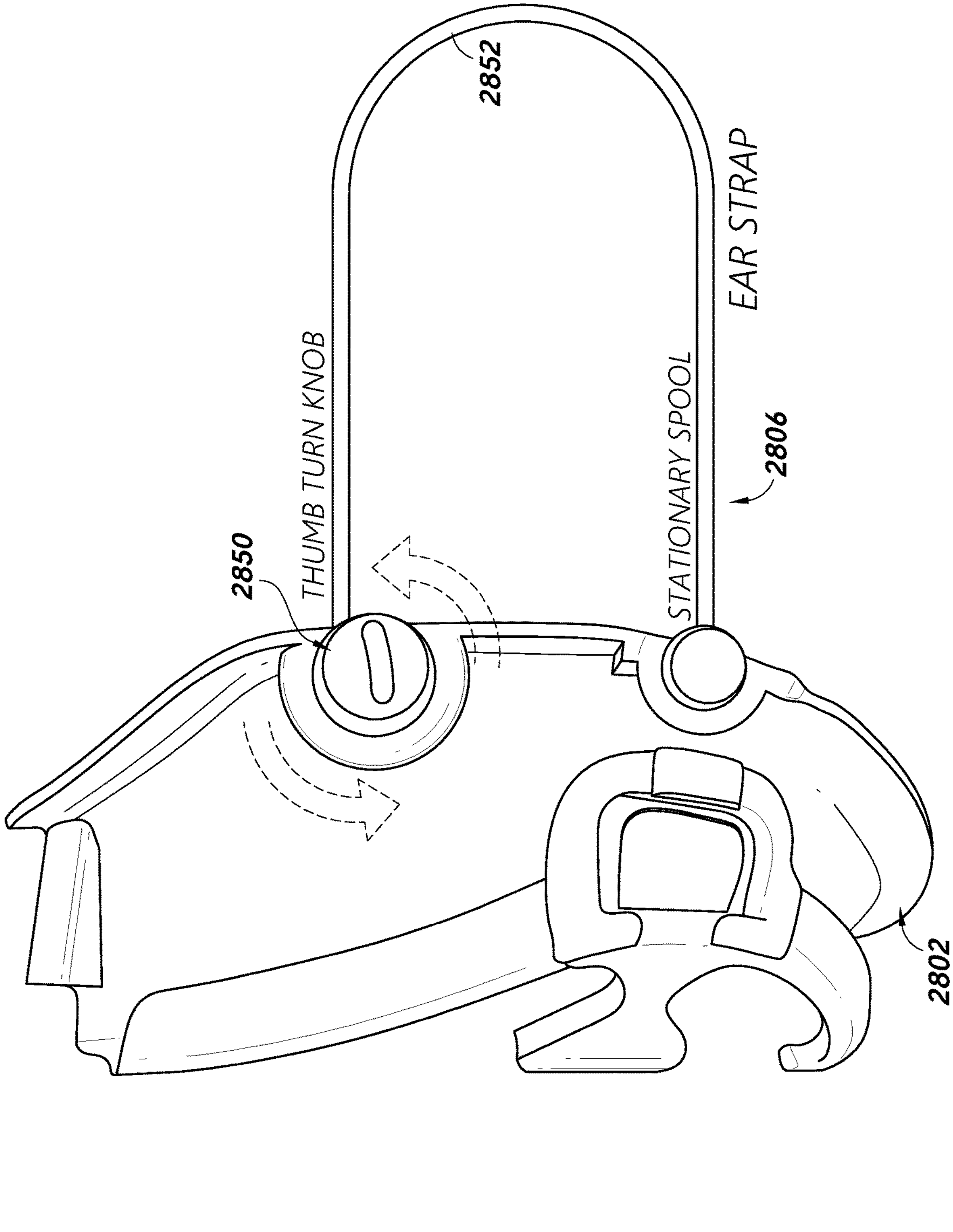
FIG. 28 illustrates at least a portion of a frame of a facial covering assembly comprising one or more adjustable user engagement features in accordance with one or more embodiments.
Figure 29B:
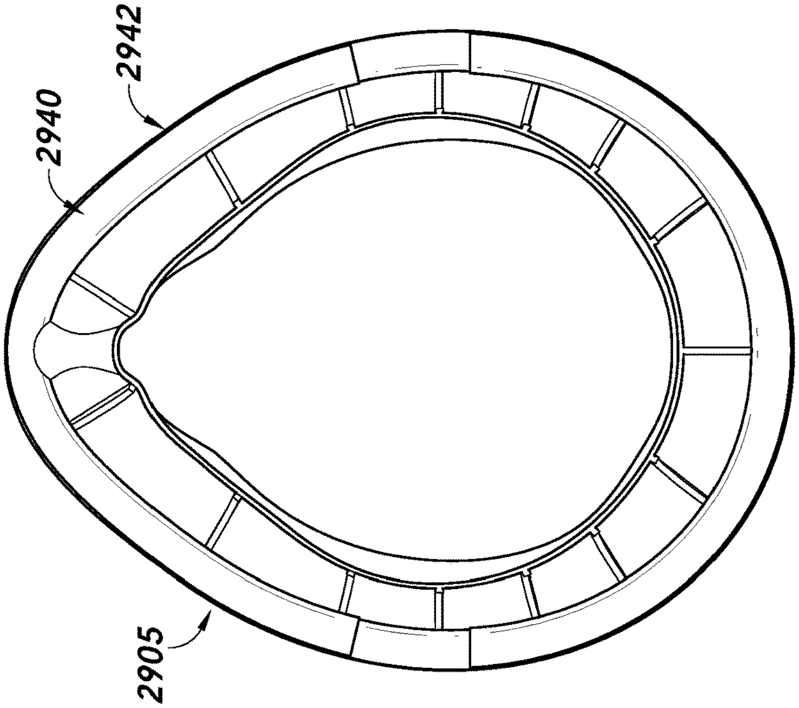
FIGS. 29A-29E provide various illustrations of at least portions of a facial covering assembly in accordance with one or more embodiments.
Figure 29A:
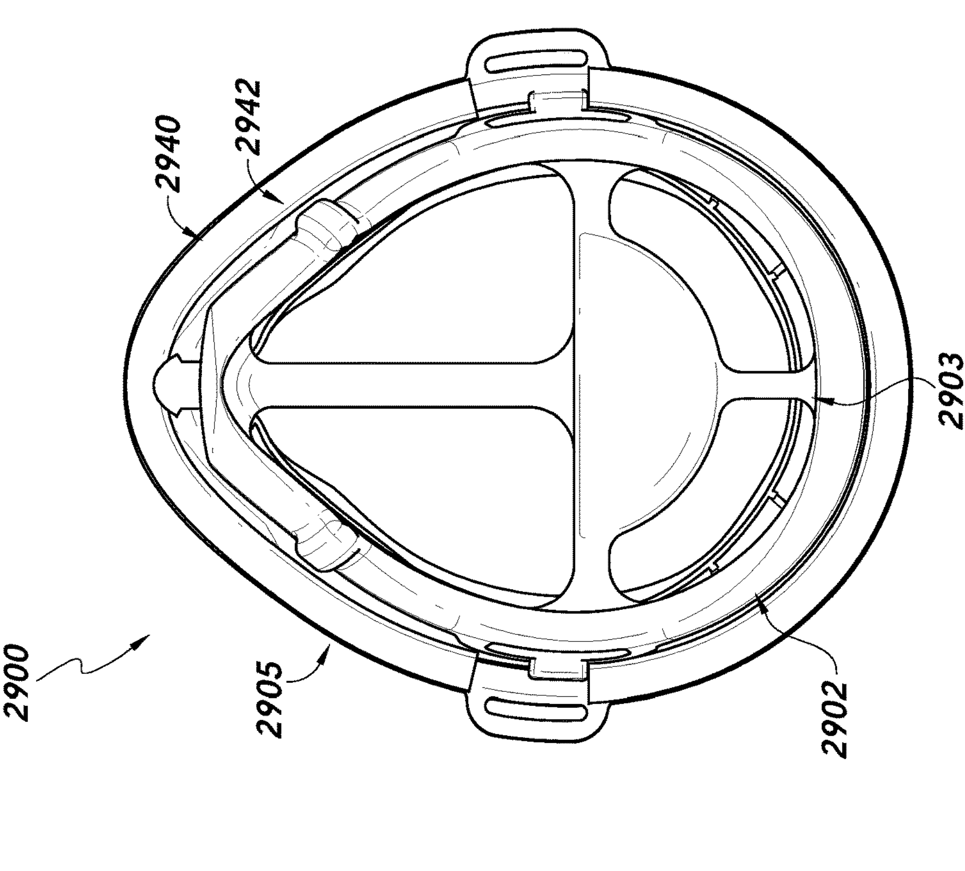
Figure 29D:
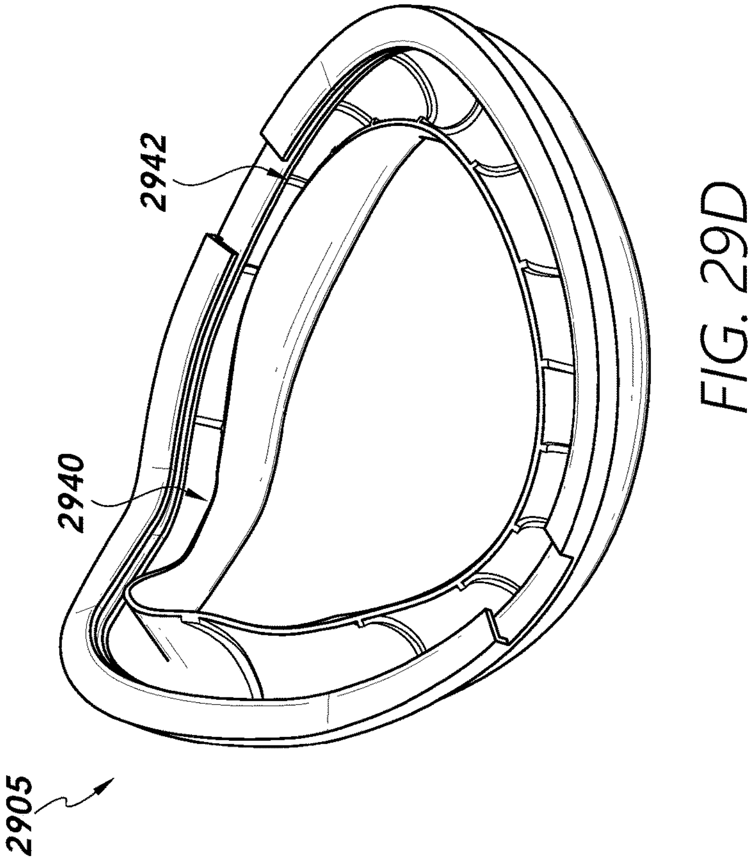
Figure 29C:
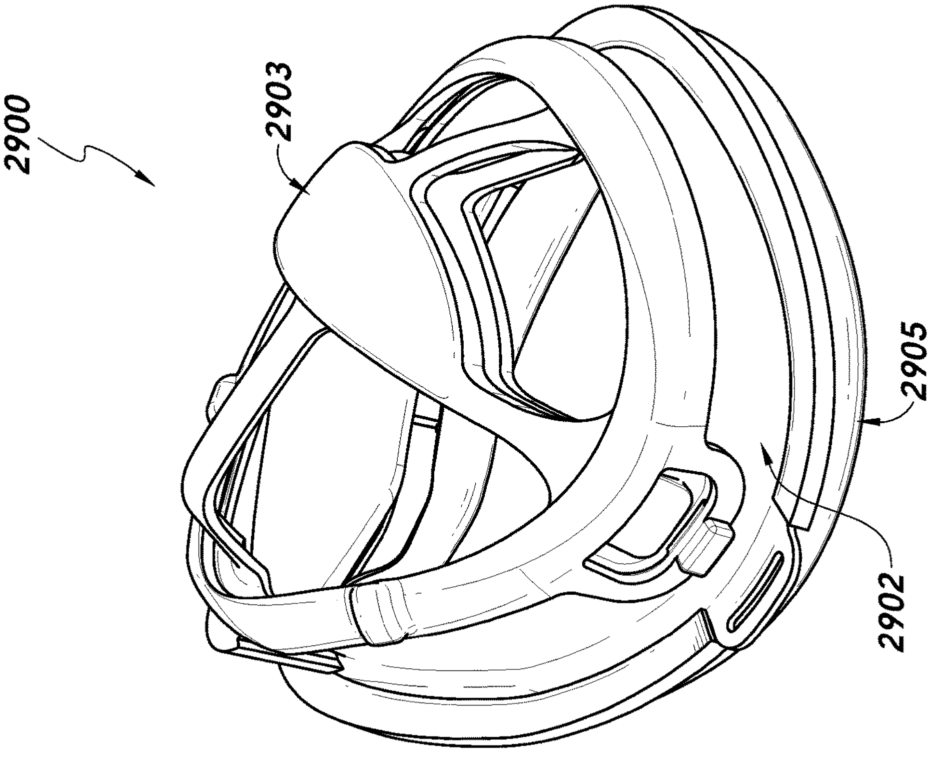
Figure 29E:
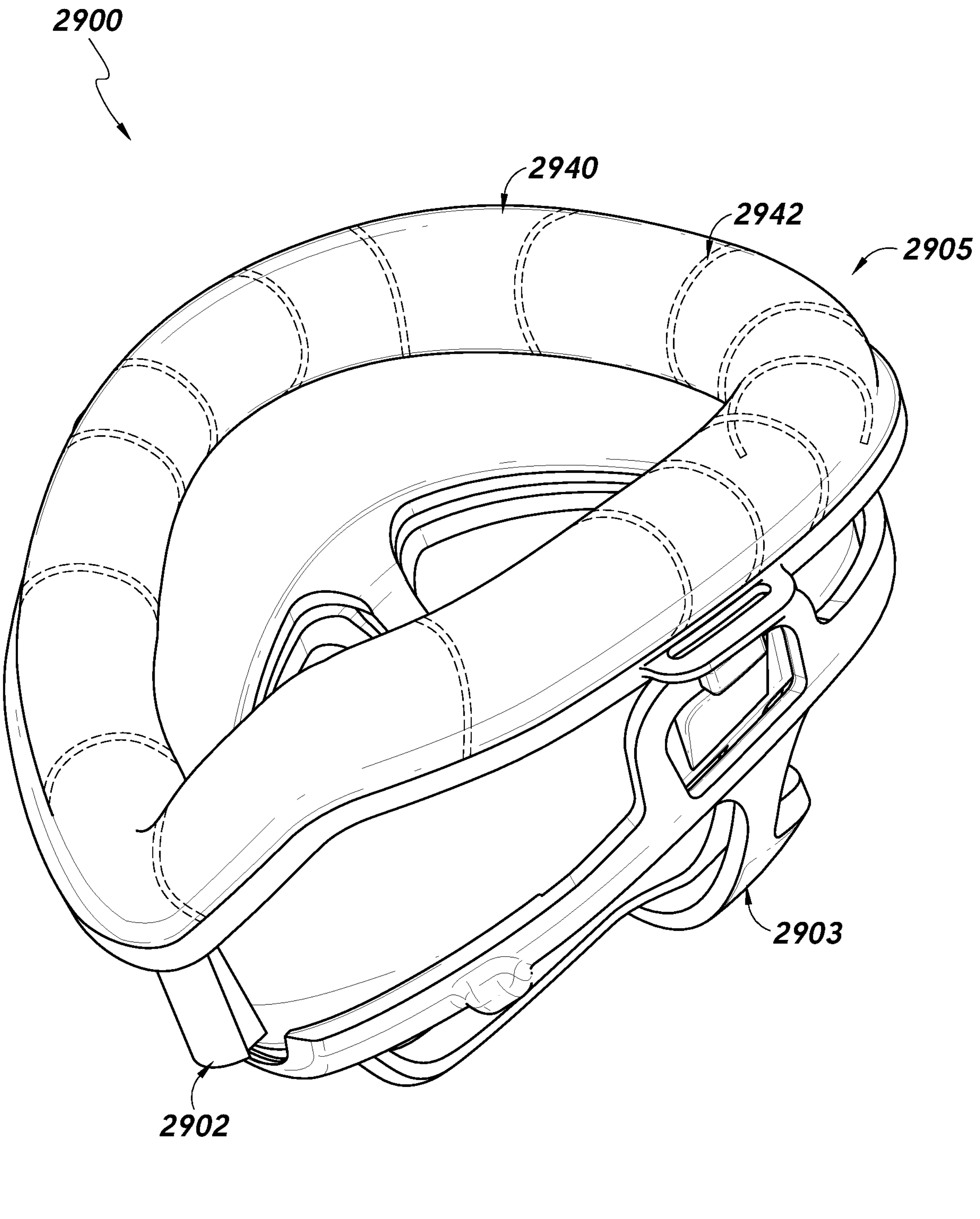

FIG. 28 illustrates at least a portion of a frame 2802 of a facial covering assembly comprising one or more adjustable user engagement features 2806. The adjustable user engagement features 2806 may be extendable and/or compressible using a turnable/twistable knob 2850 and/or similar mechanism. The user engagement features 2806 may be adjusted such that only a distal portion 2852 of the user engagement features 2806 may be configured to contact a user's ear (e.g., at a back portion of the user's ear) to maximize user comfort.

FIGS. 29A-29E provide various illustrations of at least portions of a facial covering assembly 2900. The facial covering assembly 2900 may comprise an inner frame 2902, an outer frame 2903, and/or a cushioning element 2905. The cushioning element 2905 can comprise one or more cushioning portions 2940 (e.g., sixteen cushioning portions 2940), which can include air pockets, air cells, and/or air pocket cells. The one or more cushioning portions 2940 may be separated by one or more ribs 2942 and/or other dividing and/or separating features. In some embodiments, the one or more cushioning portions 2940 may be configured to independently and/or collectively conform to a user's face to establish a seal with at least a portion of the user's face. The one or more cushioning portions 2940 may be configured to internally conform to the user's facial features.

In some embodiments, the cushioning element 2905 may comprise Velcro and/or similar attachment features and/or materials to enable the cushioning element 2905 to be removably attached to the inner frame 2902 and/or to enable the cushioning element 2905 to be removed from the inner frame 2902 to facilitate cleaning of the facial covering assembly 2900.

Figure 30A:
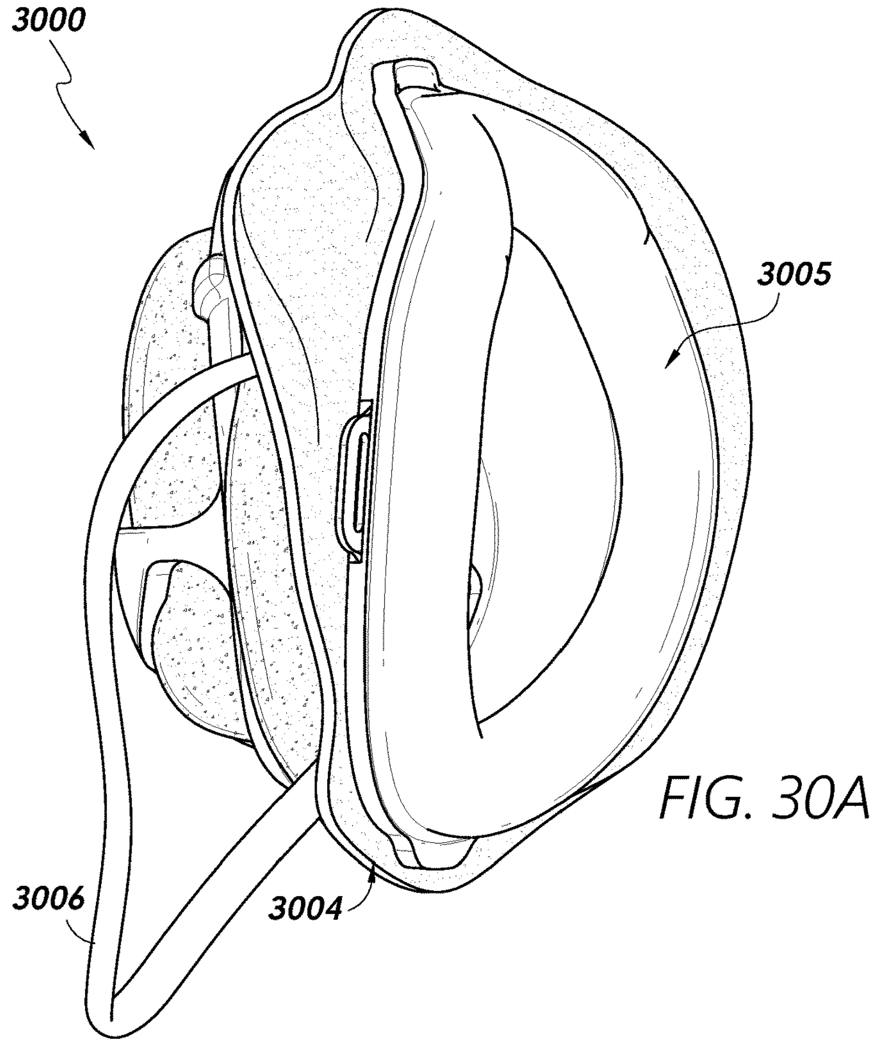
FIGS. 30A and 30B illustrate example facial covering assemblies comprising one or more face masks, a cushioning element, user engagement features (e.g., extending from the one or more face masks), and/or a frame in accordance with one or more embodiments.
Figure 30B:
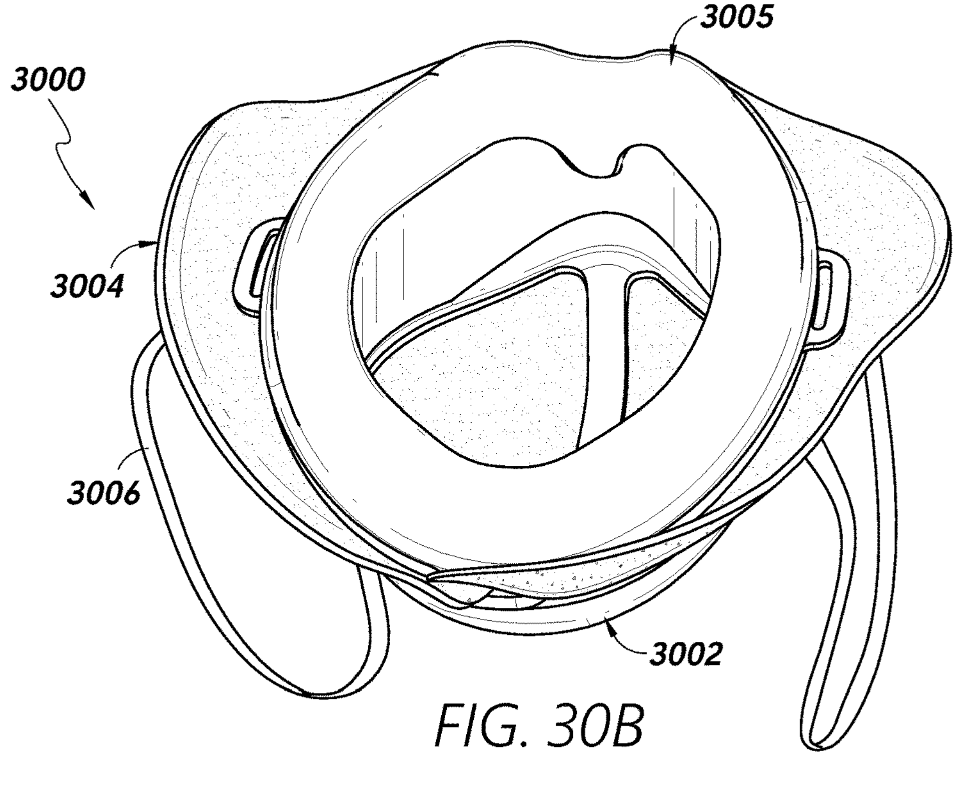
Figure 31B:
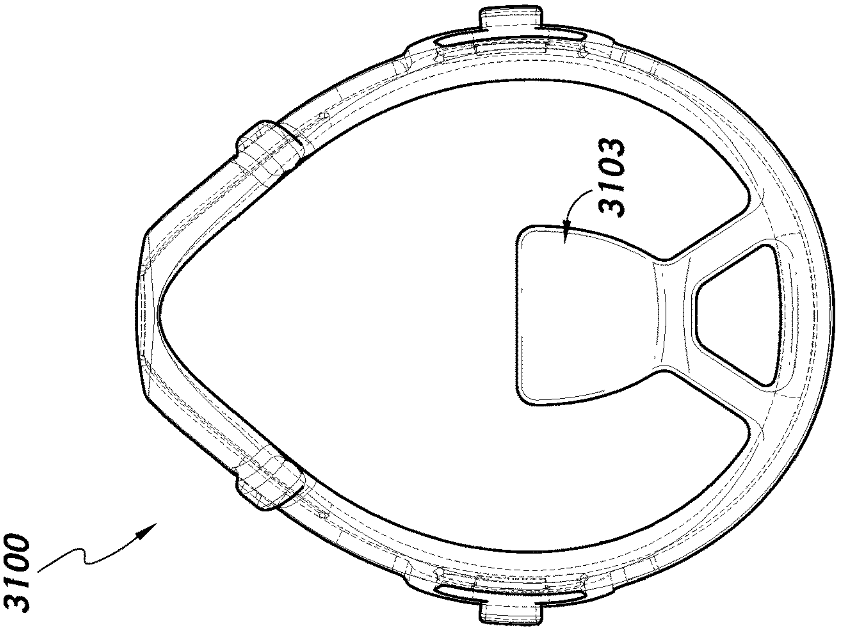
FIGS. 31A-31D illustrate back/inside views of an example facial covering assembly comprising an inner frame, an outer frame, and/or a cushioning element in accordance with one or more embodiments.
Figure 31A:
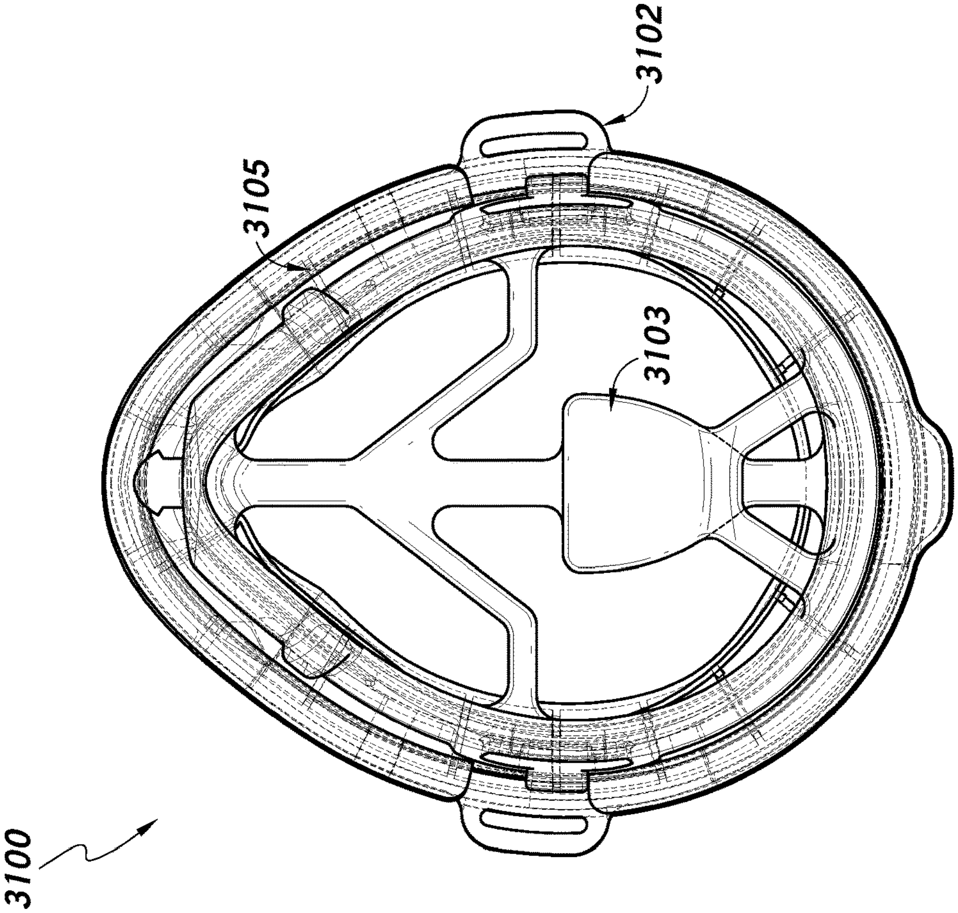
Figure 31D:
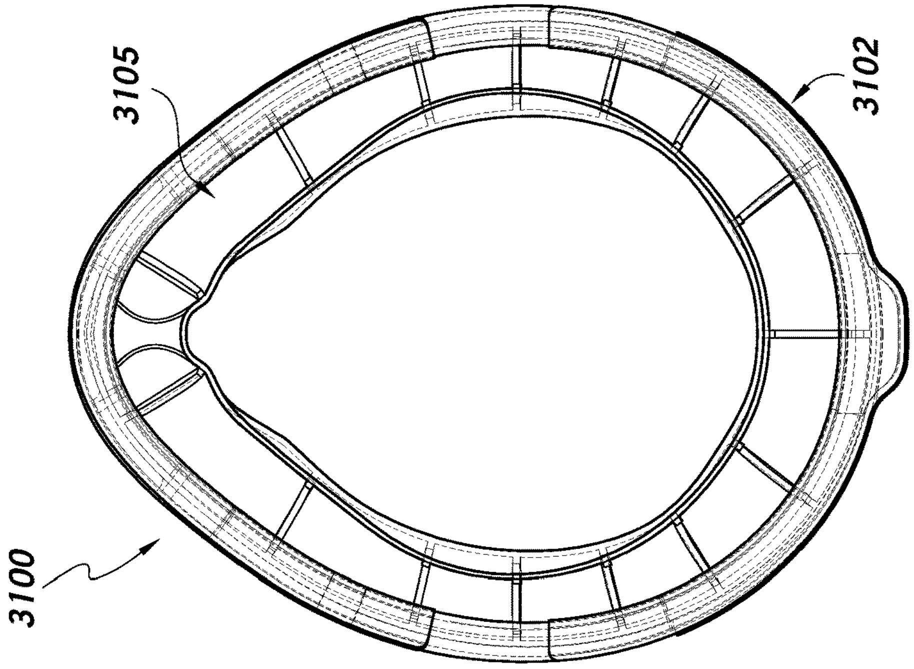
Figure 31C:
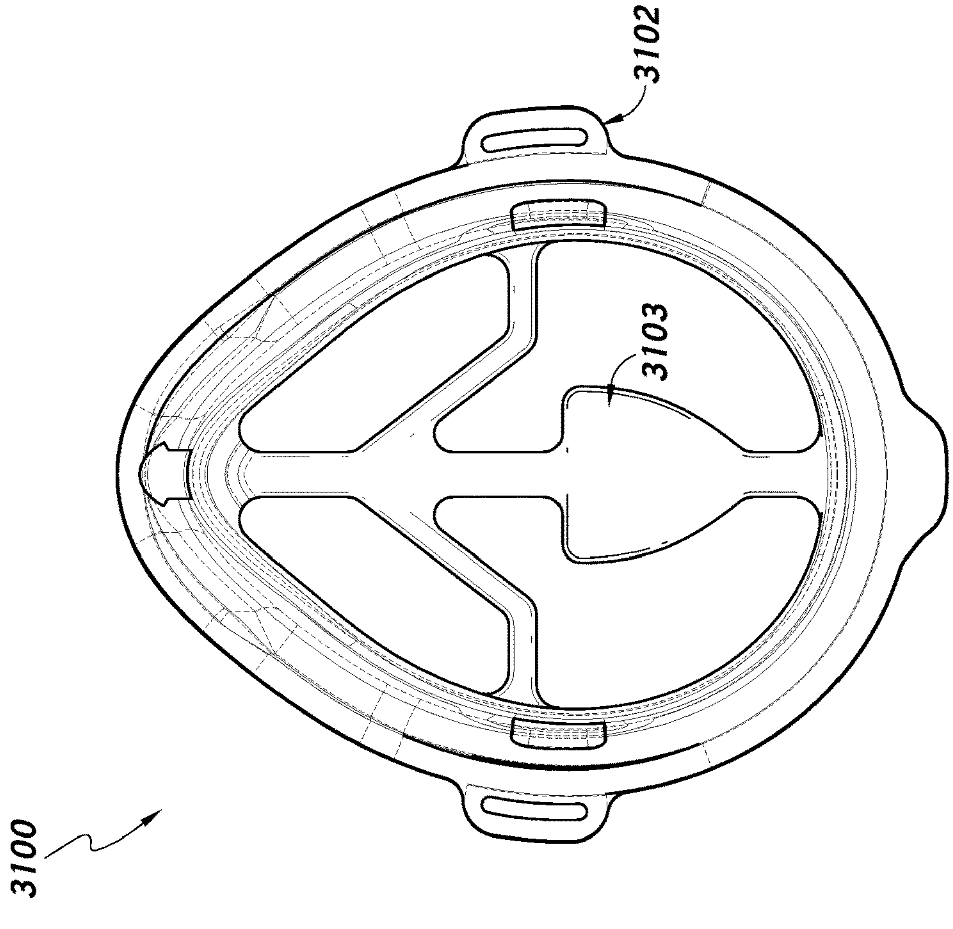
Figure 32B:
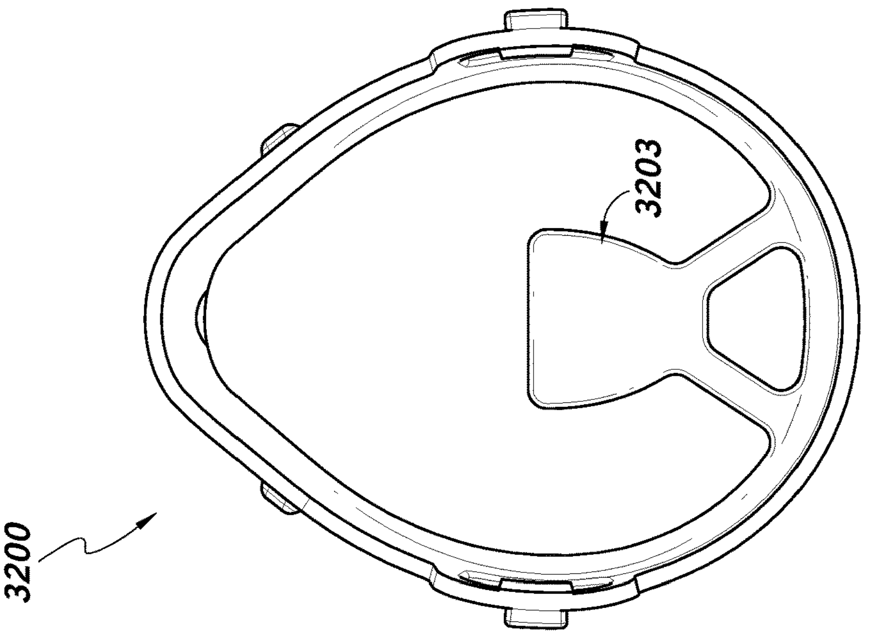
FIGS. 32A-32D illustrate back/inside views of an example facial covering assembly comprising an inner frame, an outer frame, and/or a cushioning element in accordance with one or more embodiments.
Figure 32A:
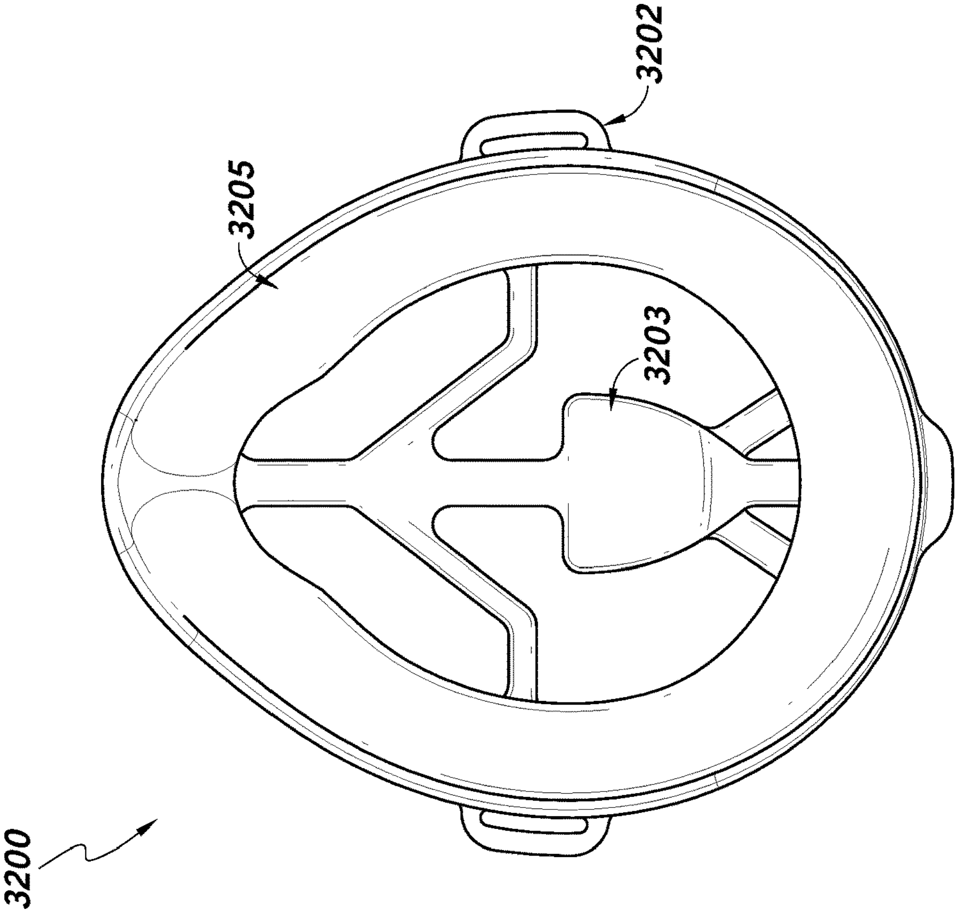
Figure 32D:
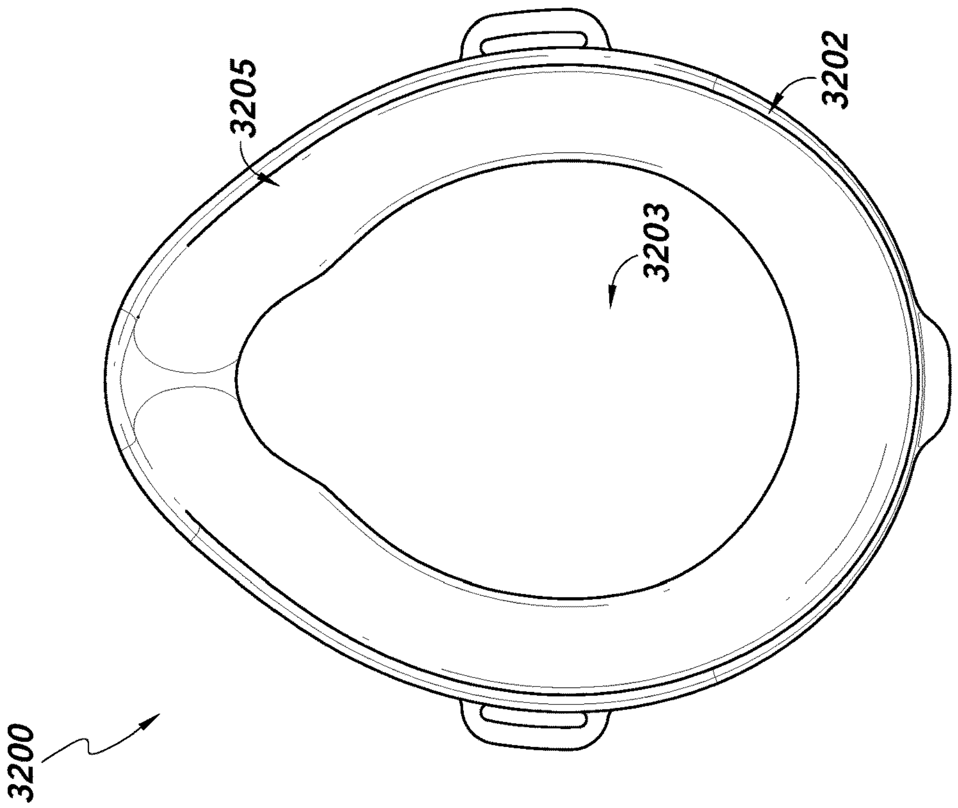
Figure 32C:
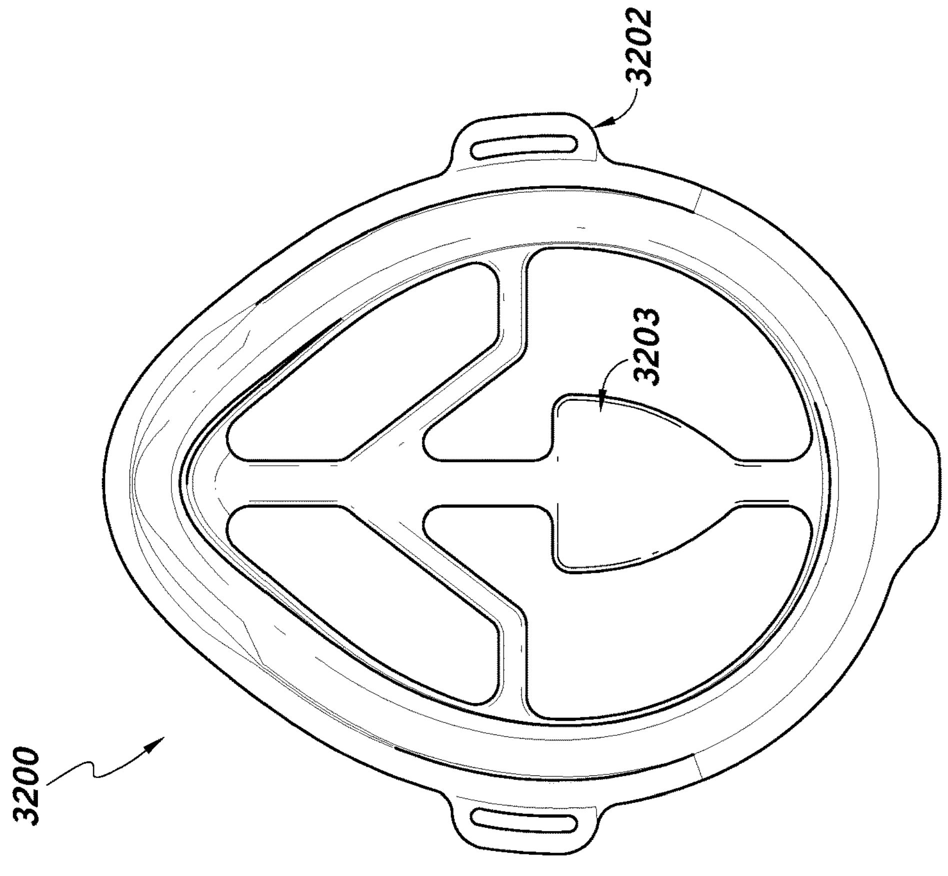
Figure 33B:
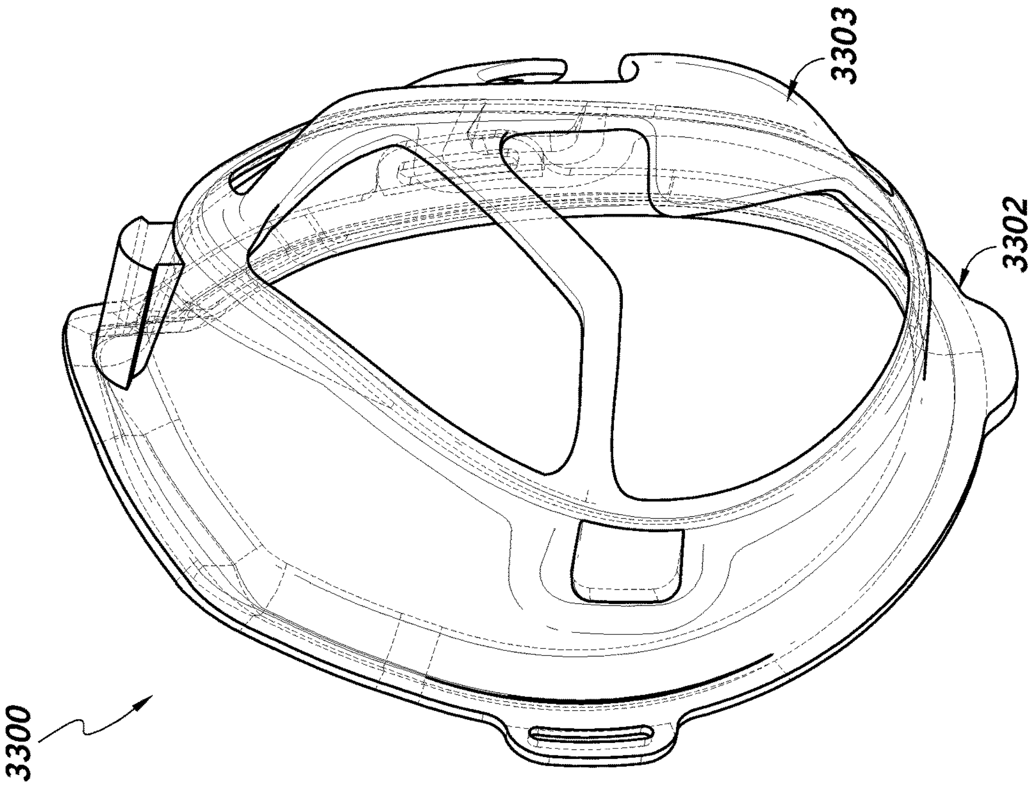
FIGS. 33A-33D illustrate side views of an example facial covering assembly comprising an inner frame, an outer frame, and/or a cushioning element in accordance with one or more embodiments.
Figure 33A:
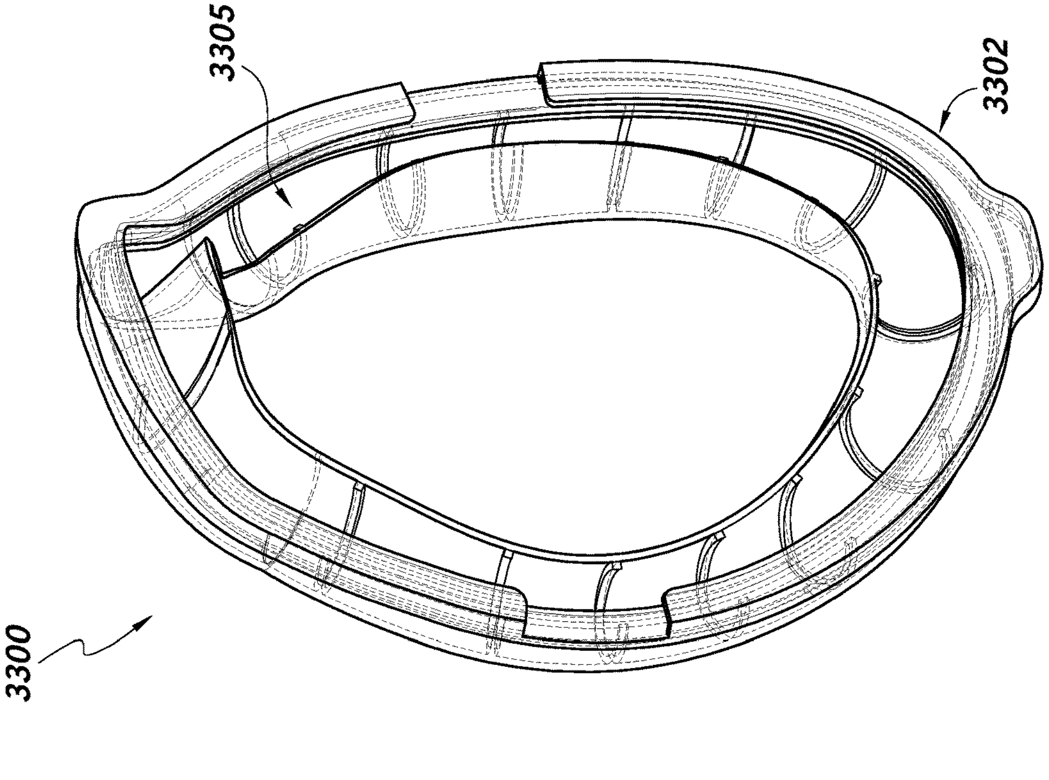
Figure 33D:
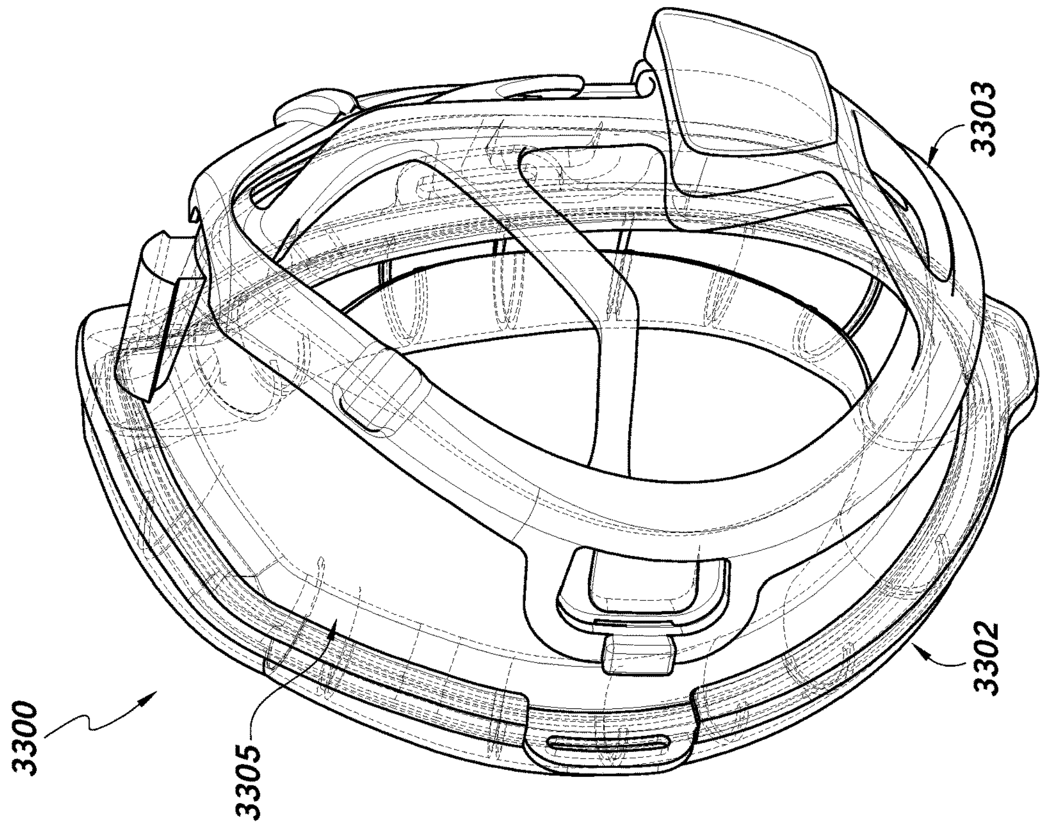
Figure 33C:
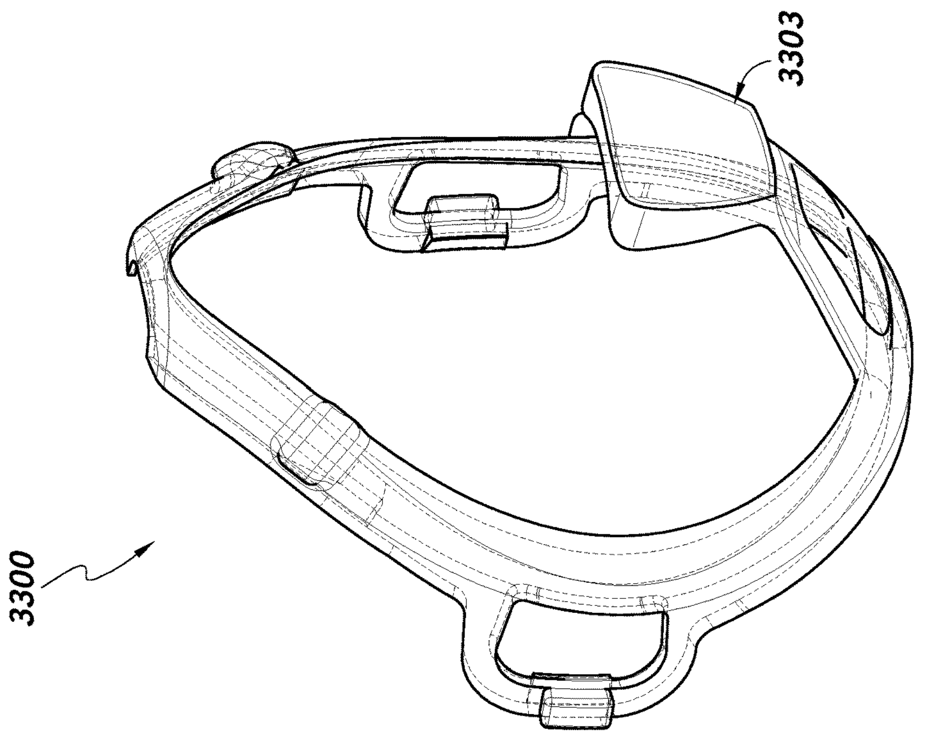
Figure 34B:
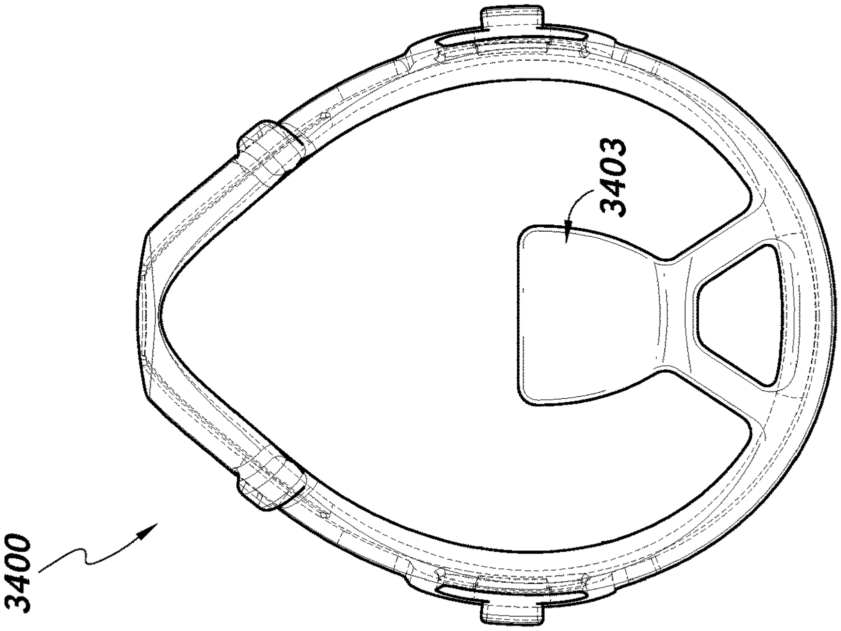
FIGS. 34A-34D illustrate back/inside views of an example facial covering assembly comprising an inner frame, an outer frame, and/or a cushioning element in accordance with one or more embodiments.
Figure 34A:
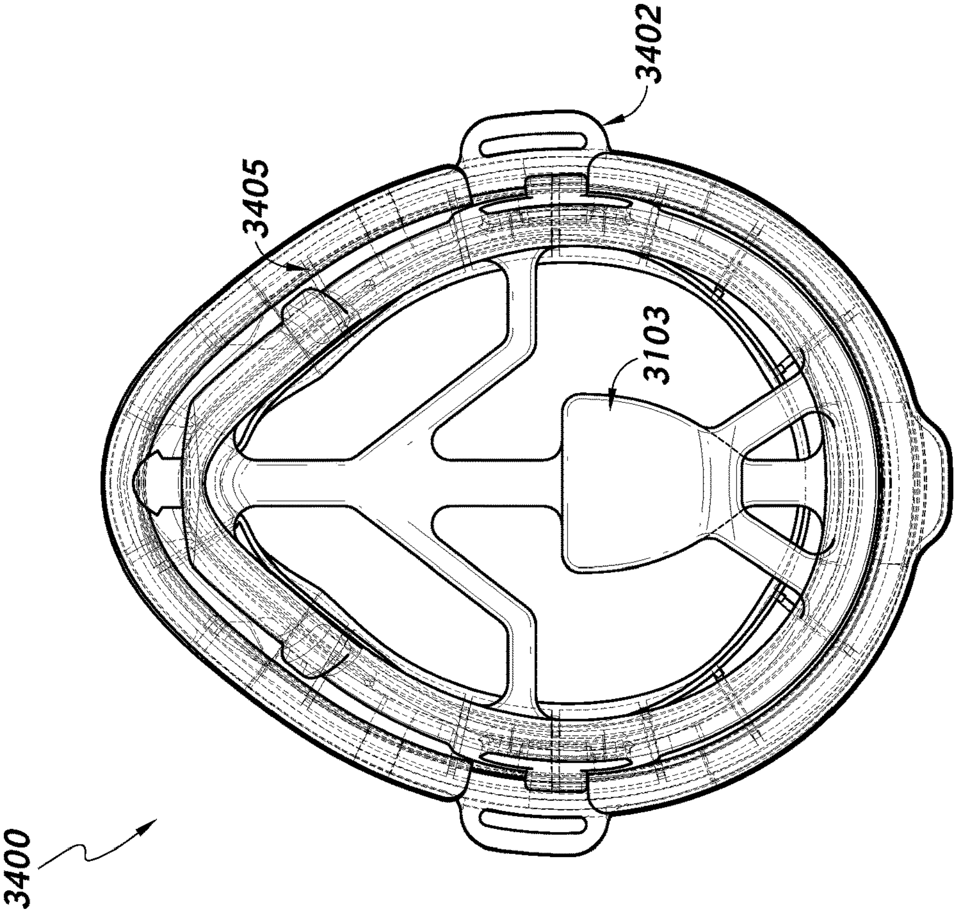
Figure 34D:
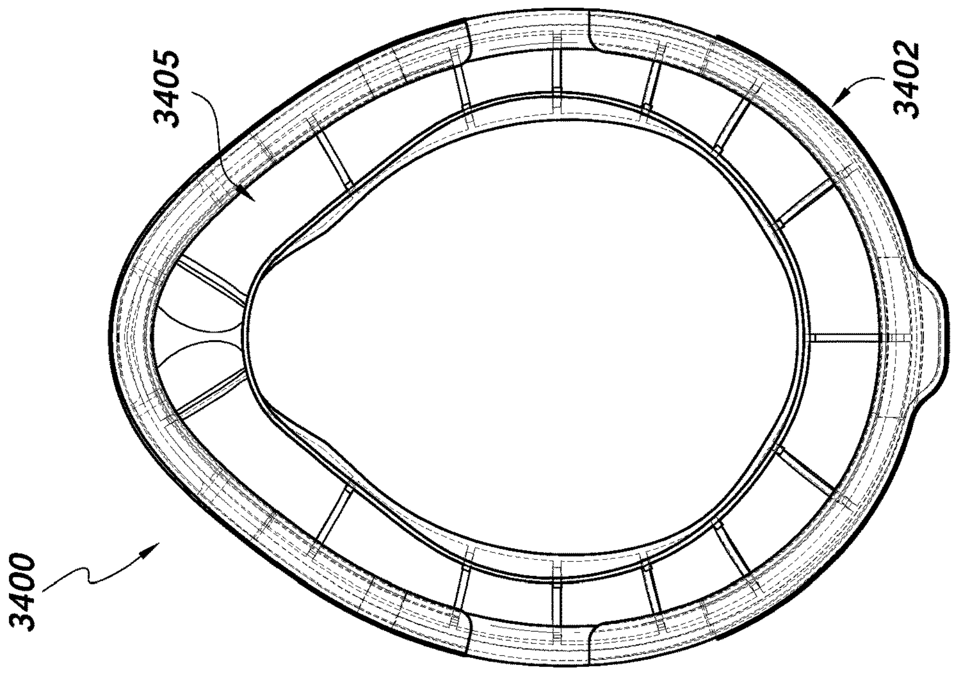
Figure 34C:
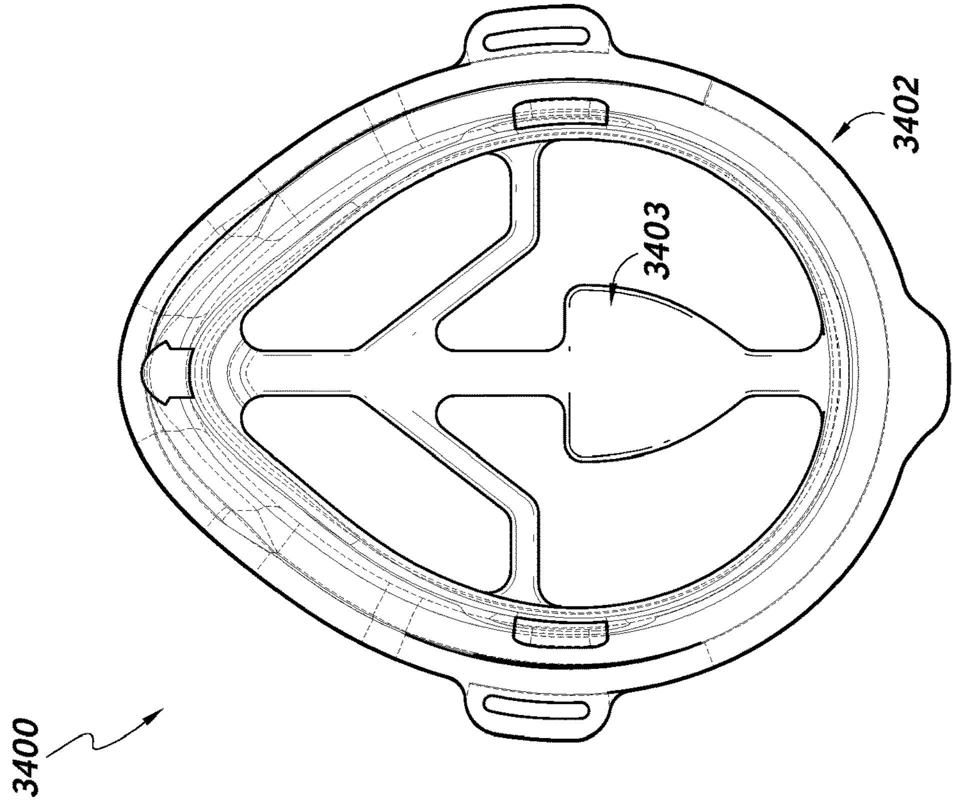
Figure 35B:
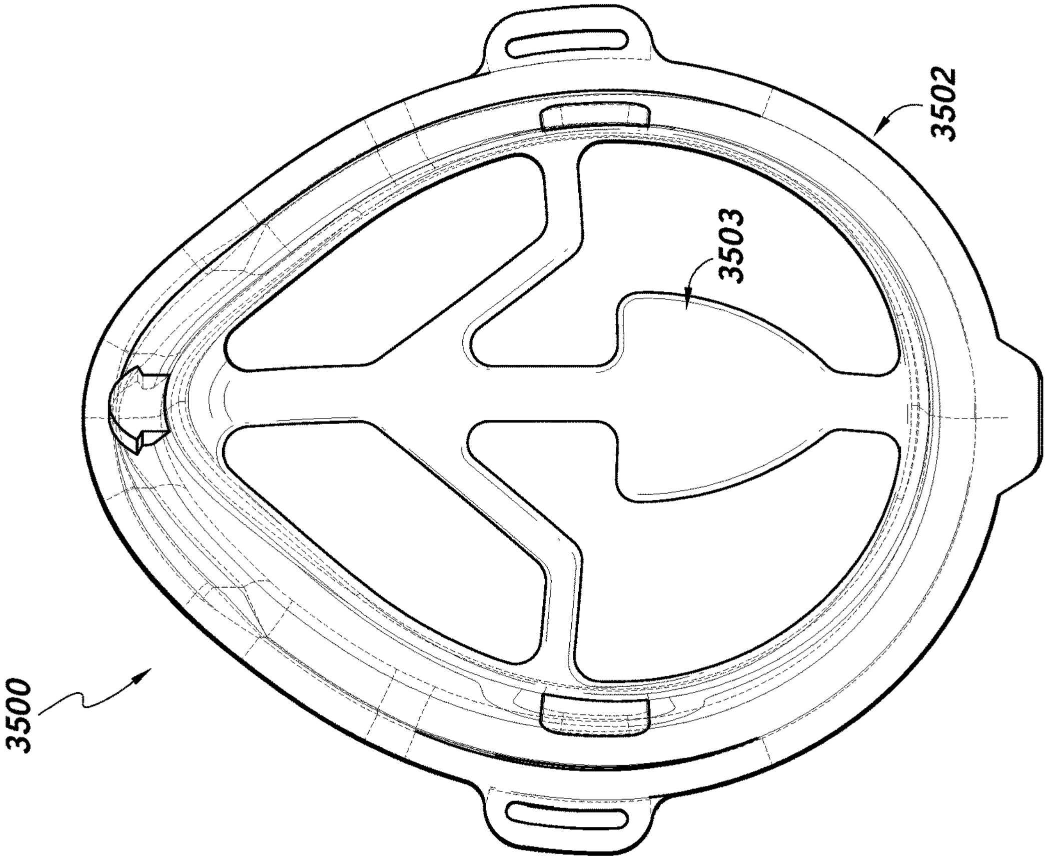
FIGS. 35A-35D illustrate front/outside views of an example facial covering assembly comprising an inner frame, an outer frame, and/or a cushioning element in accordance with one or more embodiments.
Figure 35A:
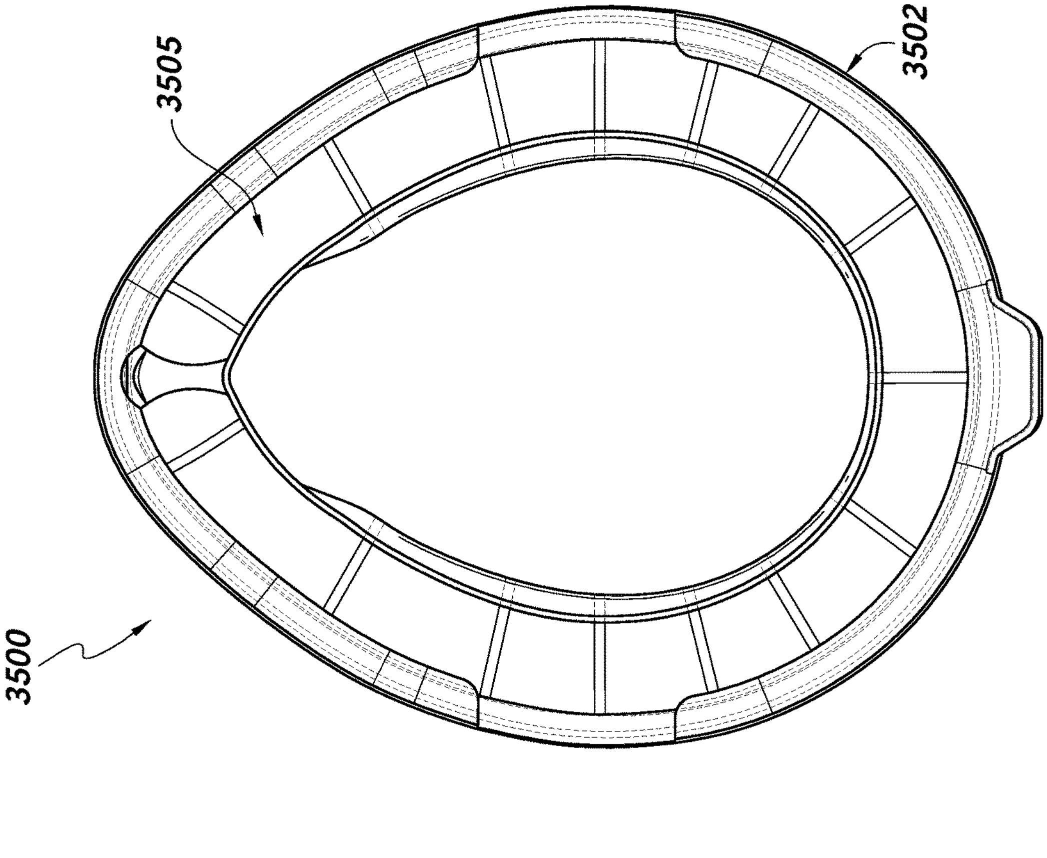
Figure 35D:
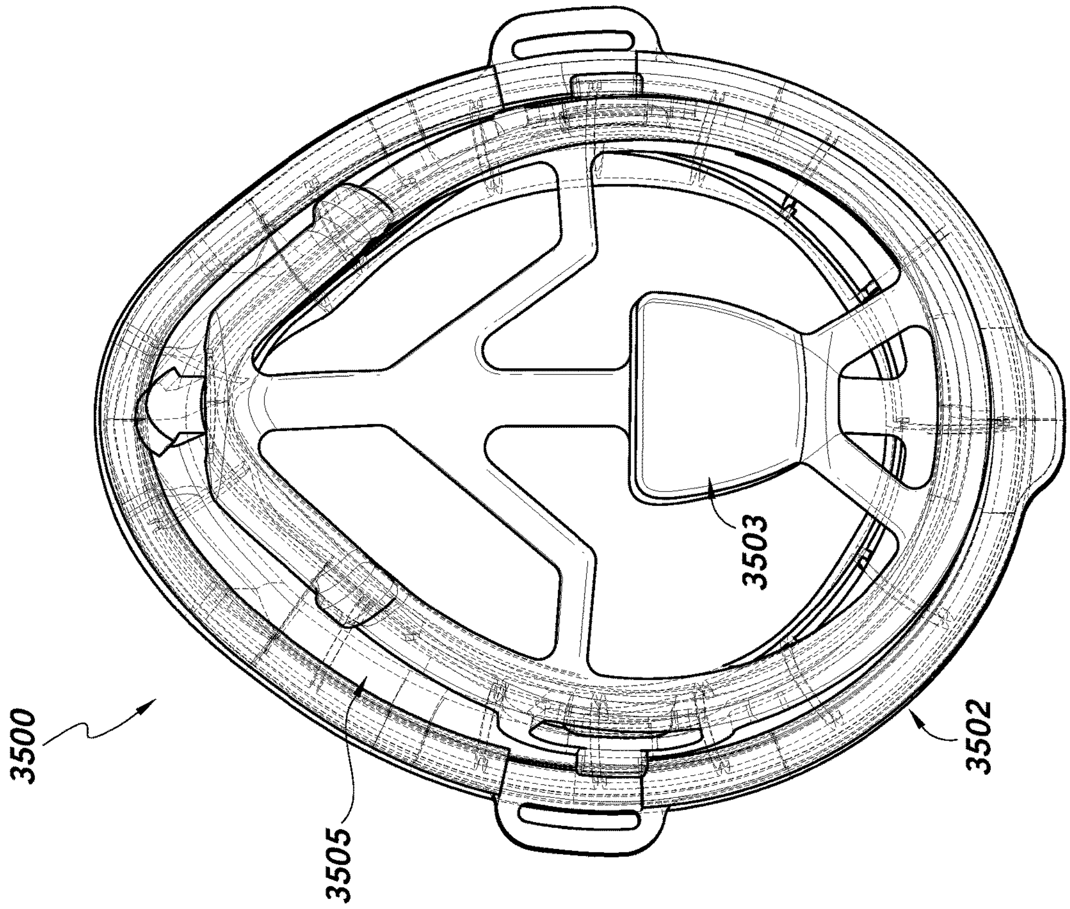
Figure 35C:
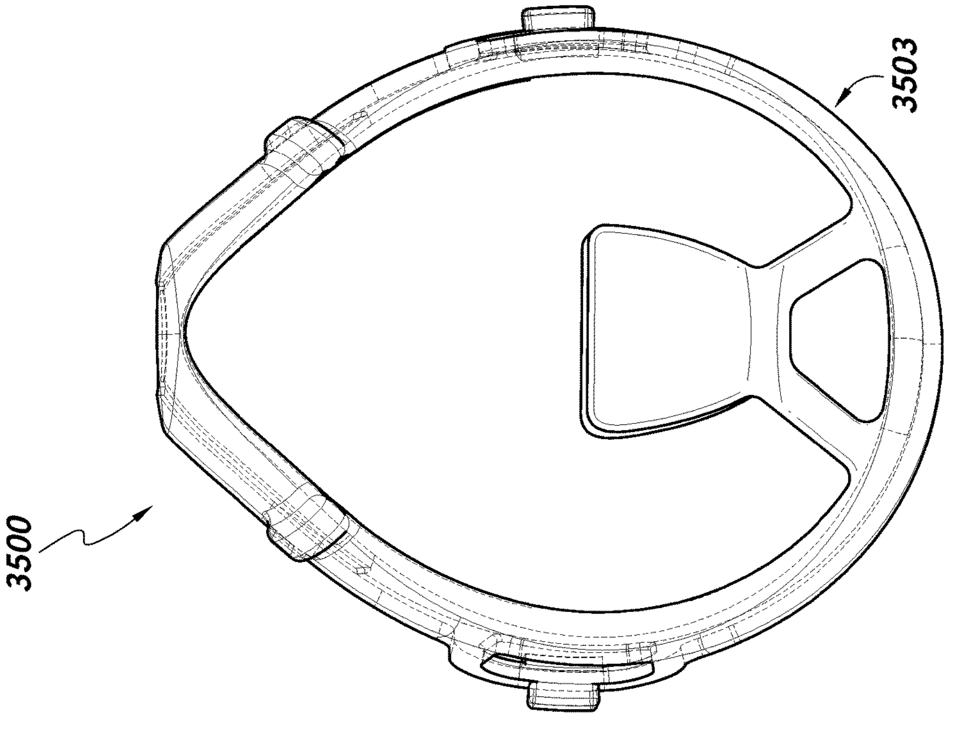
Figure 36B:
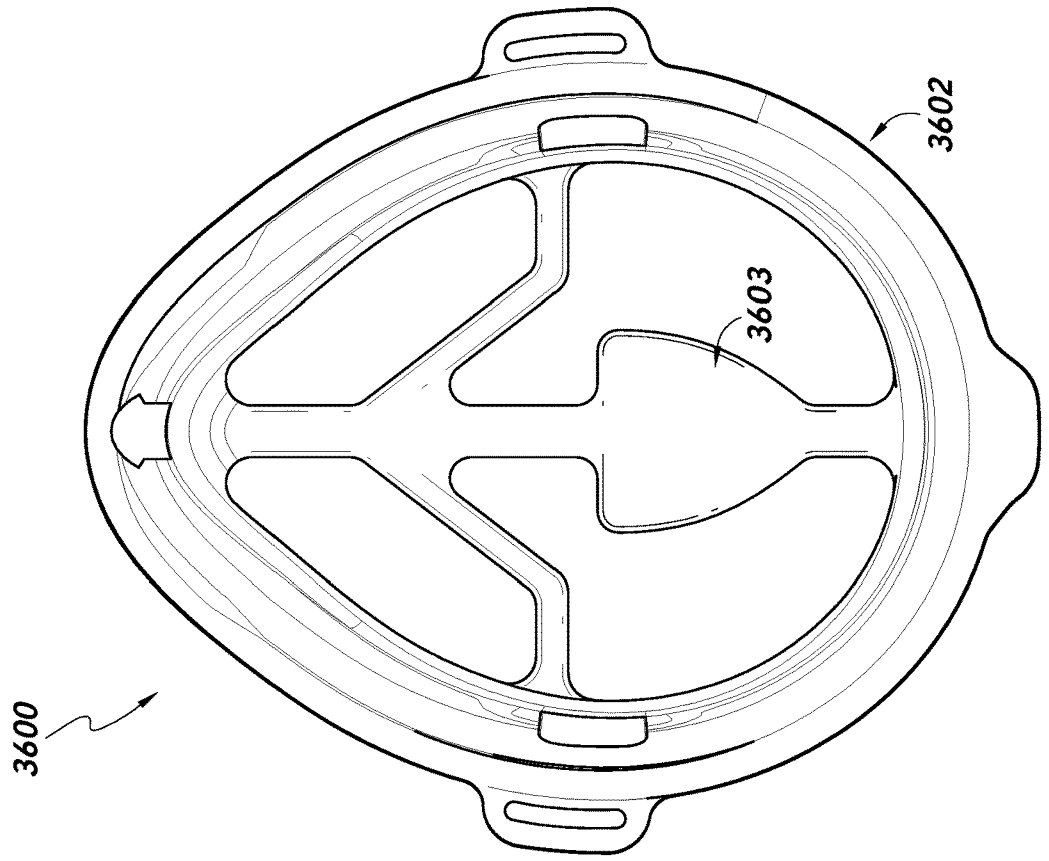
FIGS. 36A-36D illustrate front/outside views of an example facial covering assembly comprising an inner frame, an outer frame, and/or a cushioning element in accordance with one or more embodiments.
Figure 36A:
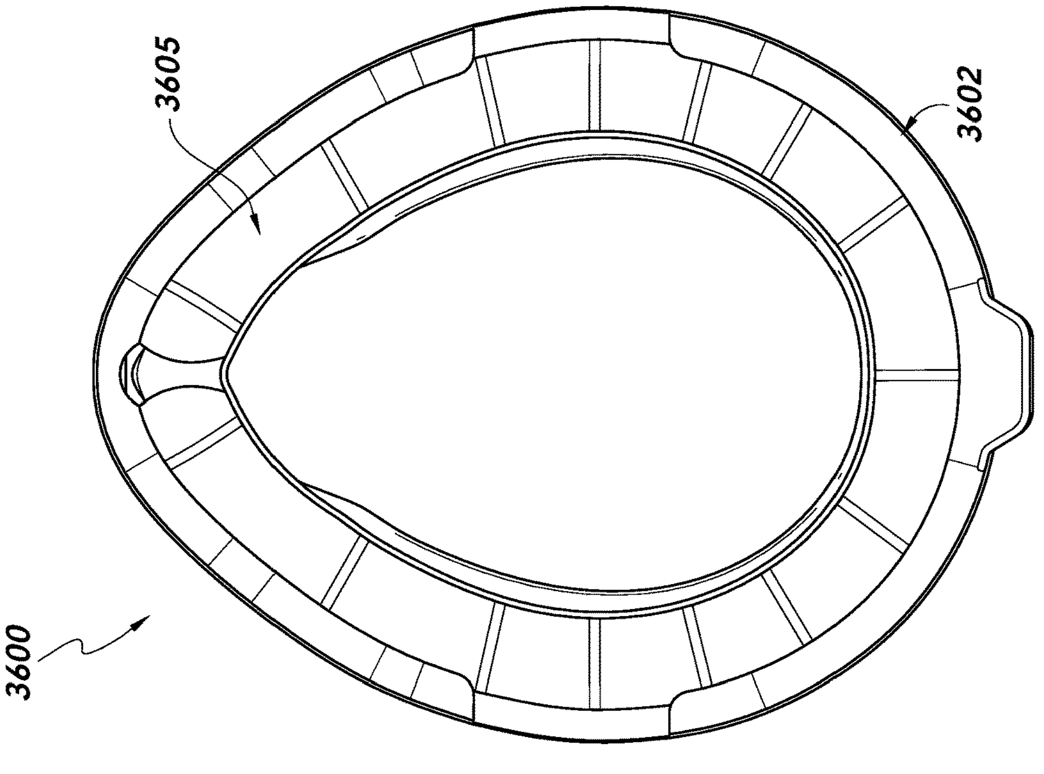
Figure 36D:
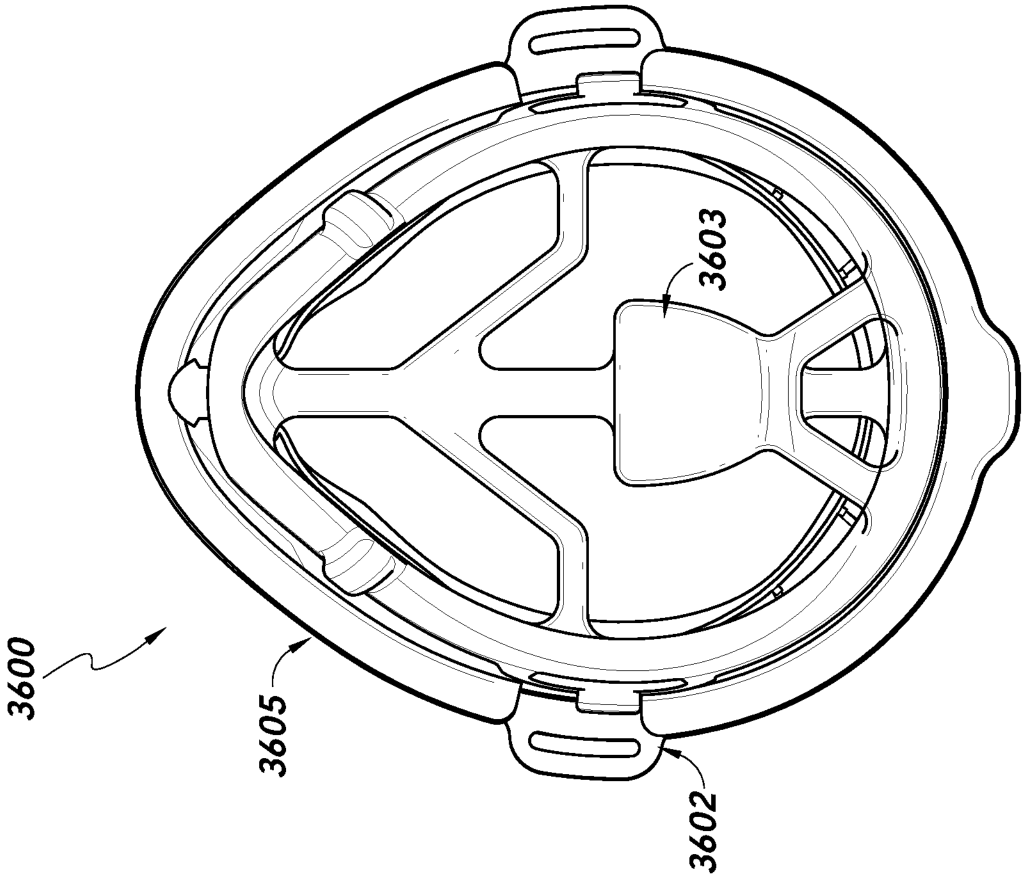
Figure 36C:
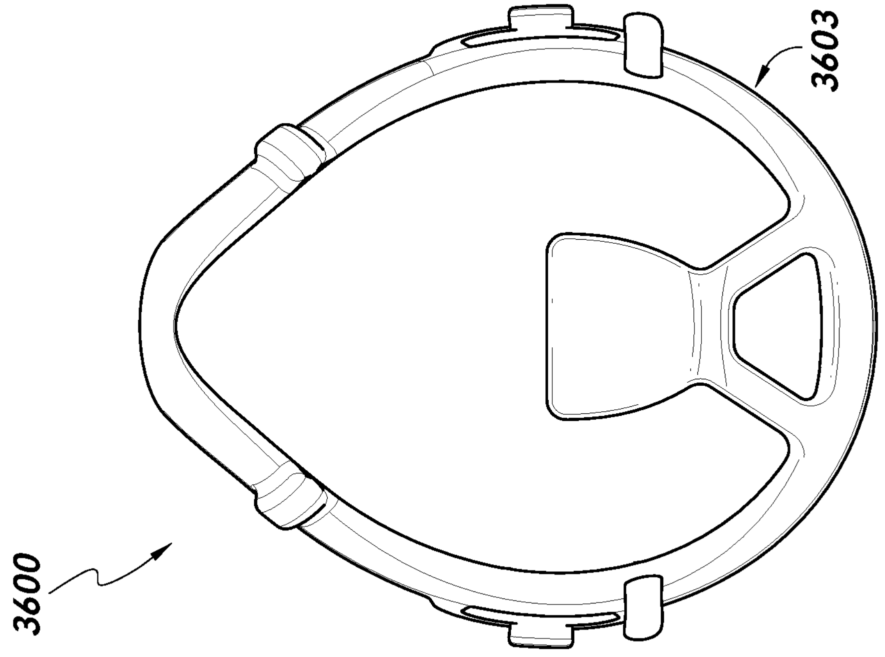
Figure 37D:
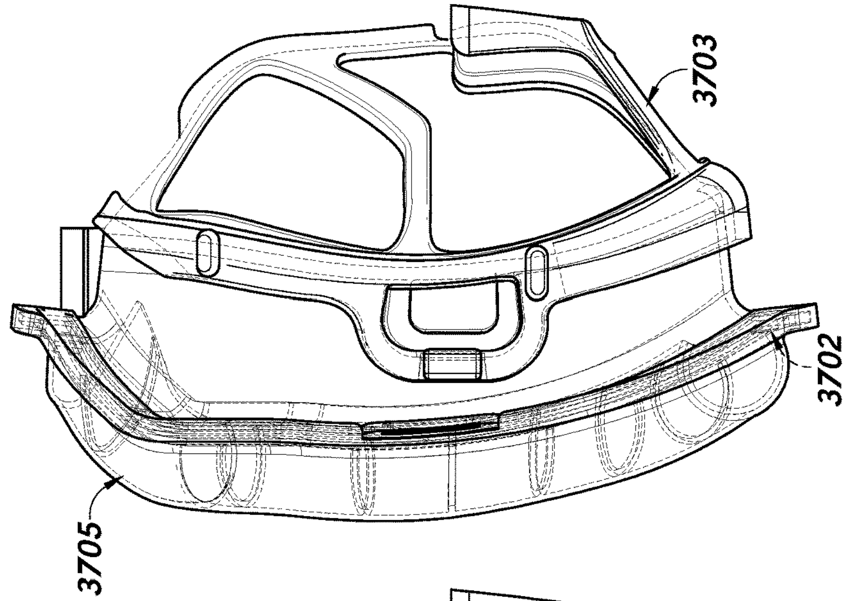
FIGS. 37A-37D illustrate side views of an example facial covering assembly comprising an inner frame, an outer frame, and/or a cushioning element in accordance with one or more embodiments.
Figure 37C:
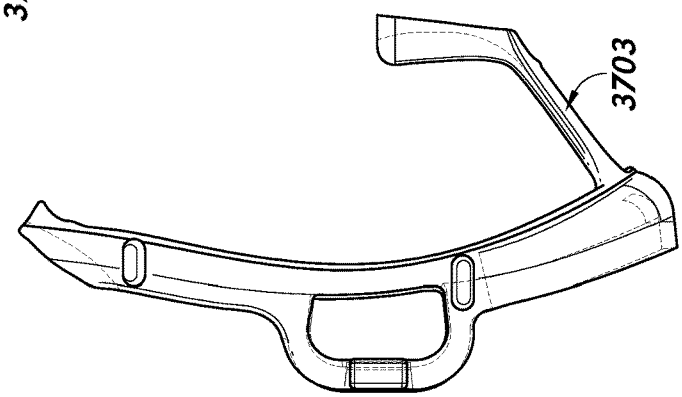
Figure 37B:
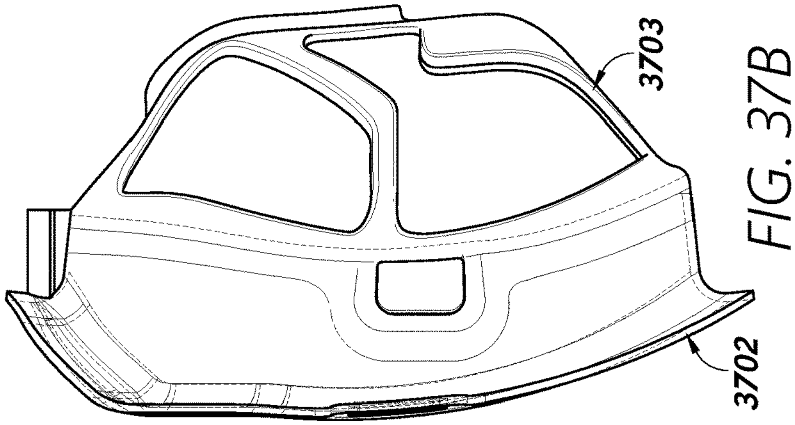
Figure 37A:
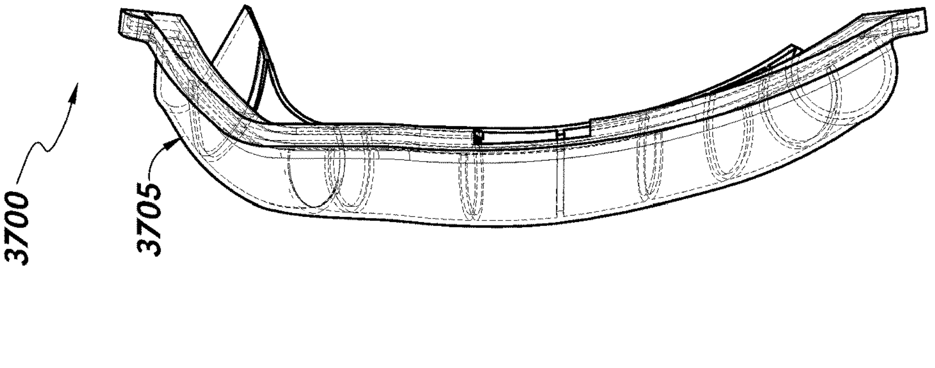
Figure 38D:
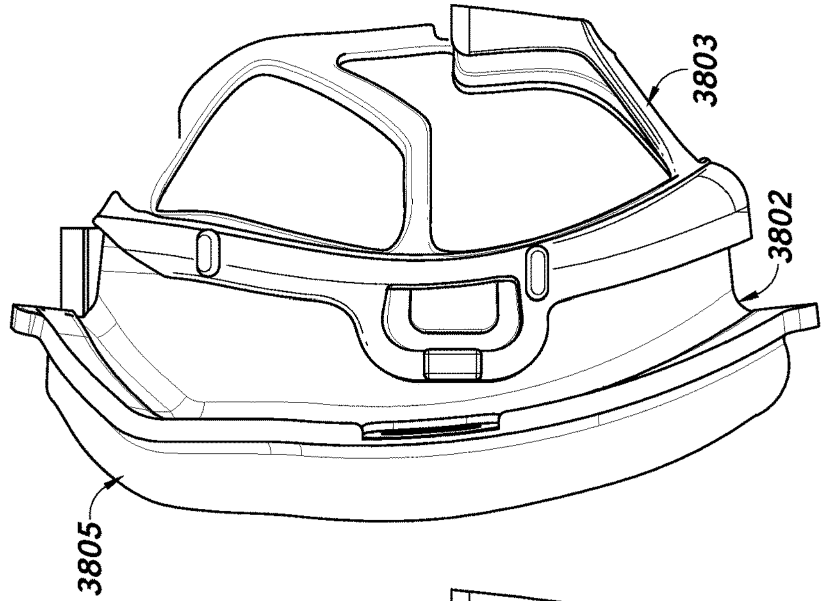
FIGS. 38A-38D illustrate side views of an example facial covering assembly comprising an inner frame, an outer frame, and/or a cushioning element in accordance with one or more embodiments.
Figure 38C:
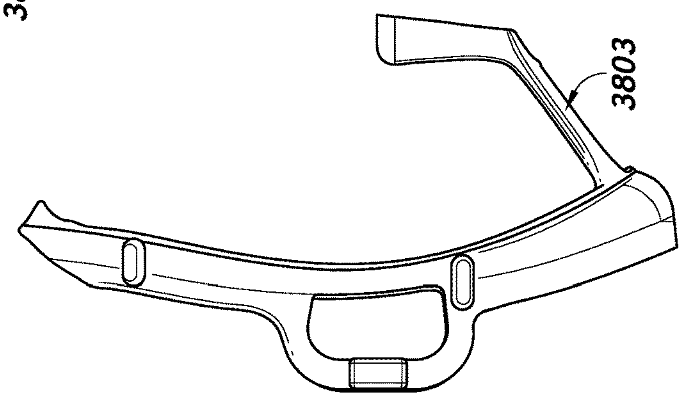
Figure 38B:
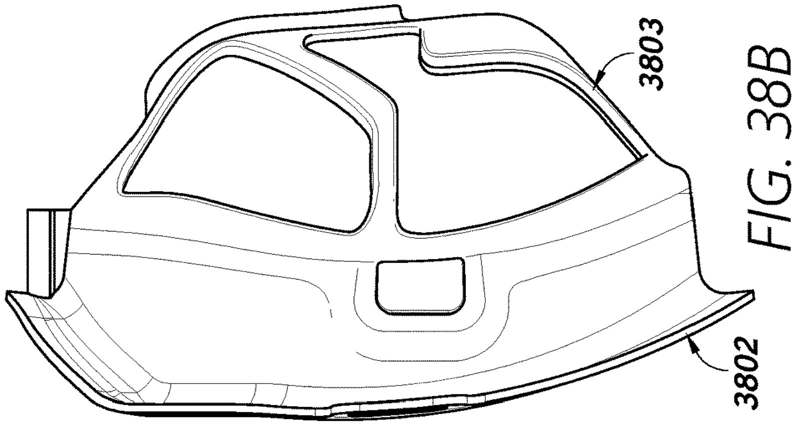
Figure 38A:
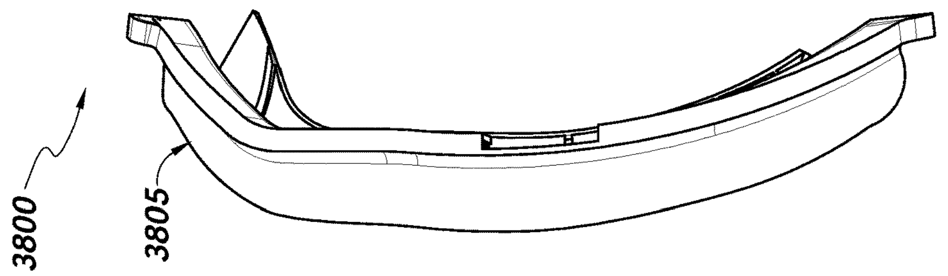
Figure 39B:
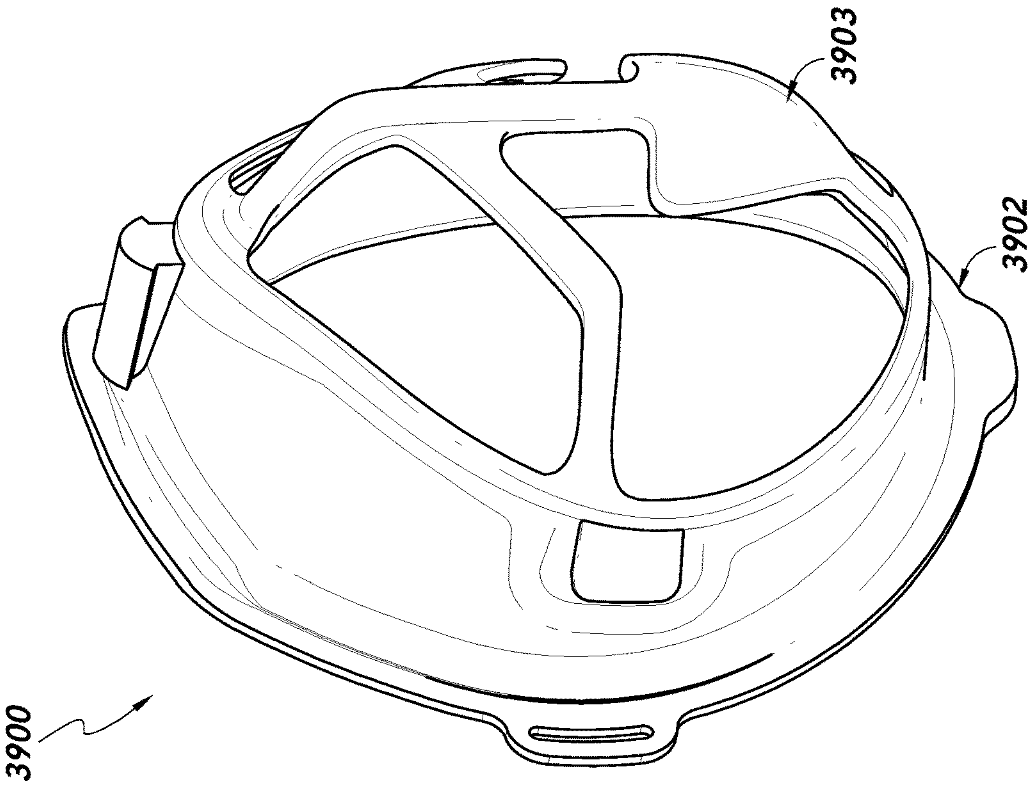
FIGS. 39A-39D illustrate perspective views of an example facial covering assembly comprising an inner frame, an outer frame, and/or a cushioning element in accordance with one or more embodiments.
Figure 39A:
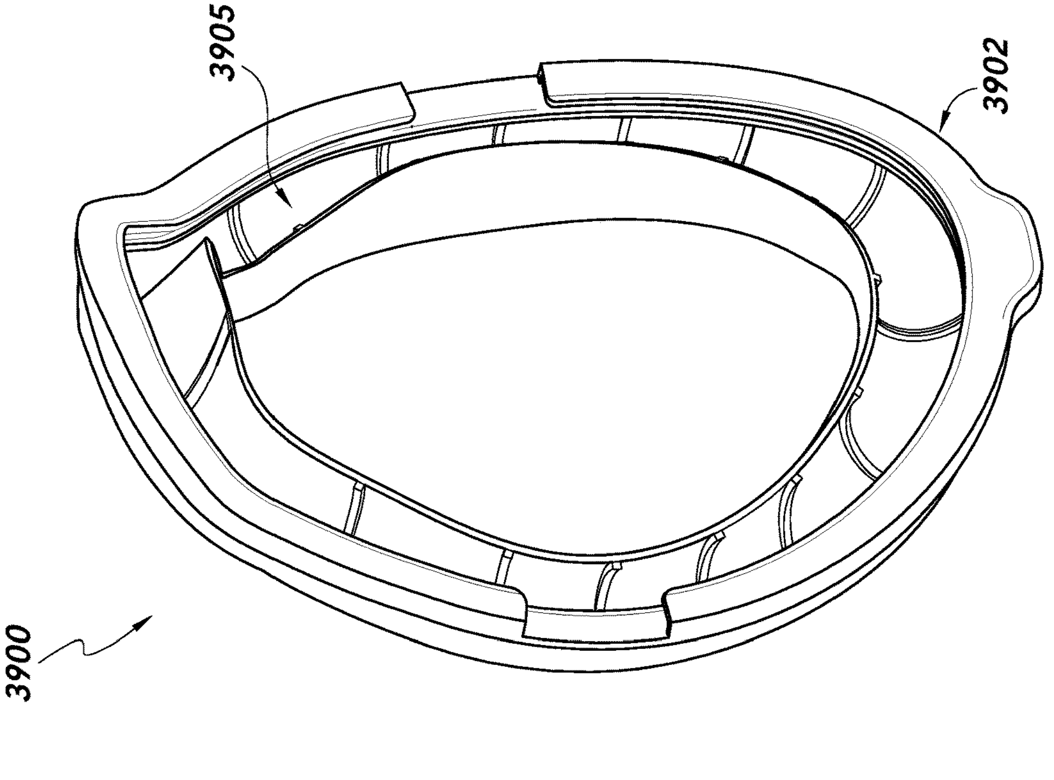
Figure 39D:
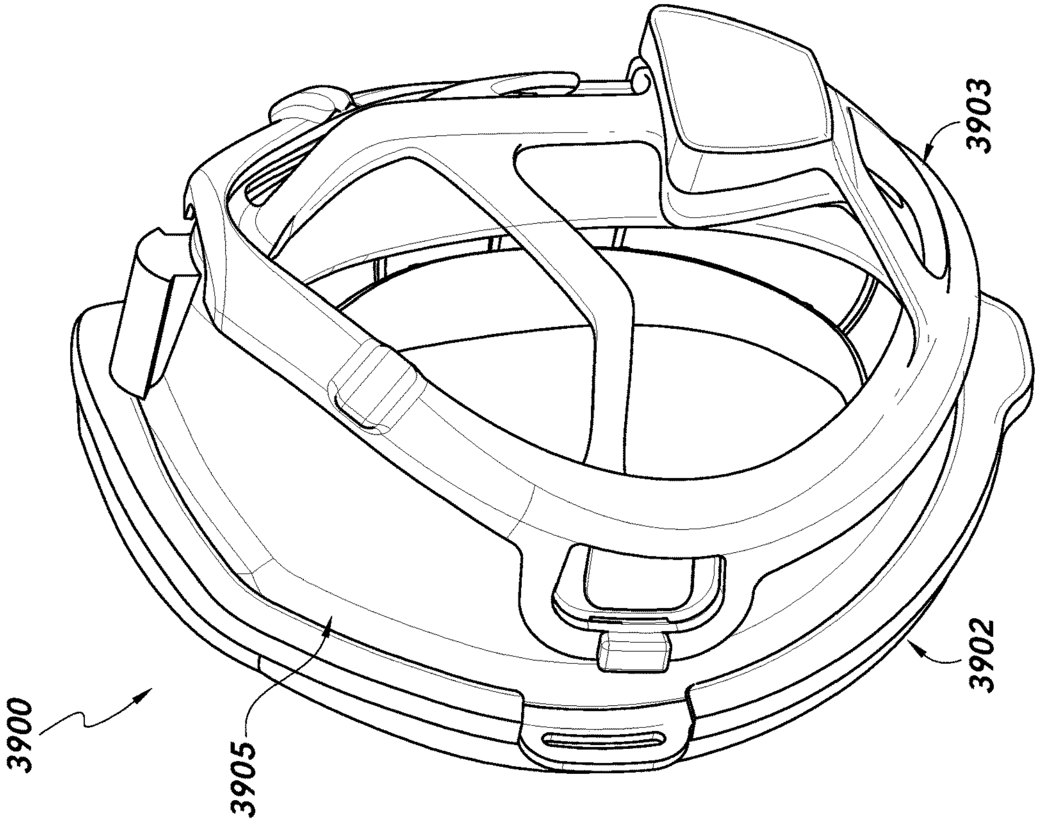
Figure 39C:
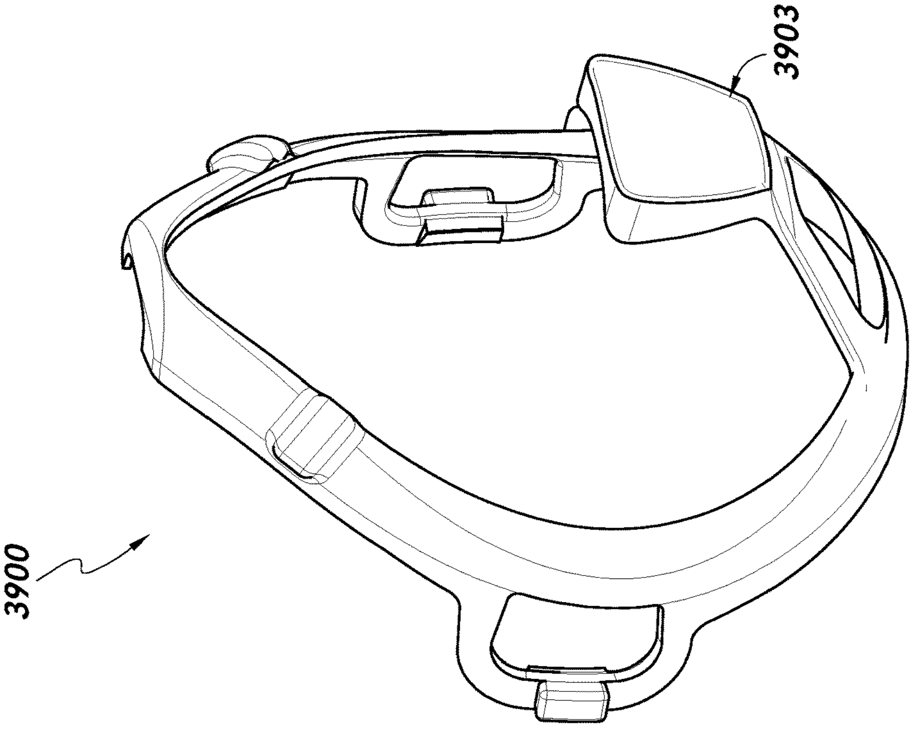

FIGS. 30A and 30B illustrate example facial covering assemblies 3000 comprising one or more face masks 3004, a cushioning element 3005, user engagement features 3006 (e.g., extending from the one or more face masks 3004), and/or a frame 3002. In some embodiments, multiple face masks 3004 and/or portions of multiple face masks 3004 may be included in a facial covering assembly 3000. For example, a central portion of a surgical mask (e.g., the portion identified by the dashed circle 401 in FIG. 4A and/or surrounding portions) may be cut out of the surgical mask and/or may be layered with one or more additional face masks 3004.

The various facial covering assemblies described herein can include any number and/or size of filtration portions and/or elements. Some facial covering assemblies can comprise oxygen enhancement units and/or virus containment units. In some embodiments, a facial covering assembly can comprise one or more sensors (e.g., inertial measurement unit sensors (IMUs)) configured to identify a user wearing a facial covering assembly and/or to track how often a user wears a facial covering assembly. For example, a sensor may be positioned at or near a bottom portion of a facial covering assembly (e.g., near a user's chin when worn by a user).

Facial covering assemblies described herein may be configured to convert a variety of face masks and/or other coverings into better-fitting and/or more effective filtration devices (e.g., increasing a seal up to approximately ninety-nine percent or greater). Some facial covering assemblies can comprise cushioning elements comprising multiple (e.g., fifteen) air cellular units comparable to the comfort of pillow cushions with internal framing that can increase filtration by approximately 150%-300%, resulting in greater breathability, reusability, and/or adjustability (e.g., adjustable ear loops and/or other user engagement features).

Some facial covering assemblies can be configured to reshape existing face masks (e.g., surgical masks) to retain material structure and/or efficacy comparable to N-95 and/or other face masks. Such systems can also decrease cost while achieving an improved seal and/or increased filtration. The efficacy of existing face masks can be increased by fifty percent or more by minimizing leakage due to gaps between face masks and the user's face. Some facial covering assemblies can be customizable to the facial features of the user and/or can comprise ear loop adjustment features to increase protective levels and/or increase comfort. Facial covering assemblies can comprise outer barriers (i.e., outer frames) and/or inner barriers (i.e., inner frames) to protect filtering portions of the systems from contamination and/or to increase durability of the filtering portions. Some facial covering assemblies can minimize facial contact (e.g., approximately nine percent or less of the facial covering assemblies may be in contact with the user's facial area) and/or ear contact. Moreover, facial covering assemblies can reduce environmental impacts associated with face masks by increasing durability and/or usability of face masks. Some facial covering assemblies can comprise tri-nose airtight cellular units and/or multiple (e.g., three) protective levels. At least some portions of facial covering assemblies may be configured to be completely isolated from the user's nose and/or mouth contamination, improving breathability and/or airflow velocity.

FIGS. 31A-31D illustrate back/inside views of an example facial covering assembly 3100 comprising an inner frame 3102, an outer frame 3103, and/or a cushioning element 3105.

FIGS. 32A-32D illustrate back/inside views of an example facial covering assembly 3200 comprising an inner frame 3202, an outer frame 3203, and/or a cushioning element 3205.

FIGS. 33A-33D illustrate side views of an example facial covering assembly 3300 comprising an inner frame 3302, an outer frame 3303, and/or a cushioning element 3305.

FIGS. 34A-34D illustrate back/inside views of an example facial covering assembly 3400 comprising an inner frame 3402, an outer frame 3403, and/or a cushioning element 3405.

FIGS. 35A-35D illustrate front/outside views of an example facial covering assembly 3500 comprising an inner frame 3502, an outer frame 3503, and/or a cushioning element 3505.

FIGS. 36A-36D illustrate front/outside views of an example facial covering assembly 3600 comprising an inner frame 3602, an outer frame 3603, and/or a cushioning element 3605.

FIGS. 37A-37D illustrate side views of an example facial covering assembly 3700 comprising an inner frame 3702, an outer frame 3703, and/or a cushioning element 3705.

FIGS. 38A-38D illustrate side views of an example facial covering assembly 3800 comprising an inner frame 3802, an outer frame 3803, and/or a cushioning element 3805.

FIGS. 39A-39D illustrate perspective views of an example facial covering assembly 3900 comprising an inner frame 3902, an outer frame 3903, and/or a cushioning element 3905.

Figure 40:
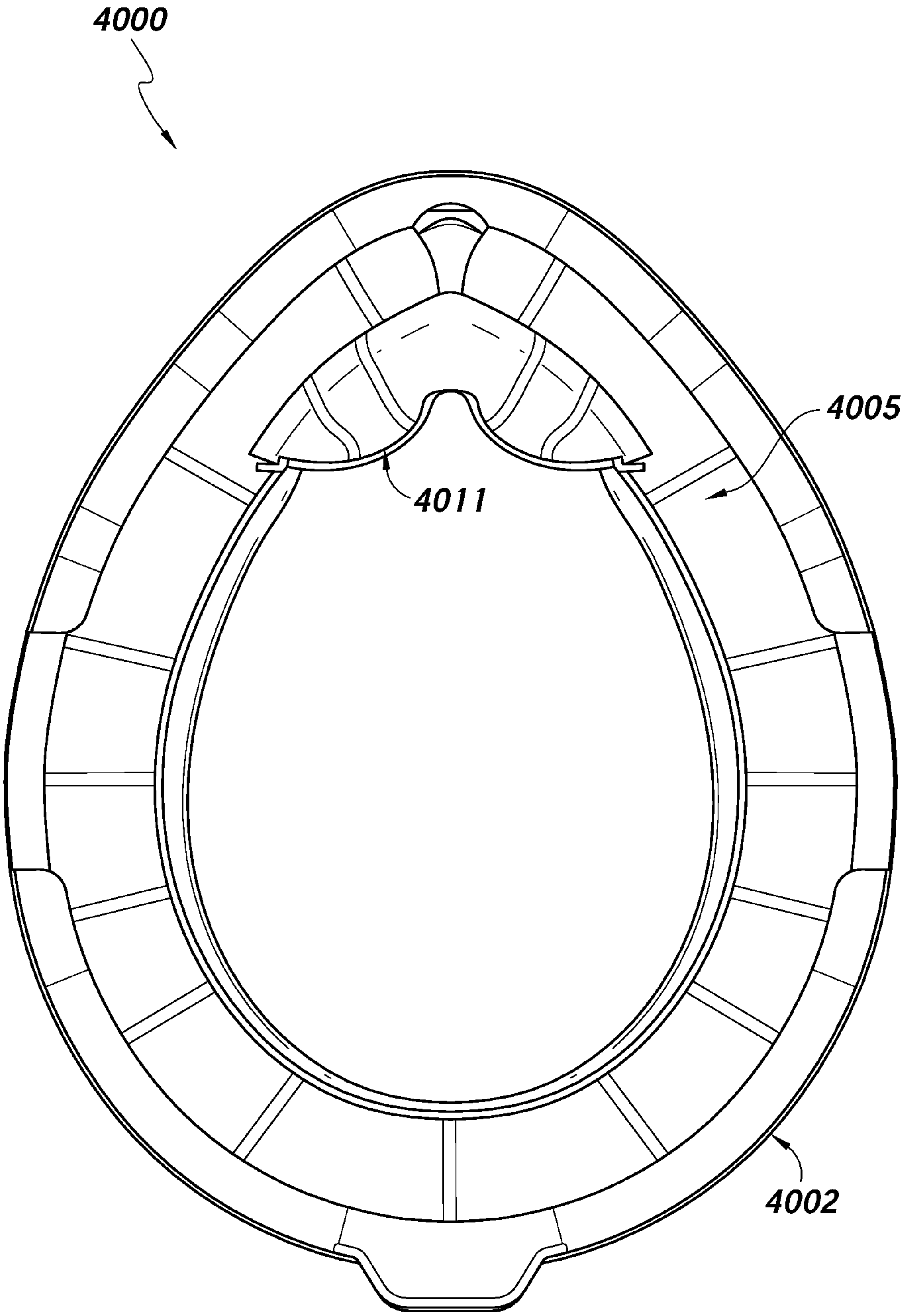
FIG. 40 illustrates an example facial covering assembly comprising a frame and/or a cushioning element in accordance with one or more embodiments.

FIG. 40 illustrates an example facial covering assembly 4000 comprising a frame 4002 and/or a cushioning element 4005. In some embodiments, the facial covering assembly 4000 may comprise one or more nose engagement features 4011 which may be configured to create a seal with, grip onto, and/or otherwise engage with a user's nose when the facial covering assembly 4000 is positioned on a user's face. For example, the nose engagement features 4011 may be positioned at an upper portion of the facial covering assembly 4000 to be aligned with at least a portion of the user's nose (e.g., the user's nasal bridge). The nose engagement features 4011 may extend from the cushioning element 4005, frame 4002, and/or other portions of the facial covering assembly. In some embodiments, a nose engagement feature 4011 may have a contoured and/or curved structure and/or shape to allow the nose engagement feature 4011 to approximate a curvature of the user's nose. The nose engagement feature 4011 may be adjustable and/or bendable and/or may have a generally non-elastic structure to allow the nose engagement feature 4011 to be customized to a user's nose.

Figure 41:
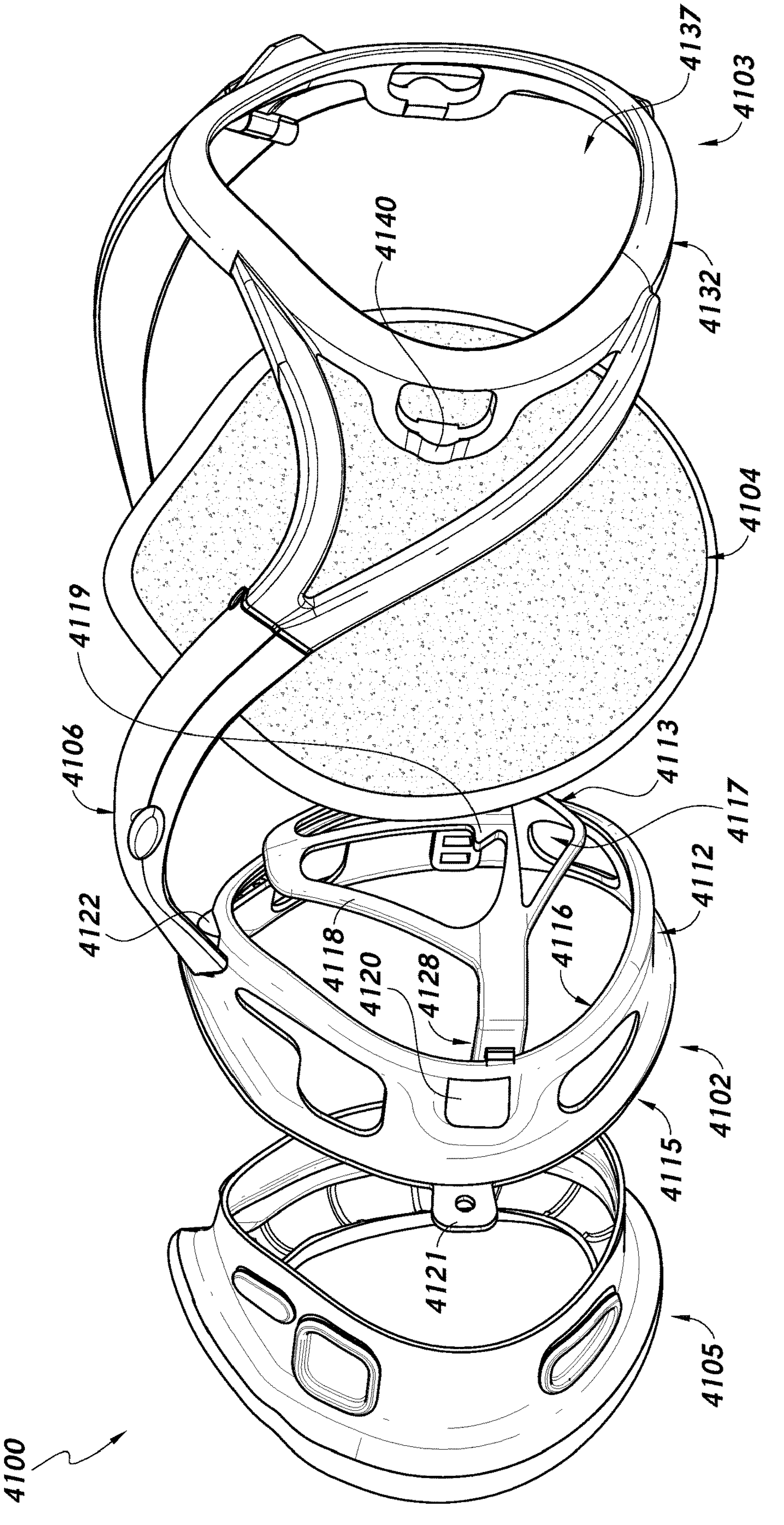
FIG. 41 provides a breakout view of a facial covering assembly comprising an inner frame, an outer frame, a cushioning element, and/or a filtering element in accordance with one or more embodiments.

FIG. 41 provides a breakout view of a facial covering assembly 4100 comprising an inner frame 4102, an outer frame 4103, a cushioning element 4105, and/or a filtering element 4104 in accordance with one or more embodiments. The facial covering assembly 4100 is shown in a disassembled and/or disconnected form. However, the various components of the facial covering assembly 4100 may be configured to interconnect and/or to be assembled into a singular device (see, e.g., FIGS. 42A and 42B). In some embodiments, the outer frame 4103 may comprise one or more user engagement features 4106, which can include eyeglass-type arms configured to contact and/or hook onto a user's ears.

In some embodiments, the assembly 4100 may be configured for conversion of one or more face masks. For example, the filtering element 4104 may be a face mask. The assembly 4100 may utilize an independent and/or separate face mask and/or other filtering element 4104. Suitable face masks can include surgical masks, among many others. In some embodiments, the filtering element 4104 may comprise one or more attachment features (e.g., elastic bands) configured for attachment to a user's face and/or head (e.g., a user's ears). In some embodiments, multiple filtering elements 4104 and/or portions of multiple face masks may be incorporated into the facial covering assembly 4100.

The facial covering conversion system 4100 can comprise a frame, which can include an inner frame 4102 (i.e., inner frame portion) and/or an outer frame 4103 (i.e., outer frame portion). The inner frame 4102 may be configured to serve as an air flow filtration enhancement unit and/or the outer frame 4103 may be configured to serve as an airtight tri-filtration seal. In some embodiments, the filtering element 4104 may be configured to be situated at least partially between the inner frame 4102 and the outer frame 4103. The inner frame 4102 and/or outer frame 4103 may be configured to provide a generally rigid and/or stable support for the filtering element 4104. For example, the inner frame 4102 and/or outer frame 4103 may be at least partially composed of plastic, metal, and/or other generally rigid materials. In some embodiments, the inner frame 4102 and/or outer frame 4103 may be configured to maintain at least partial separation between at least a portion of the user's face (e.g., the user's nose and/or mouth) and at least a portion of the filtering element 4104 (e.g., a central portion of the face mask filtering element).

In some embodiments, the inner frame 4102 may comprise a first sealing portion 4112 and/or a shaper 4113 (e.g., a conical portion). The first sealing portion 4112 may be configured to form a complete oval (e.g., circle) and/or loop around at least a portion of a user's face (e.g., around at least a portion of the user's nose and/or mouth). In some embodiments, the first sealing portion 4112 may be configured to completely surround at least the user's mouth and/or nostrils. The first sealing portion 4112 may be configured to facilitate and/or create a complete and/or airtight seal around at least a portion of the user's face.

The first sealing portion 4112 may have any suitable width and/or may be configured to extend generally away from a user's face when the inner frame 4102 is positioned on the user's face. For example, the first sealing portion 4112 may comprise an inner edge 4115 and/or an outer edge 4116 and/or the width may represent a distance between the inner edge 4115 and the outer edge 4116. The inner edge 4115 may be configured to be situated nearer the user's face than the outer edge 4116 when the inner frame 4102 is positioned on the user's face.

The shaper 4113 may extend from at least a portion of the first sealing portion 4112 and/or may be configured to be attached to at least a portion of the first sealing portion 4112. The shaper 4113 may have a generally convex form when viewed from the outside and/or may be configured to extend away from the user's face when the inner frame 4102 is positioned on the user's face. The shaper 4113 may comprise one or more apertures 4117 configured to allow air flow through the inner frame 4102, first sealing portion 4112, and/or shaper 4113. The shaper 4113 may comprise a network of one or more appendages 4118 configured to extend between the first sealing portion 4112 and a midsection 4119 of the shaper 4113. While the shaper 4113 is shown in FIG. 41A diamond shape, the shaper 4113 may have any shape and/or may comprise any number of appendages 4118. In some embodiments, the shaper 4113 may have one or more contact points 4128 with the first sealing portion 4112. The shaper 4113 is shown in FIG. 41 having two contact points 4128 at generally opposite lateral sides of the first sealing portion 4112, however the shaper 4113 may have any number of contact points 4128. Moreover, while the shaper 4113 has a generally diamond-shaped form in FIG. 41, the shaper 4113 may have other shapes. The shaper 4113 may comprise one or more appendages 4118 extending around the one or more apertures 4117 of the shaper 4113. In some embodiments, the one or more apertures 4117 may have generally triangular forms as shown in FIG. 41 but may have other forms. Moreover, the midsection 4119 of the shaper 4113 may have a generally triangular form but may have other forms.

In some embodiments, the midsection 4119 may be configured to be positioned at least partially in front of at least a portion of a user's mouth and/or nostrils when the inner frame 4102 is positioned on the user's face. The midsection 4119 may have any suitable form and/or may comprise a generally triangular and/or other shape. The midsection 4119 may advantageously be configured to be positioned in front of and/or across from the user's mouth and/or nostrils to prevent moisture droplets from the user's mouth and/or nostrils from contacting and/or saturating the filtering element 4104. In some cases, dampening and/or saturation of a filtering element 4104 can decrease effectiveness of the filtering element 4104 in providing filtration.

The inner frame 4102 and/or first sealing portion 4112 may comprise one or more attachment features, which can include an outer frame attachment feature 4120 and/or a user engagement attachment feature 4121. The outer frame attachment feature 4120 may be configured to mate with a corresponding inner frame attachment feature 4140 at the outer frame 4103. For example, the outer frame attachment feature 4120 can comprise a notch, peg, hook, and/or similar mechanism configured to mate with the inner frame attachment feature 4140. The user engagement attachment feature 4121 may be configured to mate with a corresponding user engagement feature, which can include various straps, arms, and/or other features configured to form an attachment to a user's ears and/or other portions of the user's head.

In some embodiments, the inner frame 4102 and/or first sealing portion 4112 may comprise an eyewear mount 4122, which may be situated at or near an upper portion of the first sealing portion 4112. For example, the eyewear mount 4122 may be configured to be situated at or near a highest point of the inner frame 4102 when the inner frame 4102 is positioned on a user's face. The eyewear mount 4122 may be configured to mate with various eyewear and/or eyewear attachment mechanisms. For example, the eyewear mount 4122 can comprise one or more pegs, clips, notches, and/or other features configured to receive and/or form an attachment with eyewear and/or eyewear clips.

The inner frame 4102 may be configured to reduce facial contact between the filtering element 4104 and the user's face by approximately ninety percent and/or may be configured to increase a filtration surface area of the filtering element 4104 by over five hundred percent.

The outer frame 4103 may comprise a second sealing portion 4132. The second sealing portion 4132 may be configured to form a complete oval (e.g., circle) and/or loop around at least a portion of the filtering element 4104 and/or inner frame 4102. In some embodiments, the second sealing portion 4132 may be configured to completely surround at least the midsection 4119 and/or the shaper 4113. The second sealing portion 4132 may be configured to facilitate and/or create a complete and/or airtight seal around at least a portion of the user's face. The second sealing portion 4132 may comprise a frame forming a complete oval around a generally oval-shaped opening 4137 through the second sealing portion 4132.

The outer frame 4103 and/or second sealing portion 4132 may comprise one or more attachment features, which can include an inner frame attachment feature 4140. The inner frame attachment feature 4140 may be configured to mate with a corresponding outer frame attachment feature 4120 at the inner frame 4102. For example, the inner frame attachment feature 4140 can comprise a notch, peg, hook, and/or similar mechanism configured to mate with the outer frame attachment feature 4120.

The outer frame 4103 may be configured to create a second seal (with the inner frame 4102 and/or cushioning element 4105 forming a first seal) and/or multiple filtration areas to provide approximately ninety-five to ninety-nine percent filtration air flow through the outer frame 4103.

The assembly 4100 may further comprise a cushioning element 4105 configured to contact at least a portion of a user's face when in use by the user. The cushioning element 4105 may be configured to form a complete oval (e.g., circle) and/or loop around at least a portion of a user's face (e.g., around at least a portion of the user's nose and/or mouth) and/or may approximate and/or match a shape and/or size of the first sealing portion 4112 of the inner frame 4102. In some embodiments, the cushioning element 4105 may be configured to completely surround at least the user's mouth and/or nostrils. The cushioning element 4105 may be configured to facilitate and/or create a complete and/or airtight seal around at least a portion of the user's face. In some embodiments, the cushioning element 4105 may be configured to couple to and/or otherwise contact the inner frame 4102.

In some embodiments, the cushioning element 4105 may comprise multiple (e.g., ten) cushioning pillows and/or portions separated by ribs and/or dividers. The multiple cushioning portions may be configured to independently conform to the user's face to improve a seal around at least a portion of the user's face. The cushioning element 4105 may be at least partially composed of a generally flexible and/or elastic material to allow the cushioning element 4105 to conform to a shape of a user's face while forming an airtight seal between the cushioning element 4105 and the user's face. The cushioning element 4105 may be configured to permanently or removably attach to the inner frame 4102 (e.g., using Velcro and/or other attachment features and/or materials).

Figure 42A:
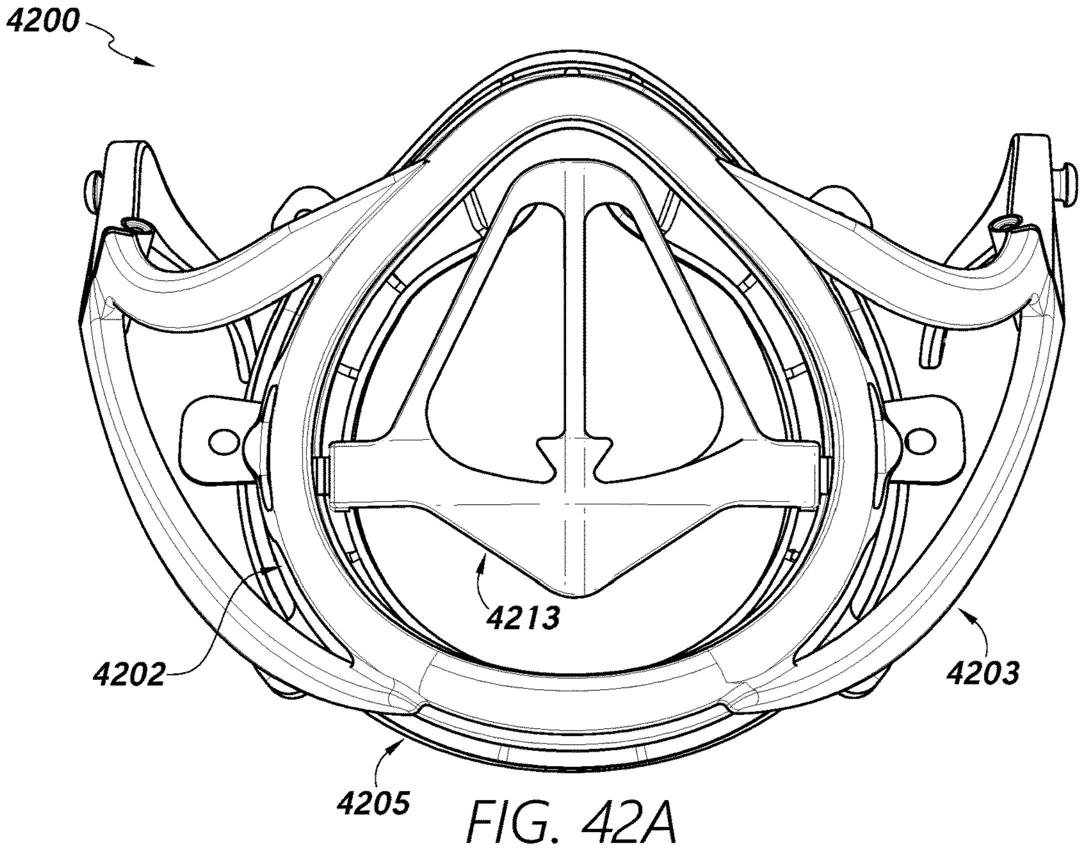
FIGS. 42A and 42B illustrate an assembled facial covering assembly in accordance with one or more embodiments.
Figure 42B:
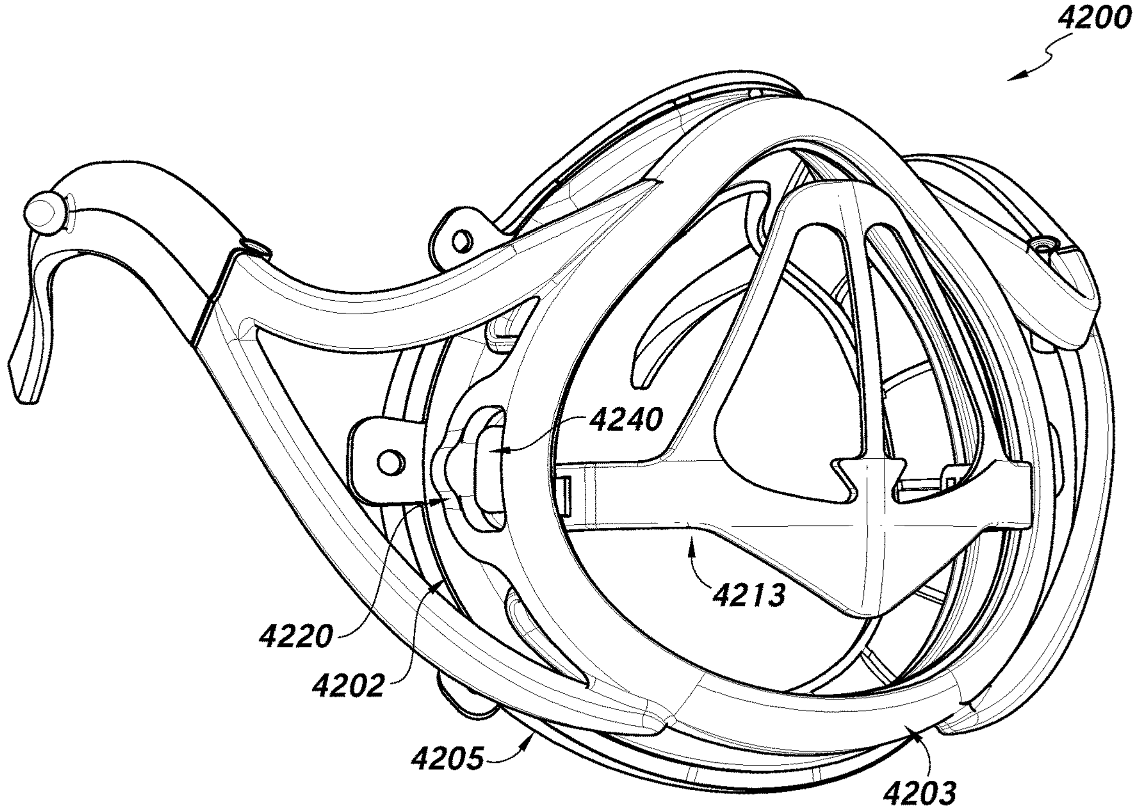

FIGS. 42A and 42B illustrate an assembled facial covering assembly 4200 in accordance with one or more embodiments. FIG. 42A provides a front view of the assembly 4200 and FIG. 42B provides a perspective view of the assembly 4200. In some embodiments, the assembly 4200 may comprise an inner frame 4202, an outer frame 4203, and/or a cushioning element 4205. The assembly 4200 may be used in combination with one or more filtering elements (not shown). For example, one or more filtering elements (e.g., a face mask) may be positioned at least partially between the inner frame 4202 and the outer frame 4203 and/or may at least partially cover a shaper 4213 of the inner frame 4202. An inner frame attachment feature 4240 of an inner frame 4202 may be mated to an outer frame attachment feature 4220.

Figure 43:
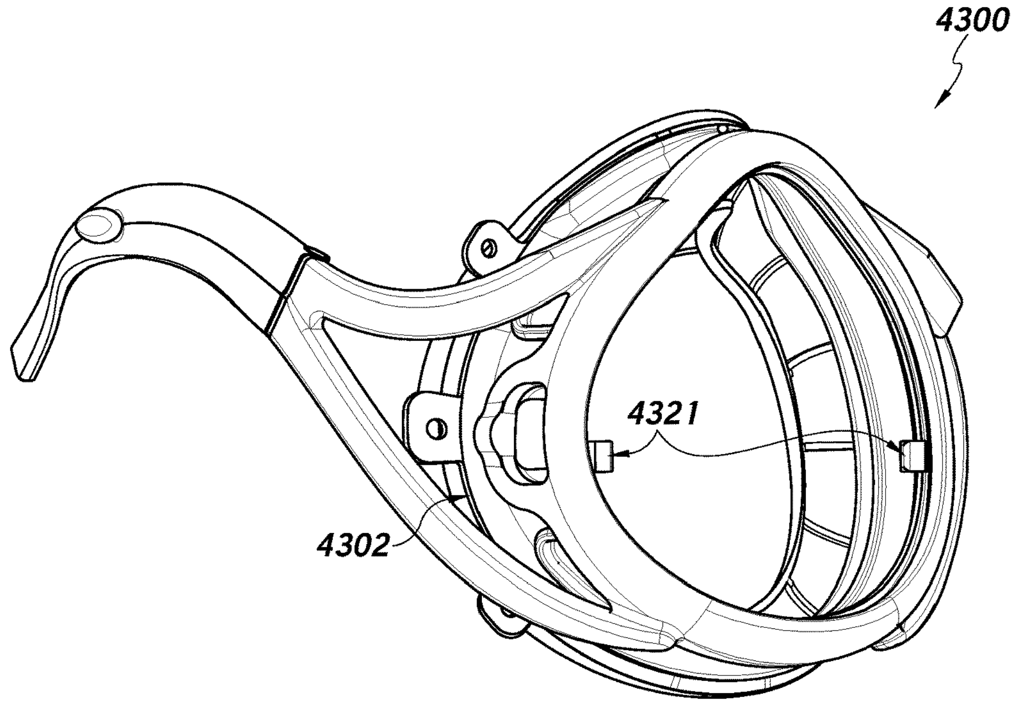
FIG. 43 provides a perspective view of at least a portion of an example facial covering assembly in accordance with one or more embodiments.

FIG. 43 provides a perspective view of at least a portion of an example facial covering assembly 4300 in accordance with one or more embodiments. The assembly 4300 is shown without a shaper for illustrative purposes. In some embodiments, the shaper may be removable and/or may be configured to attach to the inner frame 4302 via one or more engagement features 4321 (e.g., hooks, latches, and/or similar mechanisms) configured to mate with the shaper at contact points (see, e.g., FIG. 41).

Figure 44:
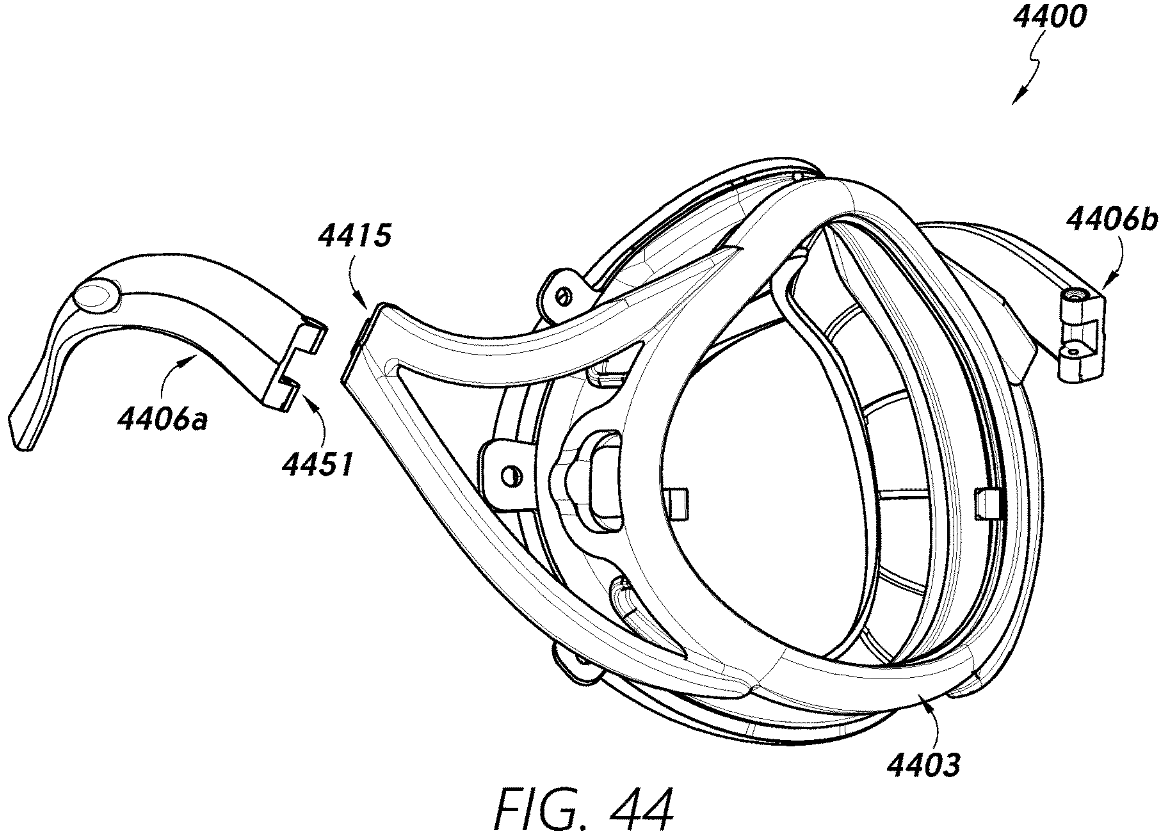
FIG. 44 provides a perspective view of at least a portion of an example facial covering assembly in accordance with one or more embodiments.

FIG. 44 provides a perspective view of at least a portion of an example facial covering assembly 4400 in accordance with one or more embodiments. The assembly 4400 is shown without a shaper for illustrative purposes. In some embodiments, one or more user engagement features 4406 (e.g., eyeglass-type arms) may be configured to attach to the outer frame 4403 and/or may be detachable. For example, user engagement features 4406 may be detached when user engagement features of a face mask and/or other filtering element (not shown) are used. In some embodiments, the assembly 4400 may comprise two user engagement features 4406 (e.g., a right user engagement feature 4406*a* and/or a left user engagement feature 4406*b*), with each of the user engagement features 4406 configured to contact and/or hook onto a different ear of a user. The one or more user engagement features 4406 may comprise one or more outer frame engagement features 4451 (e.g., prongs, hooks, pegs, and/or similar mechanisms) configured to mate with the outer frame 4403 and/or with corresponding features at an attachment portion 4415 of the outer frame 4403.

In some embodiments, the user engagement features 4406 may be foldable and/or may attach to the outer frame 4403 via a hinge and/or similar attachment. The user engagement features 4406 may allow the user to quickly take the assembly 4400 on an off like they would sunglasses or reading glasses.

Figure 45A:
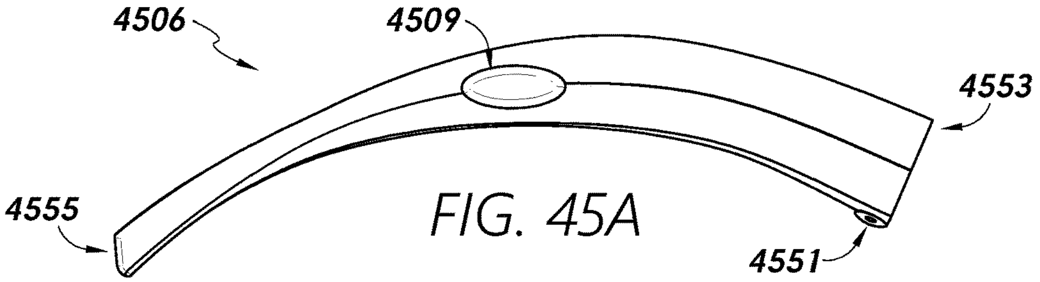
FIGS. 45A-45F illustrate an example user engagement feature (e.g., a right user engagement feature) of an example facial covering assembly (e.g., the assembly of FIG. 41) in accordance with one or more embodiments.
Figure 45B:
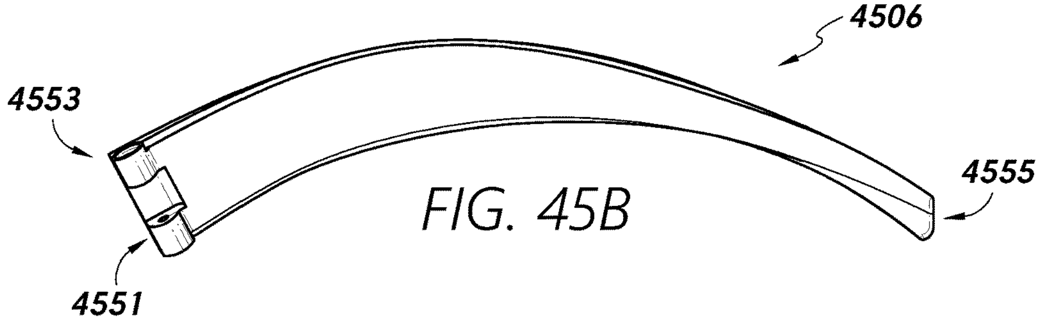
Figure 45C:
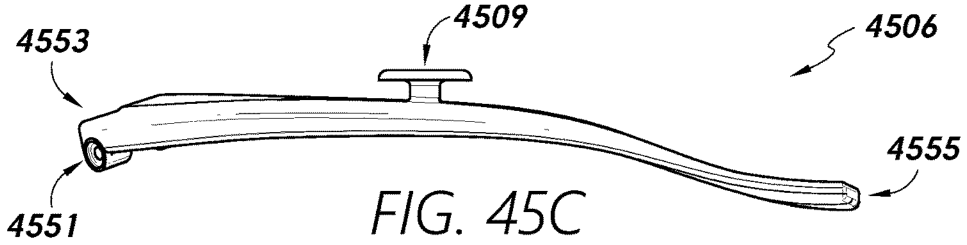
Figure 45D:
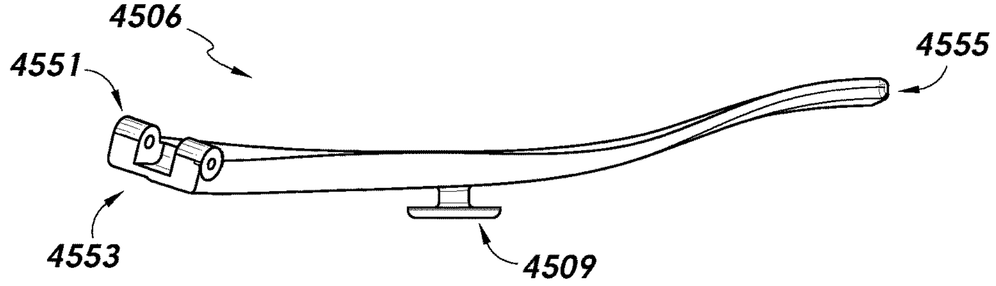
Figure 45E:
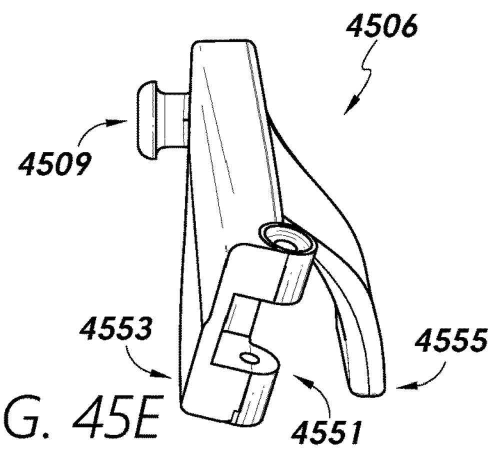
Figure 45F:
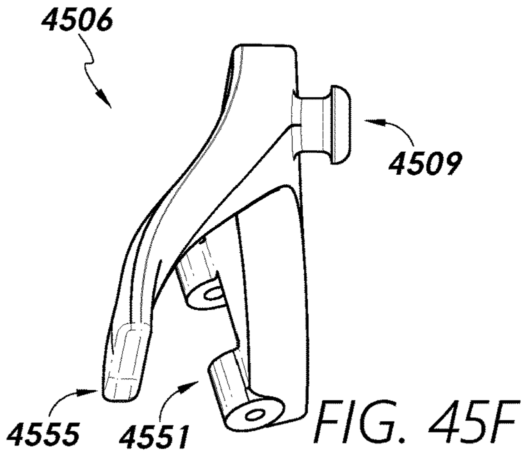

FIGS. 45A-45F illustrate an example user engagement feature 4506 (e.g., a right user engagement feature 4506) of an example facial covering assembly (e.g., the assembly 4100 of FIG. 41) in accordance with one or more embodiments. FIGS. 45A and 45B provide side views of the user engagement feature 4506, FIG. 45C provides an overhead view of the user engagement feature 4506, FIG. 45D provides a bottom view of the user engagement feature 4506, FIG. 45E provides a front view of the user engagement feature 4506, and FIG. 45F provides a back view of the user engagement feature 4506.

In some embodiments, the user engagement feature 4506 may comprise one or more filtering element engagement features 4509. For example, a filtering element engagement feature 4509 can comprise a peg, hook, notch, and/or other mechanism configured to receive a strap of a face mask. A user can pull straps attached to a face mask and/or other filtering element and/or loop the straps around the user engagement features 4506. In this way, the filtering element can be tightened and/or the straps of the filtering element can be secured to the user engagement feature 4506.

The user engagement feature 4506 can comprise various outer frame engagement features 4551 configured for attaching the user engagement feature 4506 to an outer frame. In some embodiments, the outer frame engagement feature 4551 can comprise one or more pegs, notches, hinges, and/or other mechanisms configured to facilitate a secure and/or detachable connection between the user engagement feature 4506 and an outer frame. For example, an outer frame engagement feature 4551 may be configured to receive a screw and/or pin through a notch and/or opening of the outer frame engagement feature 4551. The screw and/or pin may similarly pass-through corresponding notches and/or openings at the outer frame. An outer frame engagement feature 4551 may be situated at a proximal end 4553 of the user engagement feature 4506. The user engagement feature 4506 may further comprise a distal end 4555, which may have a reduced height and/or thickness relative to the proximal end 4553.

In some embodiments, the user engagement feature 4506 may have a generally curved form to facilitate hooking the user engagement feature 4506 around an ear of a user. As shown in FIGS. 45A and 45B, the user engagement feature 4506 may be curved along a first axis (e.g., may curve up over a user's ear and down behind the user's ear). Moreover, as shown in FIGS. 45C-45F, the user engagement feature 4506 may additionally or alternatively curve along a second axis. In some embodiments, the distal end 4555 of the user engagement feature 4506 may curve towards the user's head to approximate a curvature of the user's head behind the user's ears and/or may be configured to press against the user's head.

Figure 46A:
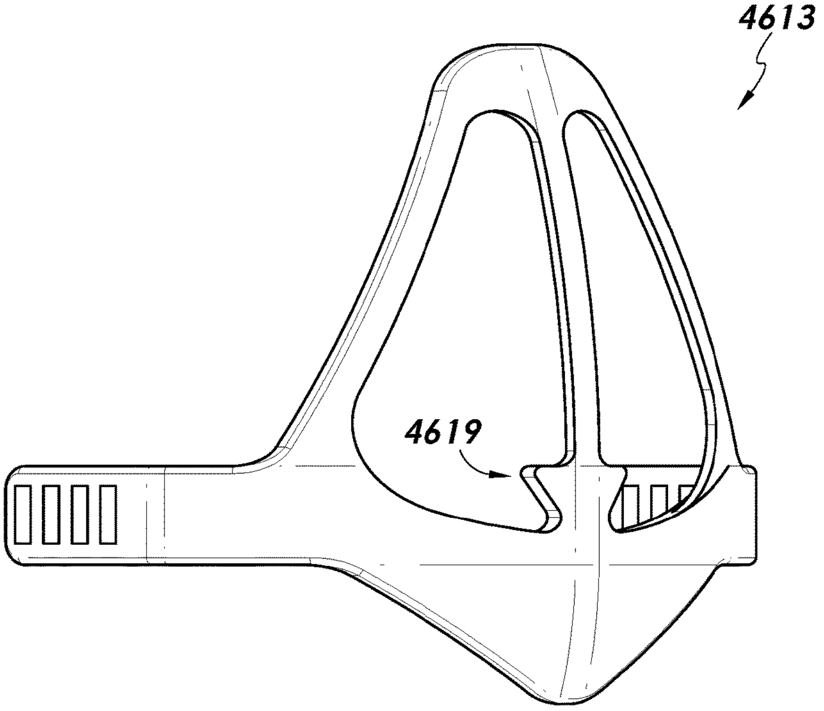
FIGS. 46A-46G illustrate an example shaper of an example facial covering assembly (e.g., the assembly of FIG. 41) in accordance with one or more embodiments.
Figure 46B:
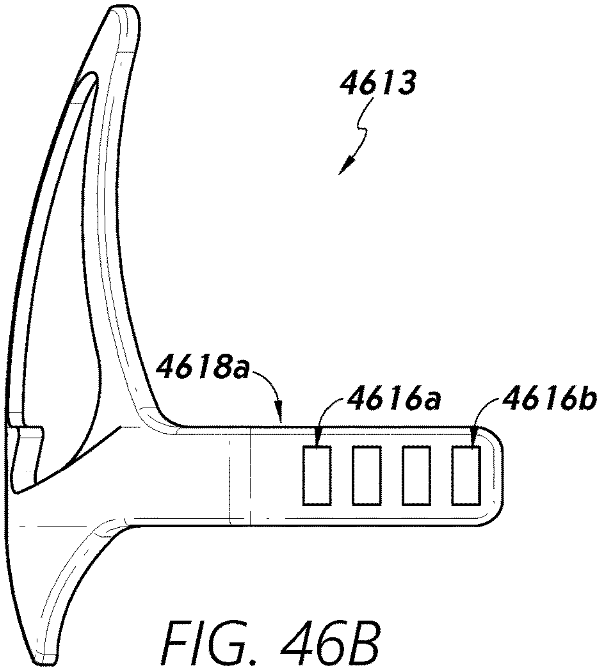
Figure 46C:
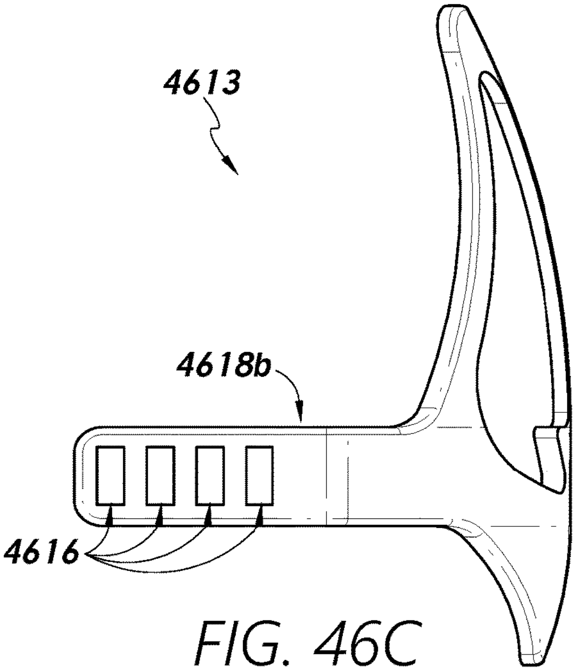
Figure 46G:
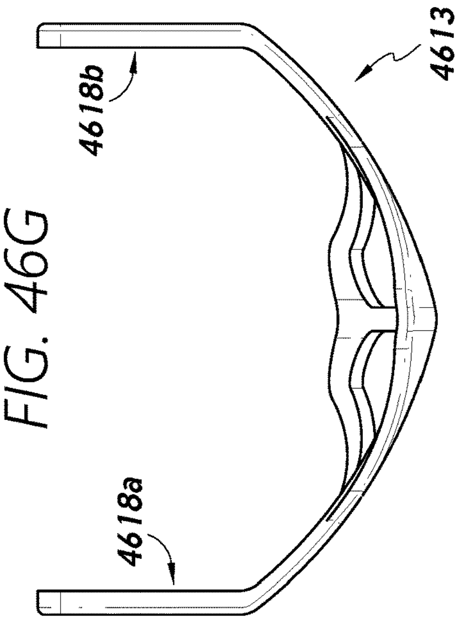
Figure 46F:
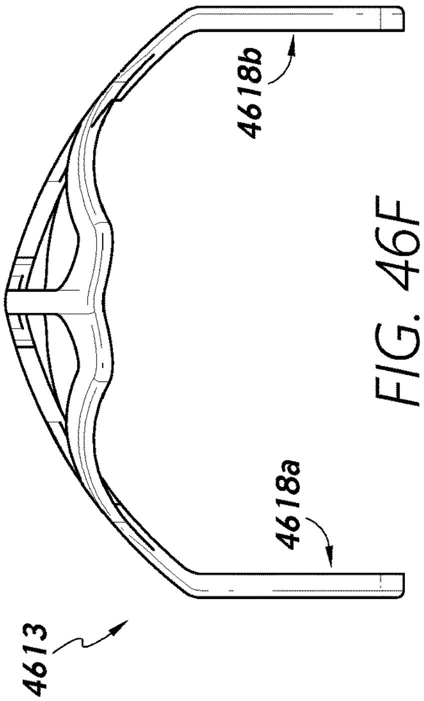
Figure 46E:
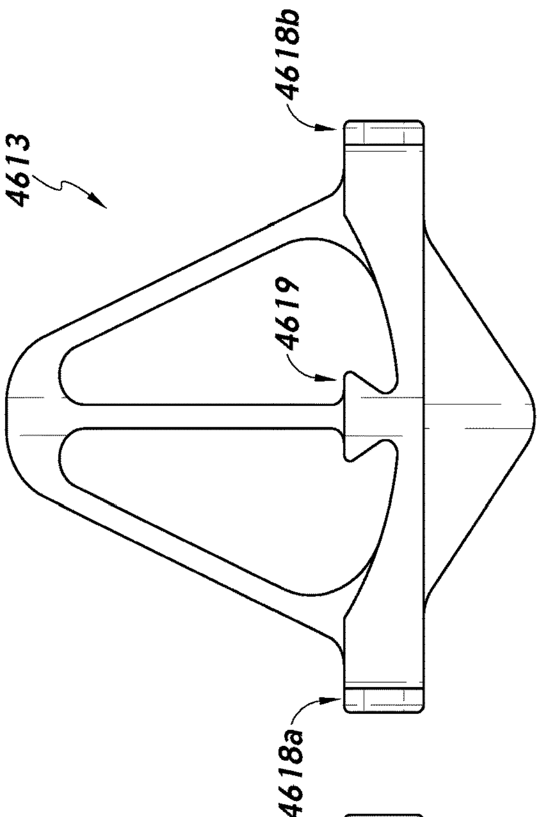
Figure 46D:
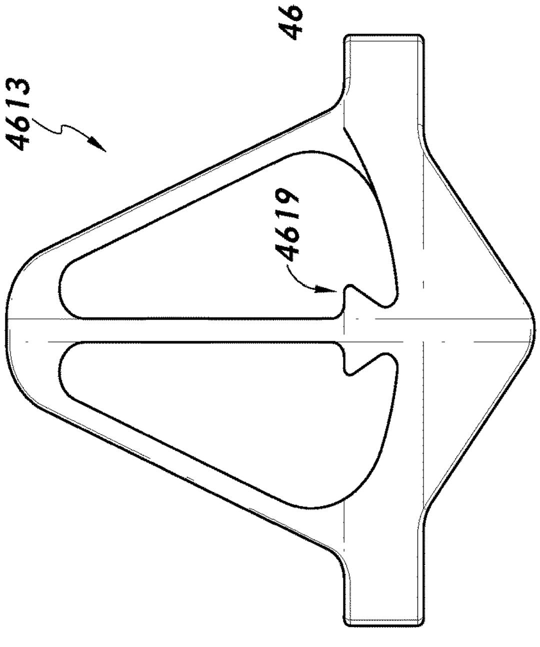

FIGS. 46A-46G illustrate an example shaper 4613 of an example facial covering assembly (e.g., the assembly 4100 of FIG. 41) in accordance with one or more embodiments. FIG. 46A provides a perspective view of the shaper 4613, FIGS. 46B and 46C provide side views of the shaper 4613, FIG. 46D provides a front view of the shaper 4613, FIG. 46E provides a back view of the shaper 4613, FIG. 46F provides an overhead view of the shaper 4613, and FIG. 46G provides a bottom view of the shaper 4613.

The shaper 4613 may comprise one or more inner frame engagement features 4616 configured to mate with corresponding features of an inner frame (e.g., the engagement features 4321 of the inner frame 4302 of FIG. 43). For example, an inner frame engagement feature 4616 can comprise an aperture, notch, groove, divot, peg, and/or other feature configured to mate with and/or receive corresponding features of the inner frame. In some embodiments, the one or more inner frame engagement features 4616 may be situated on a first appendage 4618*a* and/or a second appendage 4618*b* of the shaper 4613. The first appendage 4618*a* and/or second appendage 4618*b* may extend generally perpendicularly from a midsection 4619 of the shaper 4613 and/or may extend towards an inner frame of an assembly. In some embodiments, the shaper 4613 may comprise multiple inner frame engagement features 4616. For example, the shaper 4613 may comprise a series of inner frame engagement features 4616 aligned along at least a portion of the first appendage 4618*a* and/or second appendage 4618*b*.

In some embodiments, an inner frame may comprise multiple engagement features configured to simultaneously mate with an inner frame engagement feature 4616 at the first appendage 4618*a* and an inner frame engagement feature 4616 at the second appendage 4618*b*. The inner frame may be configured to mate with any of the inner frame engagement features 4616 of the shaper 4613. In some embodiments, a position of the midsection 4619 of the shaper 4613 relative to the inner frame may be adjusted based on which of the inner frame engagement features 4616 the inner frame mates with. For example, if the inner frame mates with a proximal inner frame engagement feature 4616*a*, the midsection 4619 of the shaper 4613 may be situated relatively close to the inner frame. Similarly, if the inner frame mates with a distal inner frame engagement feature 4616*b*, the midsection 4619 of the shaper 4613 may be situated relatively far from the inner frame. The shaper 4613 may comprise one or more inner frame engagement features 4616 (e.g., two) between the proximal inner frame engagement feature 4616*a* and the distal inner frame engagement feature 4616*b*. The position of the midsection 4619 may determine a position of a filtering element (e.g., a face mask) of the assembly. Accordingly, the position of the filtering element relatively to a user's face may be adjusted based on which inner frame engagement features 4616 the inner frame mates with. In this way, users may advantageously adjust the shaper 4613 as desired to create a desired amount of separation between the filtering element and the user's face.

Figure 47:
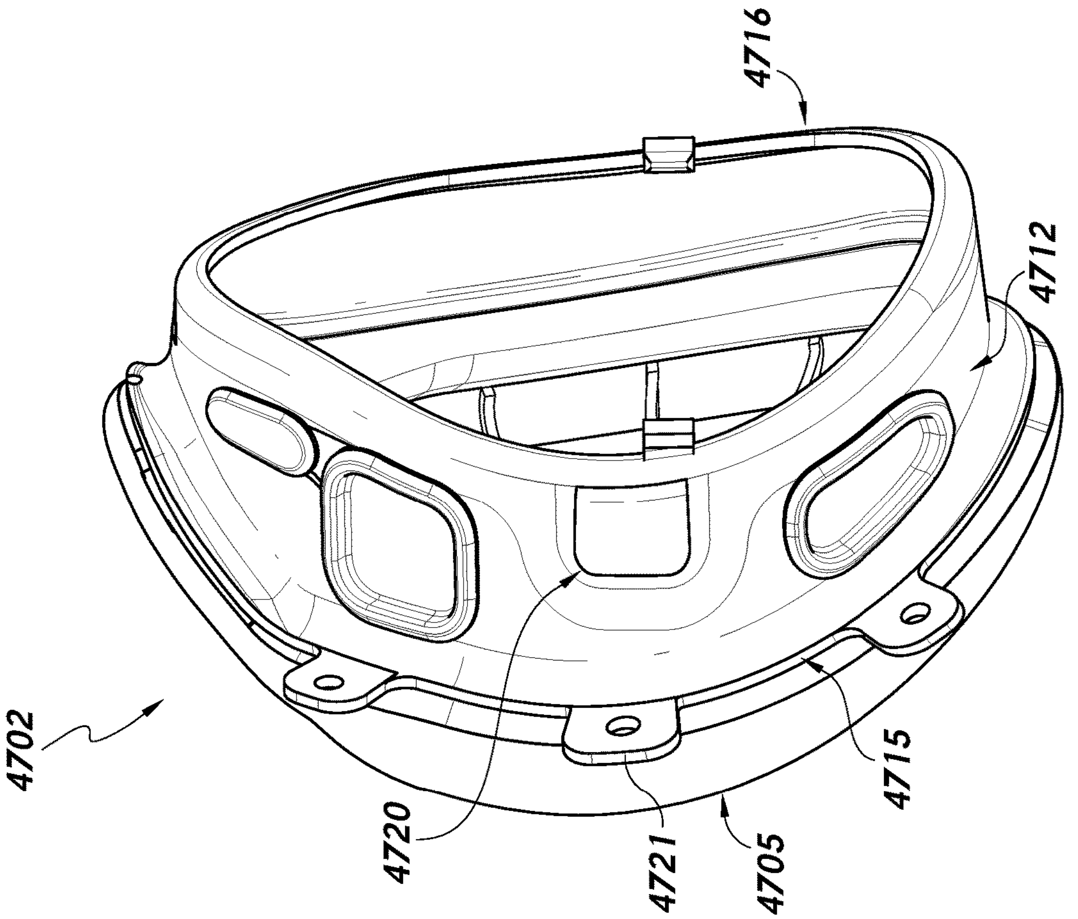
FIG. 47 provides a perspective view of at least a portion of an example inner frame coupled to an example cushioning element in accordance with one or more embodiments.

FIG. 47 provides a perspective view of at least a portion of an example inner frame 4702 coupled to an example cushioning element 4705 in accordance with one or more embodiments. In some embodiments, the inner frame 4702 may comprise a first sealing portion 4712 and/or a shaper (not shown). The first sealing portion 4712 may be configured to form a complete oval (e.g., circle) and/or loop around at least a portion of a user's face (e.g., around at least a portion of the user's nose and/or mouth). In some embodiments, the first sealing portion 4712 may be configured to completely surround at least the user's mouth and/or nostrils. The first sealing portion 4712 may be configured to facilitate and/or create a complete and/or airtight seal around at least a portion of the user's face.

The first sealing portion 4712 may have any suitable width and/or may be configured to extend generally away from a user's face when the inner frame 4702 is positioned on the user's face. For example, the first sealing portion 4712 may comprise an inner edge 4715 and/or an outer edge 4716 and/or the width may represent a distance between the inner edge 4715 and the outer edge 4716. The inner edge 4715 may be configured to be situated nearer the user's face than the outer edge 4716 when the inner frame 4702 is positioned on the user's face.

Figure 49A:
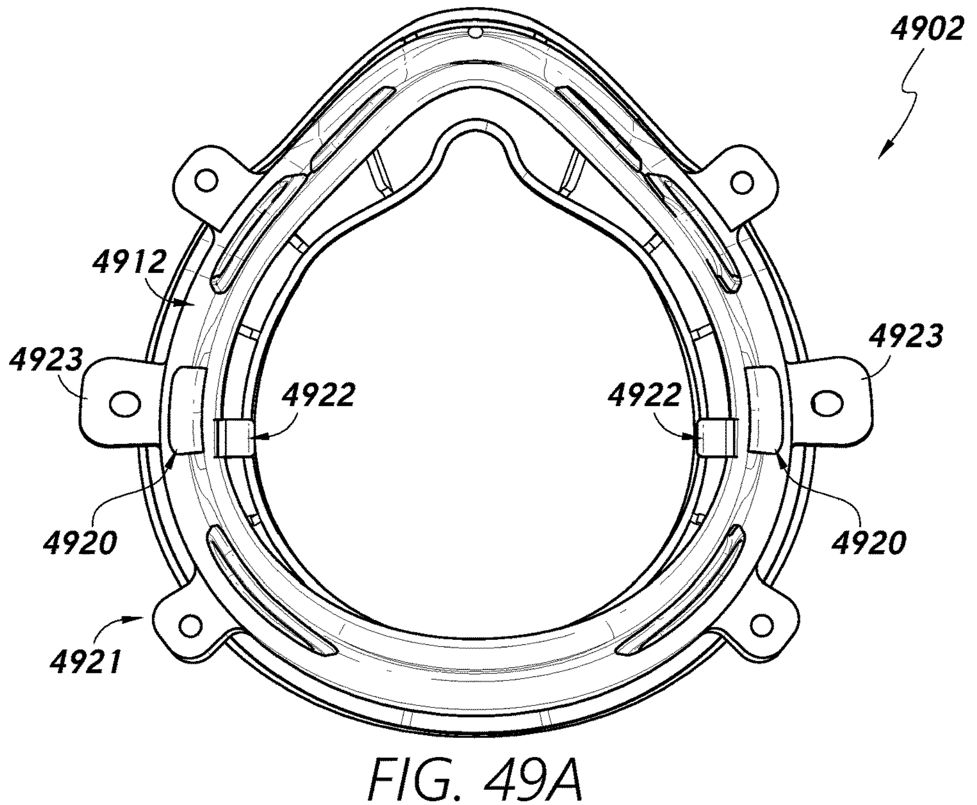
FIGS. 49A-49F illustrate an example inner frame coupled to cushioning element of an example facial covering assembly (e.g., the assembly of FIG. 41) in accordance with one or more embodiments.

The inner frame 4702 and/or first sealing portion 4712 may comprise one or more attachment features, which can include one or more outer frame attachment features 4720, shaper attachment features (e.g., situated along an inner diameter of the inner frame 4702; see, e.g., FIG. 49A) and/or one or more user engagement attachment features 4721. An outer frame attachment feature 4720 may be configured to mate with a corresponding inner frame attachment feature at an outer frame. For example, the outer frame attachment feature 4720 can comprise a notch, peg, hook, and/or similar mechanism configured to mate with the inner frame attachment feature. A user engagement attachment feature 4721 may be configured to mate with a corresponding user engagement feature, which can include various straps, arms, and/or other features configured to form an attachment to a user's ears and/or other portions of the user's head.

In some embodiments, the inner frame 4702 and/or first sealing portion 4712 may comprise an eyewear mount (not shown; see, e.g., FIG. 41), which may be situated at or near an upper portion of the first sealing portion 4712. For example, the eyewear mount may be configured to be situated at or near a highest point of the inner frame 4702 when the inner frame 4702 is positioned on a user's face. The eyewear mount may be configured to mate with various eyewear and/or eyewear attachment mechanisms. For example, the eyewear mount can comprise one or more pegs, clips, notches, and/or other features configured to receive and/or form an attachment with eyewear and/or eyewear clips.

In some embodiments, the inner frame 4702 may be attached to and/or may be configured to attach to the cushioning element 4705. The cushioning element 4705 may be configured to contact at least a portion of a user's face when in use by the user. The cushioning element 4705 may be configured to form a complete oval (e.g., circle) and/or loop around at least a portion of a user's face (e.g., around at least a portion of the user's nose and/or mouth) and/or may approximate and/or match a shape and/or size of the first sealing portion 4712 of the inner frame 4702. In some embodiments, the cushioning element 4705 may be configured to completely surround at least the user's mouth and/or nostrils. The cushioning element 4705 may be configured to facilitate and/or create a complete and/or airtight seal around at least a portion of the user's face. In some embodiments, the cushioning element 4705 may be configured to couple to and/or otherwise contact the inner frame 4702.

In some embodiments, the cushioning element 4705 may comprise multiple (e.g., ten) cushioning pillows and/or portions separated by ribs and/or dividers. The multiple cushioning portions may be configured to independently conform to the user's face to improve a seal around at least a portion of the user's face. The cushioning element 4705 may be at least partially composed of a generally flexible and/or elastic material to allow the cushioning element 4705 to conform to a shape of a user's face while forming an airtight seal between the cushioning element 4705 and the user's face. The cushioning element 4705 may be configured to permanently or removably attach to the inner frame 4702 (e.g., using Velcro and/or other attachment features and/or materials).

Figure 48:
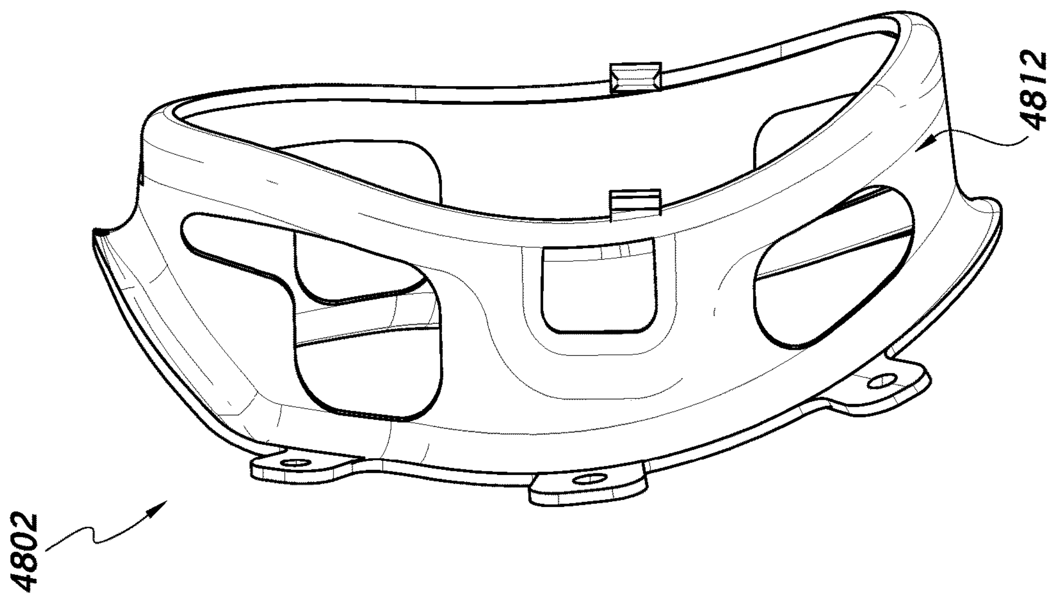
FIG. 48 provides a perspective view of at least a portion of an example inner frame in accordance with one or more embodiments.

FIG. 48 provides a perspective view of at least a portion of an example inner frame 4802 in accordance with one or more embodiments. The inner frame 4802 is shown without a cushioning element for illustrative purposes. In some embodiments, the inner frame 4802 may comprise a first sealing portion 4812 and/or a shaper (not shown). The first sealing portion 4812 may be configured to form a complete oval (e.g., circle) and/or loop around at least a portion of a user's face (e.g., around at least a portion of the user's nose and/or mouth). In some embodiments, the first sealing portion 4812 may be configured to completely surround at least the user's mouth and/or nostrils. The first sealing portion 4812 may be configured to facilitate and/or create a complete and/or airtight seal around at least a portion of the user's face.

Figure 49B:
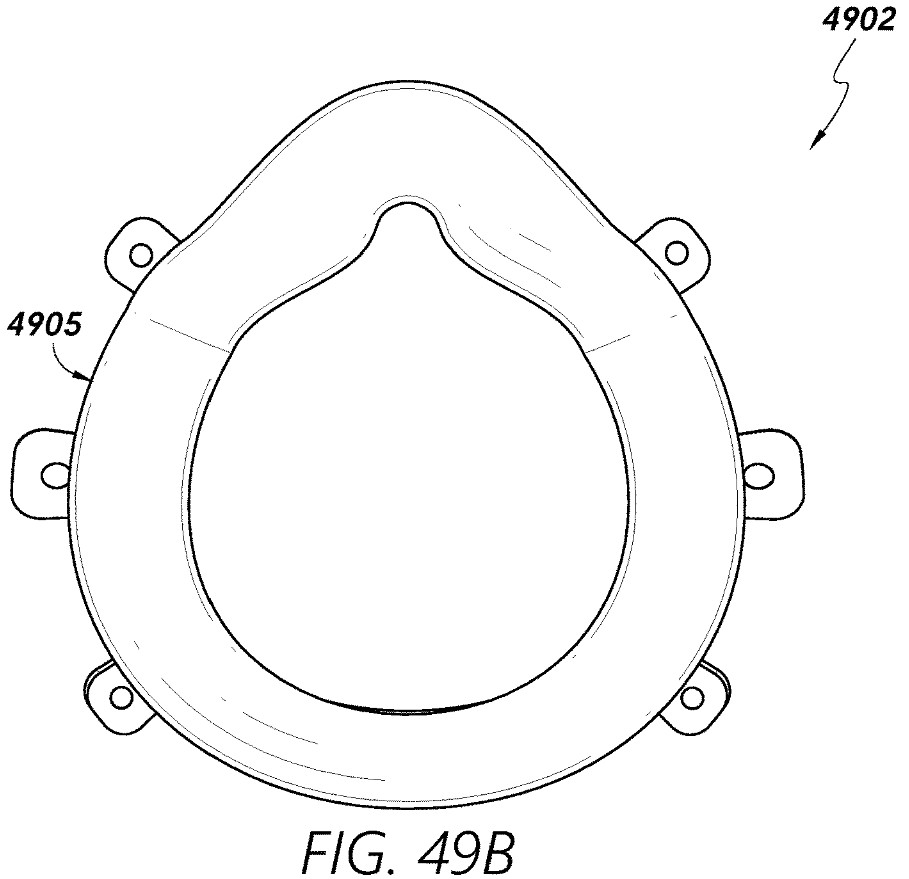
Figure 49C:
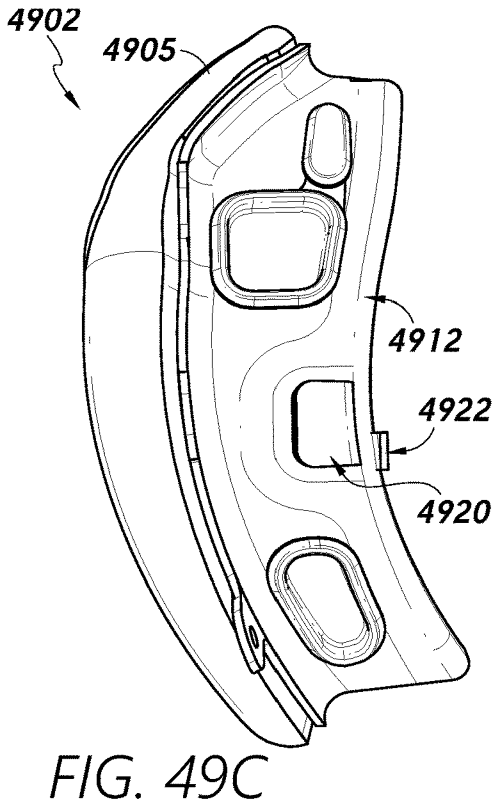
Figure 49D:
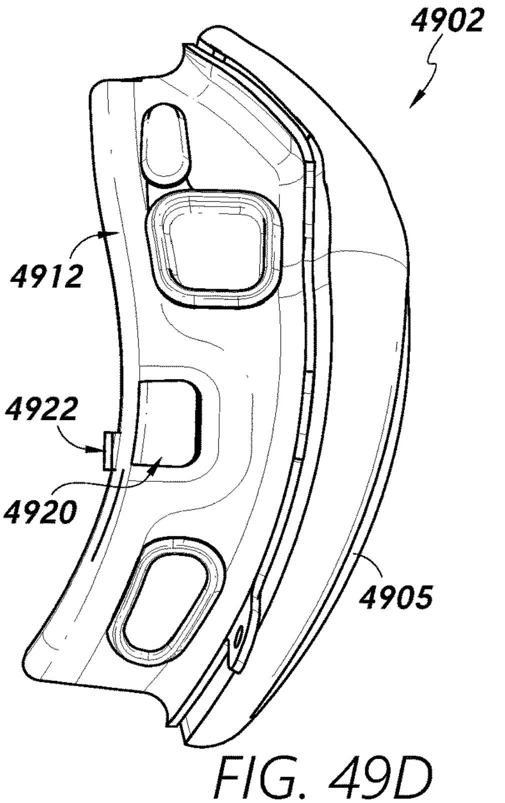
Figure 49E:
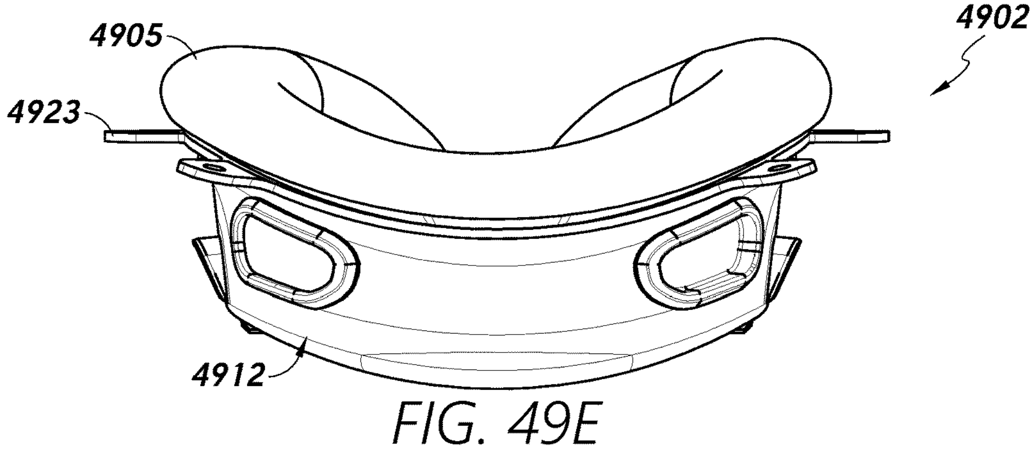
Figure 49F:
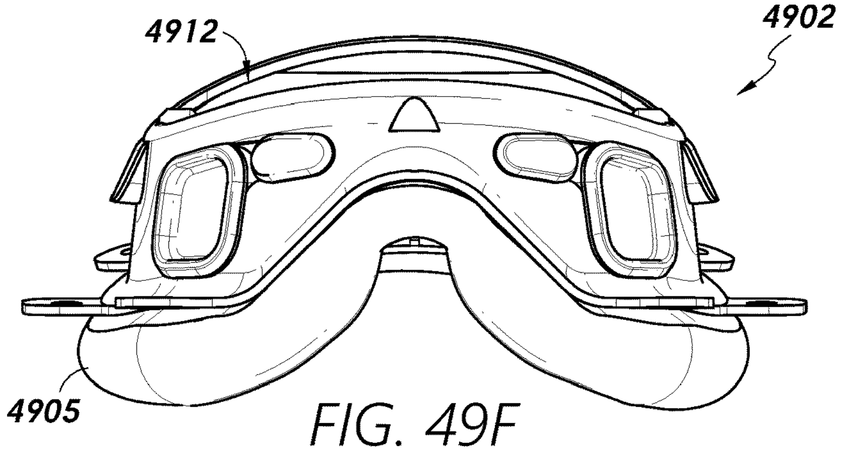

FIGS. 49A-49F illustrate an example inner frame 4902 coupled to cushioning element 4905 of an example facial covering assembly (e.g., the assembly 4100 of FIG. 41) in accordance with one or more embodiments. FIG. 49A provides a front view of the inner frame 4902 and/or cushioning element 4905, and FIG. 49B provides a back view of the inner frame 4902 and/or cushioning element 4905, FIGS. 49C and 49D provide side views of the inner frame 4902 and/or cushioning element 4905, FIG. 49E provides a bottom view of the inner frame 4902 and/or cushioning element 4905, and FIG. 49F provides an overhead view of the inner frame 4902 and/or cushioning element 4905.

In some embodiments, the inner frame 4902 may comprise a first sealing portion 4912 and/or a shaper (not shown). The first sealing portion 4912 may be configured to form a complete oval (e.g., circle) and/or loop around at least a portion of a user's face (e.g., around at least a portion of the user's nose and/or mouth). In some embodiments, the first sealing portion 4912 may be configured to completely surround at least the user's mouth and/or nostrils. The first sealing portion 4912 may be configured to facilitate and/or create a complete and/or airtight seal around at least a portion of the user's face.

The inner frame 4902 and/or first sealing portion 4912 may comprise one or more attachment features, which can include one or more outer frame attachment features 4920, shaper attachment features 4922 (e.g., situated along an inner diameter of the inner frame 4902) one or more user engagement attachment features 4921, and/or one or more secondary clip attachment features 4923 (e.g., one secondary clip attachment feature 4923 on each side of the inner frame 4902). The one or more user engagement features 4921 can comprise generally rectangular protrusions extending out from an outer surface of the first sealing portion 4912 and/or forming a generally oval-shaped and/or circular lumen. The one or more shaper attachment features 4922 can comprise protrusions, pegs, notches, and/or arms extending from the first sealing portion 4912 at or near an inner diameter of the inner frame 4902 and/or at a forward-facing (e.g., away from the user's face) side of the inner frame 4902. A shaper attachment feature 4922 can comprise a hook and/or lip configured to pass and/or hook through an opening and/or attachment feature of a shaper. A secondary clip attachment feature 4923 may comprise a generally oval-shaped and/or rectangular protrusion extending laterally from the inner frame 4902 and/or forming an oval-shaped and/or rectangular lumen configured to receive one or more clips. A lumen of a secondary clip attachment feature 4923 may be larger than a lumen of a user engagement attachment feature 4921. The one or more secondary clip attachment features 4923 may extend laterally outward from the sealing portion 4912 of the inner frame 4902 and/or may be configured to be situated on either side of a user's face when in use. User engagement attachment features 4921 on the inner frame 4902 allow for connection of top and bottom head straps to secure the inner frame 4902 and/or assembly to the face by wrapping around the back of the head.

Figure 50A:
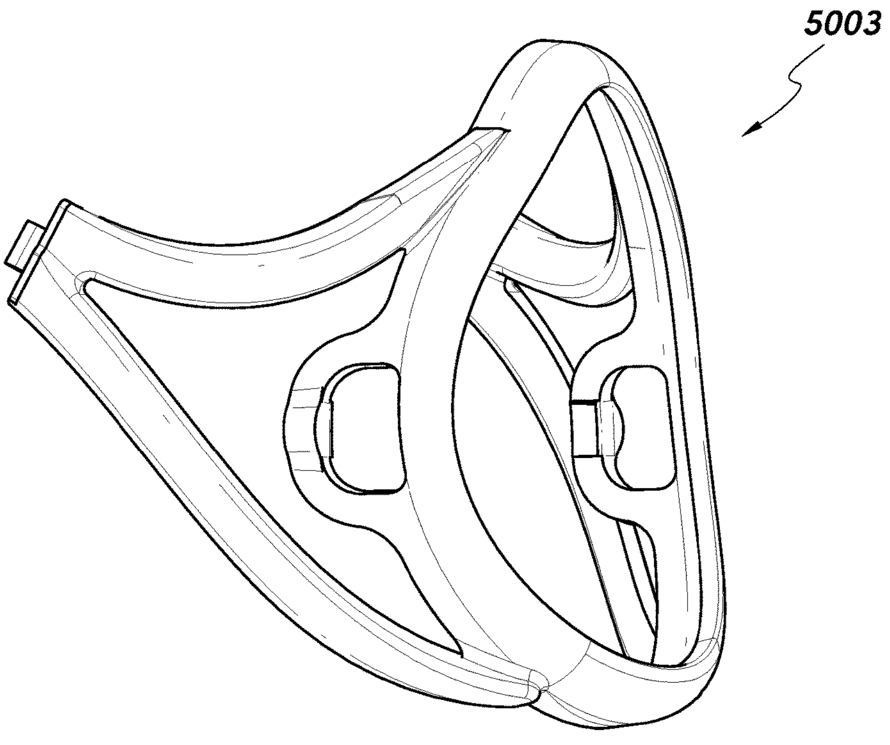
FIGS. 50A-50G illustrate an example outer frame of an example facial covering assembly (e.g., the assembly of FIG. 41) in accordance with one or more embodiments.
Figure 50B:
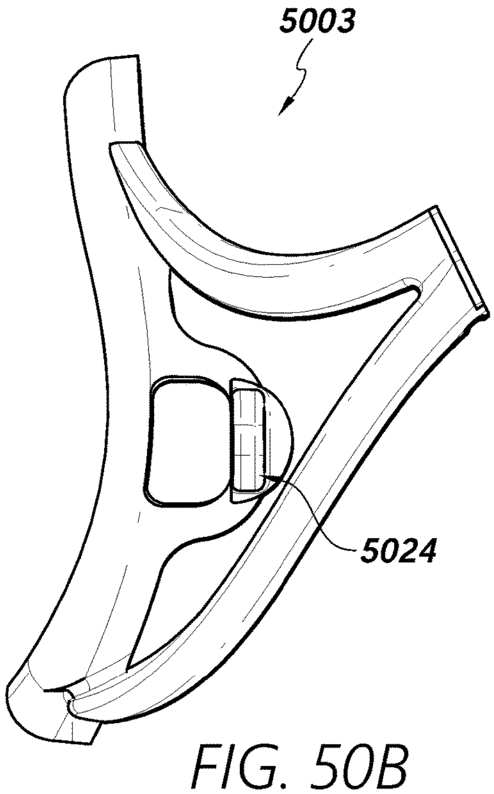
Figure 50C:
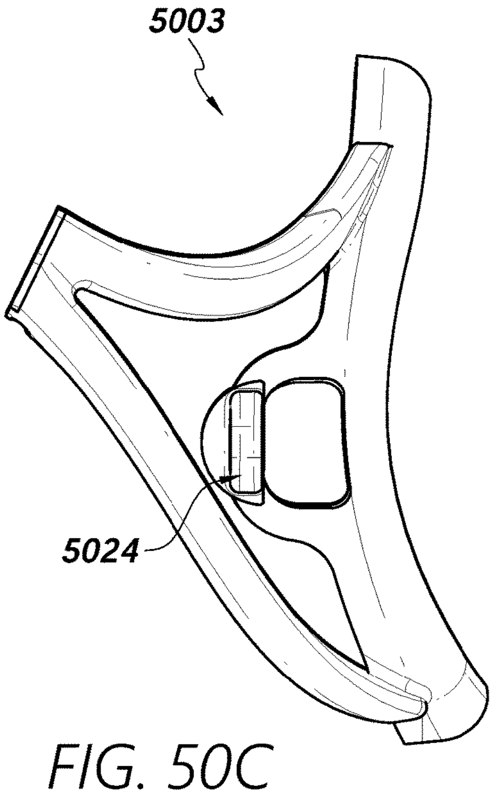
Figure 50D:
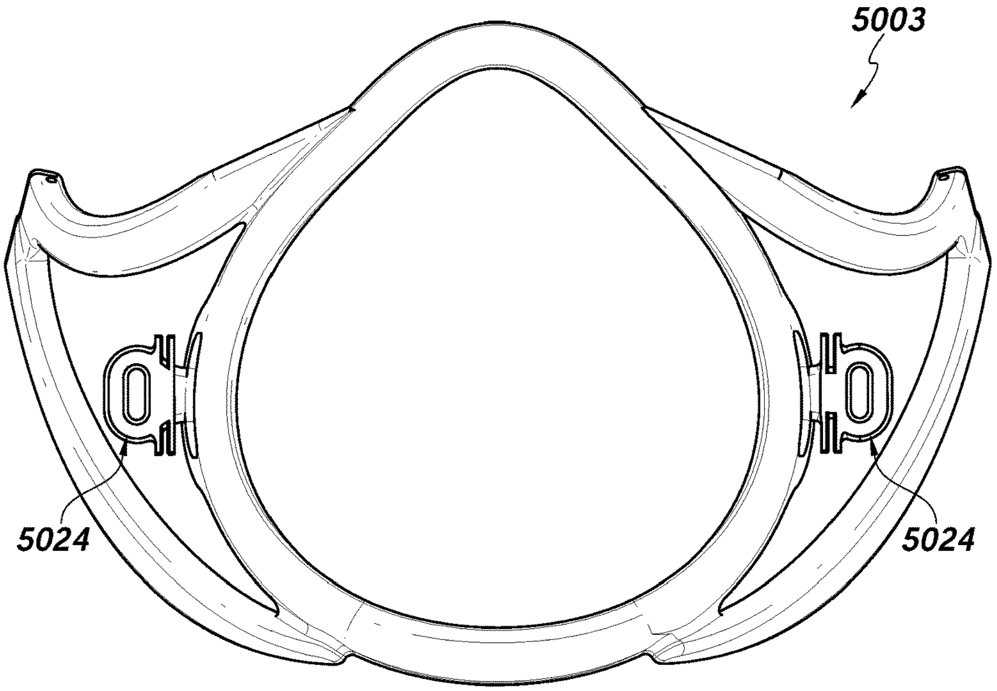
Figure 50E:
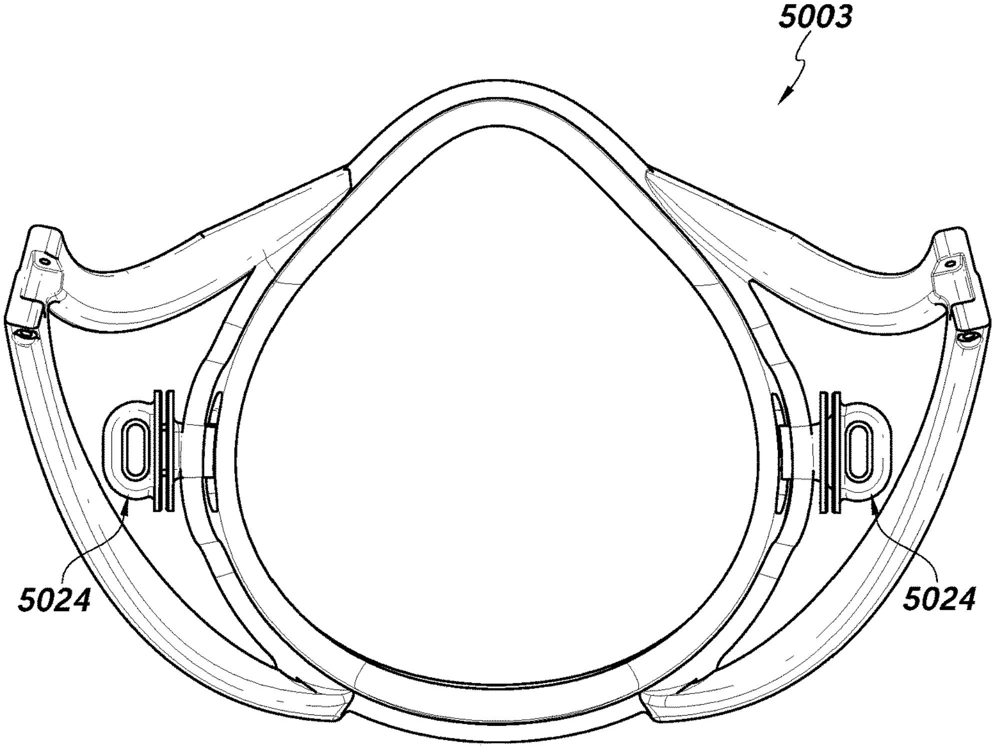
Figure 50F:
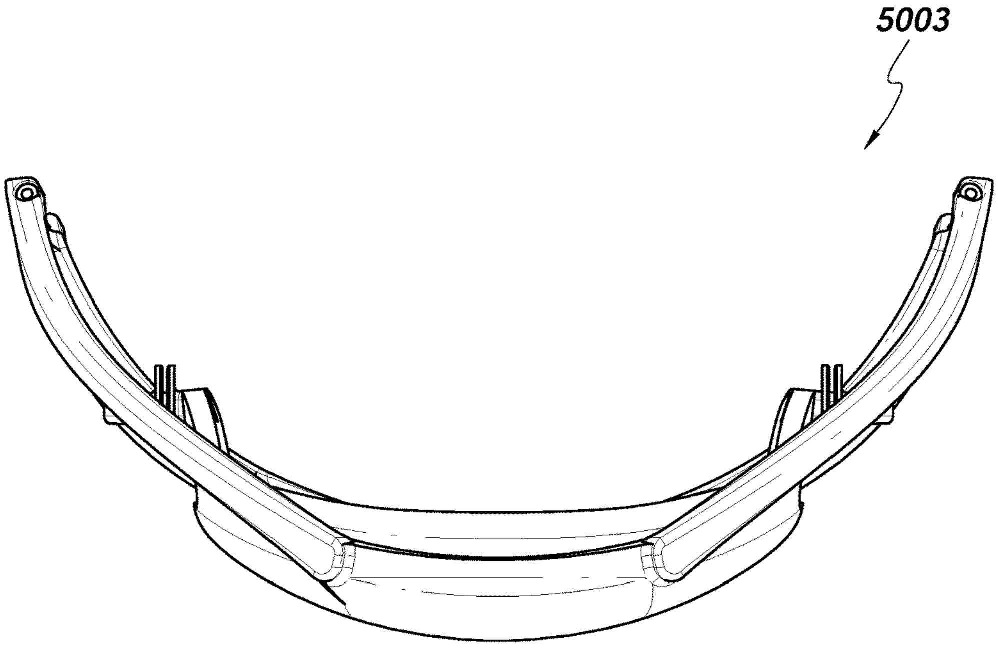
Figure 50G:
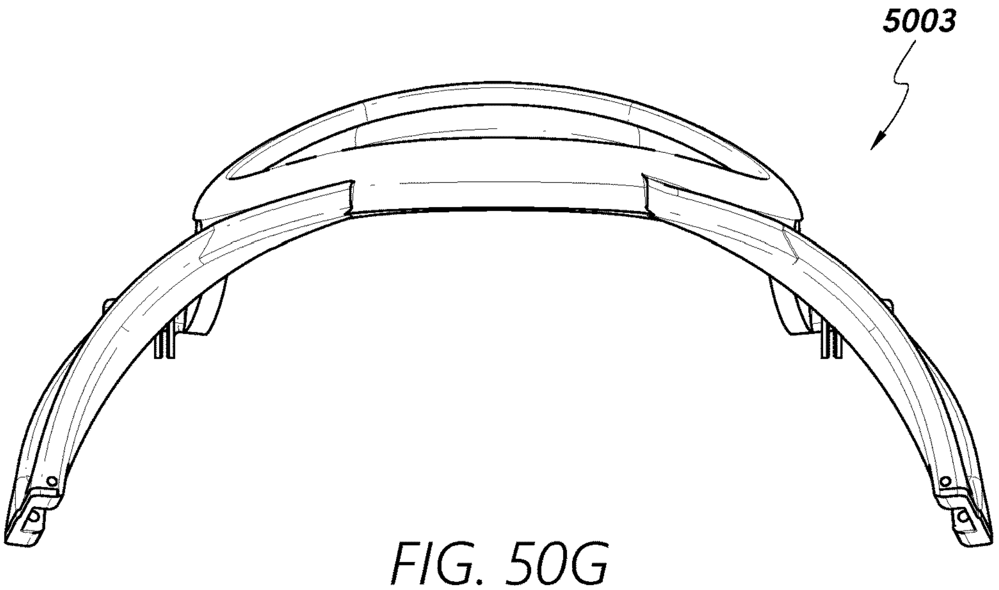

FIGS. 50A-50F illustrate an example outer frame 5003 of an example facial covering assembly (e.g., the assembly 4100 of FIG. 41) in accordance with one or more embodiments. FIG. 50A provides a perspective view of the outer frame 5003, FIGS. 50B and 50C provide side views of the outer frame 5003, FIG. 50D provides a front view of the outer frame 5003, and FIG. 50E provides a back view of the outer frame 5003, FIG. 50F provides a bottom view of the outer frame 5003, and FIG. 50G provides an overhead view of the outer frame 5003. In some embodiments, the outer frame 5003 may comprise one or more secondary clip attachment features 5024 (e.g., one secondary clip attachment feature 5024 on each side of the outer frame 5003). A secondary clip attachment feature 5024 may comprise a generally oval-shaped clip and/or protrusion extending generally perpendicularly from a sealing portion of the outer frame 5003 and/or forming a generally oval-shaped lumen configured to receive one or more ties (e.g., zip-ties). The one or more secondary clip attachment features 5024 may extend laterally outward from the sealing portion of the outer frame 5003 and/or may be configured to be situated on either side of a user's face when in use.

Figure 51A:
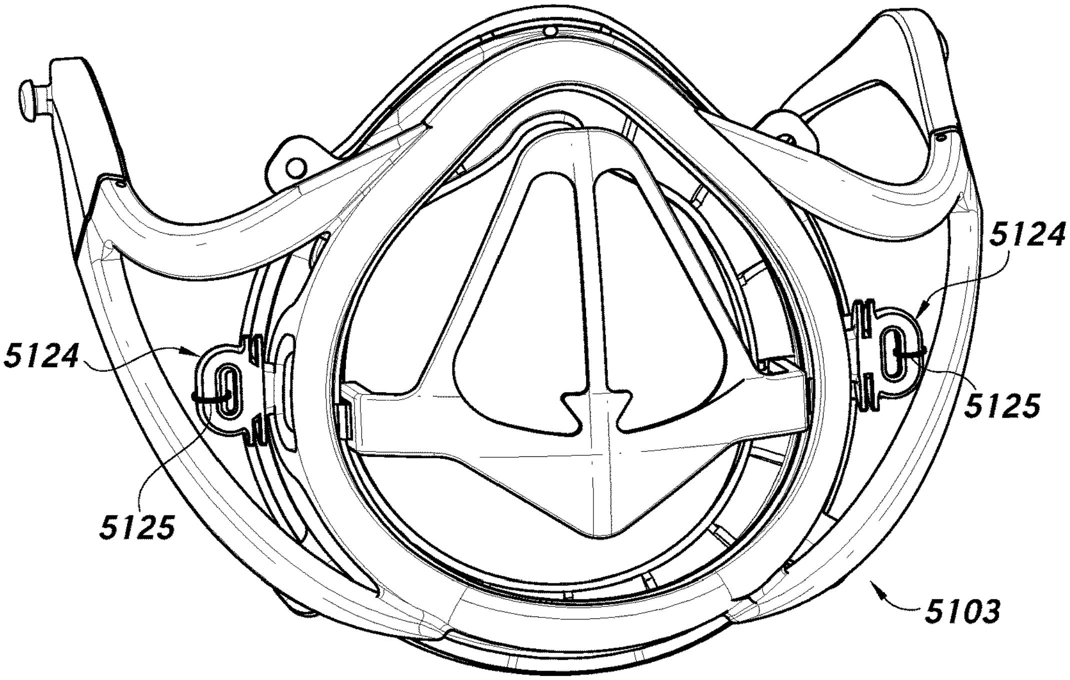
FIGS. 51A and 51B illustrate an example facial covering assembly in accordance with one or more embodiments.
Figure 51B:
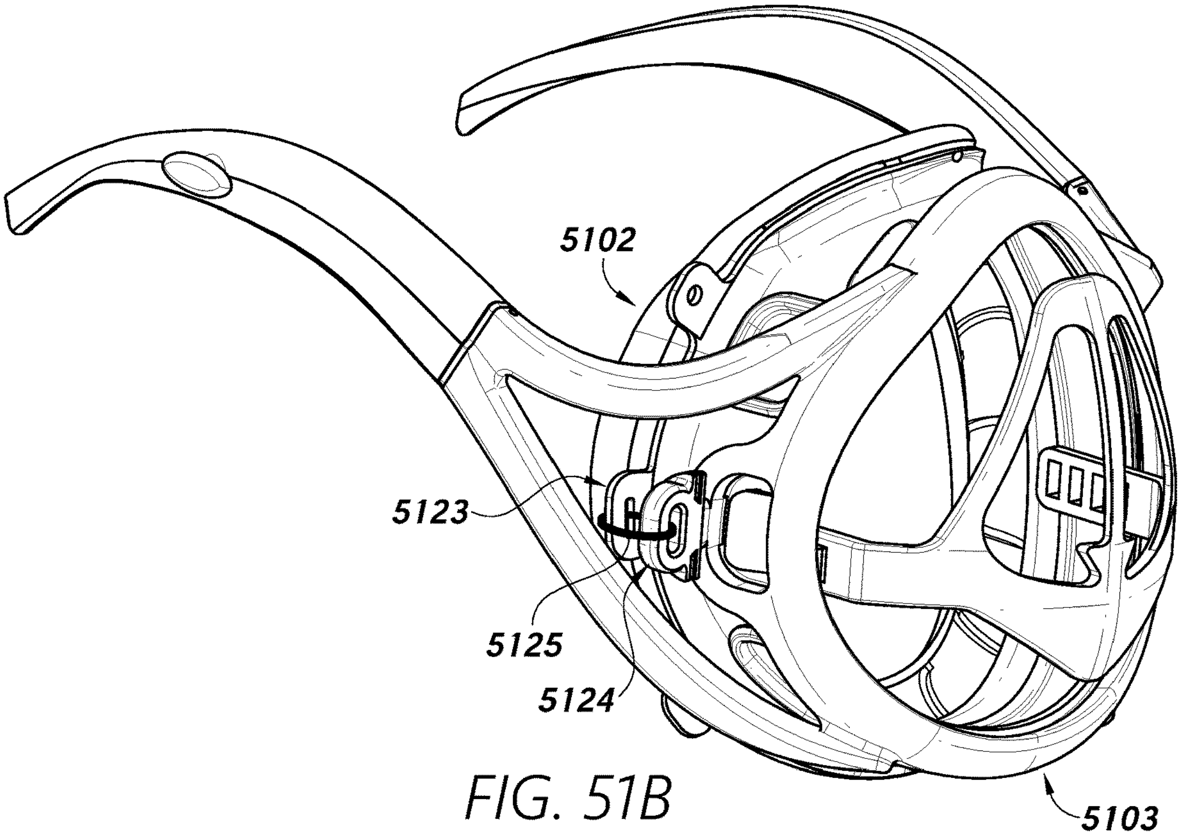

FIGS. 51A and 51B illustrate an example facial covering assembly in accordance with one or more embodiments. In some embodiments, one or more ties 5125 (e.g., zip-ties, latches, cords, strings, hoops, Velcro straps, screw bolts, elastic straps, and/or similar devices) may be used to secure an inner frame 5102 of the assembly to an outer frame 5103 of the assembly. For example, the inner frame 5102 may comprise one or more secondary clip attachment features 5123 having lumens configured to be aligned with corresponding lumens of outer frame secondary clip attachment features 5124 of the outer frame 5103. A tie 5125 may be configured to extend through and/or securely attach an inner frame attachment feature 5123 and an outer frame attachment feature 5124. For example, when a relatively thick filtering element is placed between the inner frame 5102 and the outer frame 5103, some attachment features of the inner frame 5102 and/or outer frame 5103 may be prevented from attaching. In such cases, a tie 5125 may provide a secondary securing option to secure the inner frame 5102 to the outer frame 5103.

The ties 5125 and/or attachment features 5123, 5124 may be configured to connect any filter mask to the inner frame 5102 and/or outer frame 5103. The ties 5125 and/or attachment features 5123, 5124 may provide for improved customization (e.g., fitting, tightening, and/or optimizing) of the assembly to a user's preferences.

The seal tie 5125 has addition features to secure and tighten more with various options. These include a spool for wrapping the ear loop, strap, Velcro, zip tie, or other similar type of component. The holes on the inner frame 5102 and outer frame 5103 can be used to tighten and secure the two together for an enhanced seal between mask and base/seal.

The attachment features 5123, 5124 on each side of the frames allows for customization of the tension needed for optimal fit of the wearers head and ear shape, in addition to securing the clip and base.

Figure 52A:
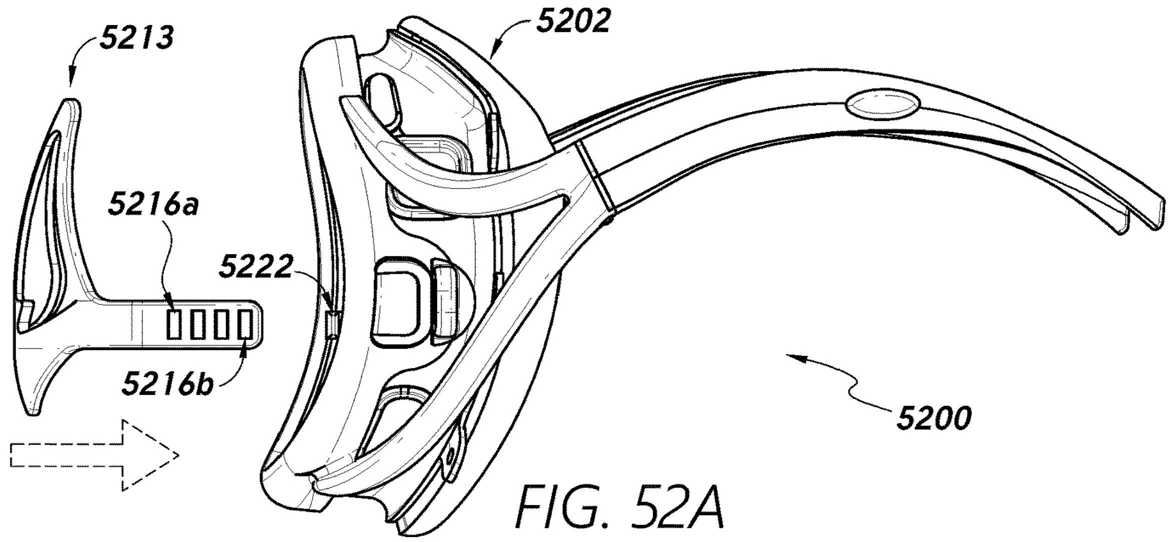
FIGS. 52A-52C illustrate an attachment process of a PPE assembly in accordance with one or more embodiments.
Figure 52B:
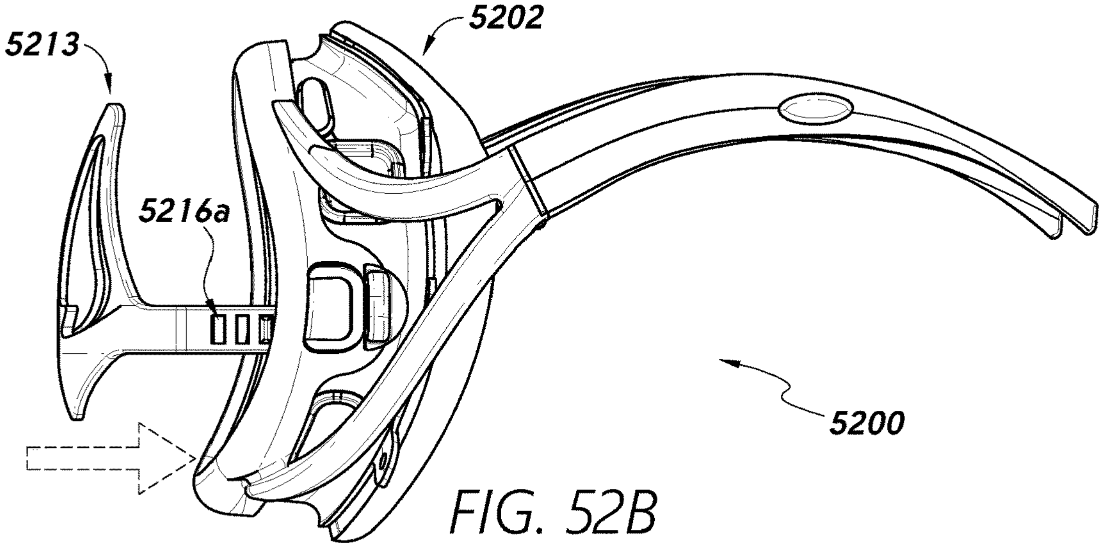
Figure 52C:
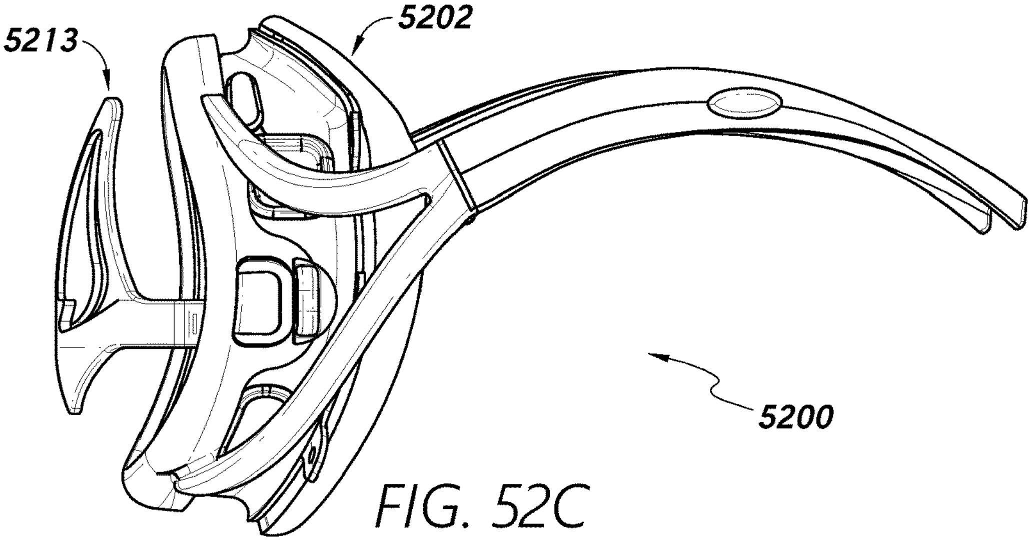

FIGS. 52A-52C illustrate an attachment process of a PPE assembly 5200 in accordance with one or more embodiments. In some embodiments, the assembly 5200 may comprise a shaper 5213 configured to attach to shaper engagement features 5222 of an inner frame 5202 of the assembly 5200. The shaper 5213 may comprise multiple inner frame engagement features 5216, including a proximal engagement feature 5216*a* and/or a distal engagement feature 5216*b*. The shaper 5213 may be moved towards the inner frame 5202 to cause attachment of one or more inner frame engagement features 5216 with the shaper engagement features 5222.

FIG. 52B illustrates the assembly 5200 with the distal attachment feature 5216*b* attached to the shaper attachment feature 5222. As shown, the shaper 5213 may be situated relatively extended with respect to the inner frame 5202 when the distal attachment feature 5216*b* is attached to the shaper attachment feature 5222.

FIG. 52C illustrates the assembly 5200 with the proximal attachment feature 5216*a* attached to the shaper attachment feature 5222. As shown, the shaper 5213 may be situated relatively compressed with respect to the inner frame 5202 when the proximal attachment feature 5216*a* is attached to the shaper attachment feature 5222.

The assemblies descried herein provide many unique features and/or may be configured to protect the wearer from contaminants in the air. The melt-blown material on many masks provides optimum filtration of contaminants if all the air was going through the material. The problem with most masks today is they have many areas with gaps and leaks, that let the contaminants into your lungs without going through the filter material.

The assemblies described herein have a special conforming seal that is integrated with the rigid base that provides a great, comfortable seal around the face. The filtering element (e.g., mask) that you put over the base has an additional outer clip that has two areas that snap in place to secure to the base and provide a good seal between the mask and seal/base.

The secondary attachment features provide additional features to secure and tighten more with various options. These include a spool for wrapping the ear loop, strap, Velcro, zip tie, or other similar type of component. The hole on the base and clip can be used to tighten and secure the two together for an enhanced seal between mask and base/seal.

The spool feature on each side of the clip and arm frames allows for customization of the tension needed for optimal fit of the wearers head and ear shape. The top and bottom holes on the base allow for connection of top and bottom head straps to secure the PPE kit to the face by wrapping around the back of the head.

Example facial coverings can include over nineteen-hundred designs, with twenty features that offer significantly greater comfort, an airtight fit, enhanced breathability, shape structure, longer wear, reduced environmental impact and cost savings: Reshapes surgical PPE mask to retain material structure and efficacy comparable to an N95 mask.

Woven fabric and melt-blown non-woven polypropylene masks that have no additional conversion or seal kits can have leaks or gaps, especially when worn by the public that are not trained in the fitting of masks. Furthermore, many masks as the N-95 and surgical masks were never designed for all-day public use. A proper fitting airtight seal that conforms to all/some facial features and increasing the filtration material extending away from the face allowing for greater material use for filtration and breathability can be critical and/or important, as opposed to many surgical masks used to cover the face and the small material in contact with the nose and mouth for actual filtration. Improper fitting and continual all-day use of some masks can result in gaps and leaks that can reduce the efficacy of such masks by approximately 50 percent or more according to certain studies. A mask conversion kit in accordance with aspects of the present disclosure can take ordinary masks and enhance their function and fitting.

Furthermore, high-end N 95 supply is generally limited and such masks can require two or more additional mechanical manufacturing processes to create a stiffer shaping of the mask in order to create a higher level of seal and fitting, while surgical masks are generally relatively flat and loose with relatively little stability and extensive leaks and gaps, which may not adequately protect against viruses and bacteria within the general public due to its loose paper like material, that may have a tendency to lay over the mouth and nose with very little space for filtration breathability; in some cases, most of the material in a surgical mask currently is used to spread around areas of the face to try to seal as oppose to lifting it forward in order to create more filtration and greater easier breathability.

As described above, standard N-95 and surgical masks can comprise melt blown poly propylene that is electrostatic that creates a nano web type of filtration. Embodiments of the present disclosure allow for a loose, flat surgical mask to be converted to a mask assembly having a relatively higher level of facial fitting, greater separation from mouth and nose, improved/airtight seal, improved comfort and greater surface area filtration lifting it away from the face compared to a surgical mask without such conversion. Therefore, a relatively cheap (e.g., about $0.20) surgical mask can be converted to a mask assembly having the benefits of a relatively more expensive (e.g., about $5.00) N-95 mask, thereby providing superior mask protection in an assembly that is relatively affordable for the general mass public.

Additional Embodiments

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Unless otherwise defined, all terms (including technical and scientific terms) used herein have the same meaning as commonly understood by one of ordinary skill in the art to which example embodiments belong. It be further understood that terms, such as those defined in commonly used dictionaries, should be interpreted as having a meaning that is consistent with their meaning in the context of the relevant art and not be interpreted in an idealized or overly formal sense unless expressly so defined herein.

The spatially relative terms "outer," "inner," "upper," "lower," "below," "above," "vertical," "horizontal," and similar terms, may be used herein for ease of description to describe the relations between one element or component and another element or component as illustrated in the drawings. It be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise expressly stated, comparative and/or quantitative terms, such as "less," "more," "greater," and the like, are intended to encompass the concepts of equality. For example, "less" can mean not only "less" in the strictest mathematical sense, but also, "less than or equal to."

What is claimed is:

1. A facial covering assembly, comprising:

an inner frame comprising at least one aperture to allow air flow through the inner frame;

an outer frame configured to couple to the inner frame, the outer frame comprising at least one aperture to allow air flow through the outer frame;

a cushioning element configured to couple to the inner frame, the cushioning element configured to establish a seal around at least a portion of a user's face; and a shaper coupled to the inner frame and extending across the at least one aperture of the inner frame, the shaper being adjustably coupled to the inner frame to adjust a position of the shaper relative to the inner frame.

2. The facial covering assembly of claim 1, further comprising one or more filtering sheets between at least a portion of the inner frame and at least a portion of the outer frame.

3. The facial covering assembly of claim 1, further comprising one or more user engagement features configured to secure to a user's ear.

4. The facial covering assembly of claim 1, wherein the shaper comprises at least one arm extending towards the inner frame.

5. The facial covering assembly of claim 4, wherein the at least one arm comprises multiple attachment features along a length of the at least one arm, each of the multiple attachment features configured to alternately couple to the inner frame.

6. The facial covering assembly of claim 1, wherein the shaper has a conical form in which a midsection of the shaper extends away from the inner frame.

7. The facial covering assembly of claim 6, wherein the midsection comprises one or more elongate appendages extending around one or more apertures of the shaper.

8. The facial covering assembly of claim 1, wherein the shaper comprises a midsection disposed at a central portion of the at least one aperture of the inner frame.

9. The facial covering assembly of claim 8, wherein the shaper comprises one or more arms coupled to the midsection, and wherein the midsection has greater surface area than the one or more arms.

10. The facial covering assembly of claim 8, wherein the midsection comprises apertures to allow air flow through the midsection.

11. The facial covering assembly of claim 1, wherein the inner frame comprises a first clip attachment feature and the outer frame comprises a second clip attachment feature, each of the first clip attachment feature and the second clip attachment feature configured to receive a clip for attaching the inner frame to the outer frame.

12. A method comprising:

placing a filtering sheet at least partially between an inner frame and an outer frame, the inner frame comprising at least one aperture to allow air flow through the inner frame and a cushioning element, the cushioning element configured to establish a seal around at least a portion of a user's face, the outer frame comprising at least one aperture to allow air flow through the outer frame;

coupling the outer frame to the inner frame to secure the filtering sheet between the inner frame and the outer frame; and coupling a shaper to the inner frame, the shaper extending across the at least one aperture of the inner frame, the shaper being adjustably coupled to the inner frame to adjust a position of the shaper relative to the inner frame.

13. The method of claim 12, further comprising coupling one or more user engagement features to the inner frame or outer frame, the one or more user engagement features configured to secure to a user's ear.

14. The method of claim 12, further comprising coupling the shaper to a first set of one or more shaper engagement features at the inner frame, the shaper configured to be situated at least partially in front of a user's mouth or nose.

15. The method of claim 14, further comprising decoupling the shaper from the first set of one or more shaper engagement features and coupling the shaper to a second set of one or more shaper engagement features at the inner frame.

16. The method of claim 15, wherein the second set of one or more shaper engagement features is situated distal from a midsection of the shaper relative to the first set of one or more shaper engagement features.

17. The method of claim 15, wherein the second set of one or more shaper engagement features is situated proximal to a midsection of the shaper relative to the first set of one or more shaper engagement features.

18. The method of claim 14, wherein the shaper comprises at least one arm extending towards the inner frame.

19. The method of claim 14, wherein the inner frame comprises a first clip attachment feature and the outer frame comprises a second clip attachment feature, each of the first clip attachment feature and the second clip attachment feature configured to receive a clip for attaching the inner frame to the outer frame.

20. The method of claim 19, wherein the first clip attachment feature extends laterally from a side of the inner frame and the second clip attachment feature extends laterally from a side of the outer frame.

* * * * *